US010660099B2

(12) United States Patent
Takano

(10) Patent No.: US 10,660,099 B2
(45) Date of Patent: *May 19, 2020

(54) COMMUNICATION CONTROL DEVICE, COMMUNICATION CONTROL METHOD, AND TERMINAL DEVICE

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,038

(22) Filed: Jul. 3, 2019

(65) Prior Publication Data
US 2019/0349931 A1  Nov. 14, 2019

Related U.S. Application Data

(63) Continuation of application No. 15/469,031, filed on Mar. 24, 2017, now Pat. No. 10,244,533, which is a (Continued)

(30) Foreign Application Priority Data

Jun. 19, 2013 (JP) .................................. 2013-128611

(51) Int. Cl.
*H04W 24/02* (2009.01)
*H04W 72/04* (2009.01)
(Continued)

(52) U.S. Cl.
CPC ....... *H04W 72/0453* (2013.01); *H04W 16/32* (2013.01); *H04W 24/02* (2013.01); *H04W 72/042* (2013.01); *H04W 84/045* (2013.01)

(58) Field of Classification Search
CPC ..................................................... H04W 72/04
See application file for complete search history.

(56) References Cited

U.S. PATENT DOCUMENTS 8,874,124 B2   10/2014  Clegg
9,301,233 B2    3/2016  Wang et al.
(Continued)

FOREIGN PATENT DOCUMENTS

EP    2916579 A1    9/2015
JP    2008-278264 A  11/2008
(Continued)

OTHER PUBLICATIONS

3rd Generation Partnership Project; Technical Specification Group Radio Access Network; Scenarios and Requirements for Small Cell Enhancements for E-UTRA and E-UTRAN, (Release 12), 3GPP TR 36.932 V1.0.0 (Dec. 2012), 14 pages.
(Continued)

*Primary Examiner* — Michael T Vu
(74) *Attorney, Agent, or Firm* — Xsensus LLP

(57) ABSTRACT

A communication control device including: an acquisition unit configured to acquire band use information indicating which cell of a macro cell and a small cell partially or entirely overlapping with the macro cell uses each of a plurality of frequency bands used by one of the macro cell and the small cell; and a communication control unit configured to notify a terminal device of the band use information. The communication control device improves radio communication of a terminal device when a small cell is disposed.

6 Claims, 35 Drawing Sheets

Related U.S. Application Data continuation of application No. 14/891,758, filed as application No. PCT/JP2014/061766 on Apr. 25, 2014, now Pat. No. 9,661,507.

(51) Int. Cl.
*H04W 16/32* (2009.01)
*H04W 84/04* (2009.01)

(56) References Cited

U.S. PATENT DOCUMENTS

| | | |
|---|---|---|
| 2010/0008323 A1 | 1/2010 | Deshpande et al. |
| 2010/0151864 A1 | 6/2010 | Mori |
| 2012/0213170 A1* | 8/2012 | Choi ............... H04L 1/1861 370/329 |
| 2013/0077507 A1 | 3/2013 | Yu et al. |
| 2013/0077576 A1 | 3/2013 | Abe et al. |
| 2013/0195078 A1 | 8/2013 | Kobayashi et al. |
| 2013/0316709 A1 | 11/2013 | Watanabe et al. |
| 2014/0029584 A1* | 1/2014 | Qu ..................... H04W 72/042 370/336 |
| 2014/0050194 A1 | 2/2014 | Gaal et al. |
| 2014/0177601 A1 | 6/2014 | Nishio et al. |
| 2015/0208413 A1 | 7/2015 | Takano |

FOREIGN PATENT DOCUMENTS

| | | |
|---|---|---|
| JP | 2011-527852 A | 11/2011 |
| WO | 2011/040041 A1 | 4/2011 |
| WO | 2012/073939 A1 | 6/2012 |
| WO | 2012/086108 A1 | 6/2012 |
| WO | 2012/135120 A1 | 10/2012 |
| WO | 2013/021531 A1 | 2/2013 |

OTHER PUBLICATIONS

3rd Generation Partnership Project; Technical Specification Group Radio Access Network; Scenarios and Requirements for Small Cell Enhancements for E-UTRA and E-UTRAN, (Release 12), 3GPP TR 36.932 V12.0.0 (Dec. 2012), 14 pages.

Extended European Search Report dated Jan. 31, 2017 for European Application No. 14814298.7.

Extended European Search Report dated Nov. 3, 2017 in Patent Application No. 17185662.8, 7 pages.

* cited by examiner

FIG. 5

HIGH PRIORITY ↑

| CC | CELL |
|---|---|
| CC 1 | MACRO |
| CC 2 | PICO |
| CC 3 | MACRO |
| CC 4 | PICO |
| CC 5 | PICO |

COMMUNICATION CONTROL DEVICE, COMMUNICATION CONTROL METHOD, AND TERMINAL DEVICE

CROSS-REFERENCE TO RELATED APPLICATIONS

This application is a continuation of application Ser. No. 15/469,031, filed Mar. 24, 2017, which is a continuation of application Ser. No. 14/891,758, filed Nov. 17, 2015 (now U.S. Pat. No. 9,661,507), which is a national phase application of International Application No. PCT/JP2014/061766, filed Apr. 25, 2014, and claims priority to Japanese Application No. 2013-128611, filed Jun. 19, 2013, the entire contents of each are incorporated herein by reference.

The present disclosure relates to a communication control device, a communication control method, and a terminal device.

At present, there is a concern of data traffic increasing in cellular systems due to popularization of smartphones. For this reason, it is increasingly important for cellular service providers to increase communication capacities of the cellular systems.

To increase communication capacities, for example, service providers dispose small cells such as pico cells or femto cells in macro cells. Accordingly, the service provides can obtain new communication capacities. To use such small cells, various examinations have been made.

For example, Non-Patent Literature 1 discloses various disposition scenarios of small cells and use of different frequency bands in macro cells and small cells.

CITATION LIST

Patent Literature

Non-Patent Literature 1: 3GPP TR 36.932 V1. 0.0 (2012 December) "3rd Generation Partnership Project; Technical Specification Group Radio Access Network; Scenarios and Requirements for Small Cell Enhancements for E-UTRA and E-UTRAN (Release 12)"

SUMMARY OF INVENTION

Technical Problem

On the other hand, for example, in Long Term Evolution (LTE) and LTE-Advanced, user equipments (UEs) are notified of a list (whitelist) of frequency bands which is a measurement target by the UEs by an evolved Node B (eNB). In the whitelist, the frequency bands with higher priority of measurement are positioned at a higher level. The whitelist includes a list of the frequency bands, but it is unclear that each frequency band is a frequency band for a macro cell or a frequency band for a pico cell. The whitelist is notified of as common information to UEs. The UEs receiving the whitelist perform measurement with the frequency bands with higher priority (that is, the frequency bands higher in the whitelist) earlier.

However, when small cells are particularly disposed, which frequency bands for measurement have higher priority differ depending on situations of the UEs. Therefore, the UEs may perform undesirable measurement when the UEs perform the measurement according to the foregoing whitelist. As a result, radio communication of the UEs can be adversely affected.

Accordingly, it is desirable to provide a structure capable of improving radio communication of a terminal device when a small cell is disposed.

Solution to Problem

According to the present disclosure, there is provided a communication control device including: an acquisition unit configured to acquire band use information indicating which cell of a macro cell and a small cell partially or entirely overlapping with the macro cell uses each of a plurality of frequency bands used by one of the macro cell and the small cell; and a communication control unit configured to notify a terminal device of the band use information.

According to the present disclosure, there is provided a communication control method including: acquiring band use information indicating which cell of a macro cell and a small cell partially or entirely overlapping with the macro cell uses each of a plurality of frequency bands used by one of the macro cell and the small cell; and notifying a terminal device of the band use information.

According to the present disclosure, there is provided a terminal device including: an acquisition unit configured to acquire band use information indicating which cell of a macro cell and a small cell partially or entirely overlapping with the macro cell uses each of a plurality of frequency bands used by one of the macro cell and the small cell when a base station notifies of the band use information; and a communication control unit configured to control radio communication based on the band use information.

According to the present disclosure, there is provided an information processing device including a memory configured to store a predetermined program and one or more processors capable of executing the predetermined program. The predetermined program is a program executing: acquiring band use information indicating which cell of a macro cell and a small cell partially or entirely overlapping with the macro cell uses each of a plurality of frequency bands used by one of the macro cell and the small cell when a base station notifies of the band use information; and controlling radio communication based on the band use information.

According to the present disclosure, there is provided a terminal device including: an acquisition unit configured to acquire a measurement result at a first frequency band which is being used for one of a macro cell and a small cell partially or entirely overlapping with the macro cell and a measurement result at a second frequency band for one of the small cell and the macro cell; and a communication control unit configured to trigger reporting of the measurement result when a combination of the measurement result at the first frequency band and the measurement result at the second frequency band satisfies a reporting condition for triggering the reporting of the measurement result. The reporting condition differs between a first case in which the first frequency band is a frequency band for the macro cell and the second frequency band is a frequency band for the small cell and a second case in which the first frequency band is the frequency band for the small cell and the second frequency band is the frequency band for the macro cell.

According to the present disclosure, there is provided an information processing device including a memory configured to store a predetermined program and one or more processors capable of executing the predetermined program. The predetermined program is a program executing: acquiring a measurement result at a first frequency band which is being used for one of a macro cell and a small cell partially or entirely overlapping with the macro cell and a measurement result at a second frequency band for one of the small cell and the macro cell; and triggering reporting of the measurement result when a combination of the measurement result at the first frequency band and the measurement result at the second frequency band satisfies a reporting condition for triggering the reporting of the measurement result. The reporting condition differs between a first case in which the first frequency band is a frequency band for the macro cell and the second frequency band is a frequency band for the small cell and a second case in which the first frequency band is the frequency band for the small cell and the second frequency band is the frequency band for the macro cell.

According to the present disclosure, there is provided a communication control device including: an acquisition unit configured to acquire information on a reporting condition which is a reporting condition for triggering reporting of a measurement result and is a condition satisfied by a measurement result at a first frequency band which is being used for one of a macro cell and a small cell partially or entirely overlapping with the macro cell and a measurement result at a second frequency band for one of the macro cell and the small cell; and a communication control unit configured to notify a terminal device of the information on the reporting condition. The reporting condition differs between a first case in which the first frequency band is a frequency band for the macro cell and the second frequency band is a frequency band for the small cell and a second case in which the first frequency band is the frequency band for the small cell and the second frequency band is the frequency band for the macro cell.

According to the present disclosure, there is provided a communication control method including: acquiring information on a reporting condition which is a reporting condition for triggering reporting of a measurement result and is a condition satisfied by a measurement result at a first frequency band which is being used for one of a macro cell and a small cell partially or entirely overlapping with the macro cell and a measurement result at a second frequency band for one of the macro cell and the small cell; and notifying a terminal device of the information on the reporting condition. The reporting condition differs between a first case in which the first frequency band is a frequency band for the macro cell and the second frequency band is a frequency band for the small cell and a second case in which the first frequency band is the frequency band for the small cell and the second frequency band is the frequency band for the macro cell.

Advantageous Effects of Invention

According to the present disclosure described above, it is possible to improve the radio communication of the terminal device when the small cell is disposed.

BRIEF DESCRIPTION OF DRAWINGS

FIG. 5 is an explanatory diagram illustrating an example of a whitelist indicating whether each CC is a CC for a macro cell or a CC for a pico cell.

DESCRIPTION OF EMBODIMENTS

Figure 1:
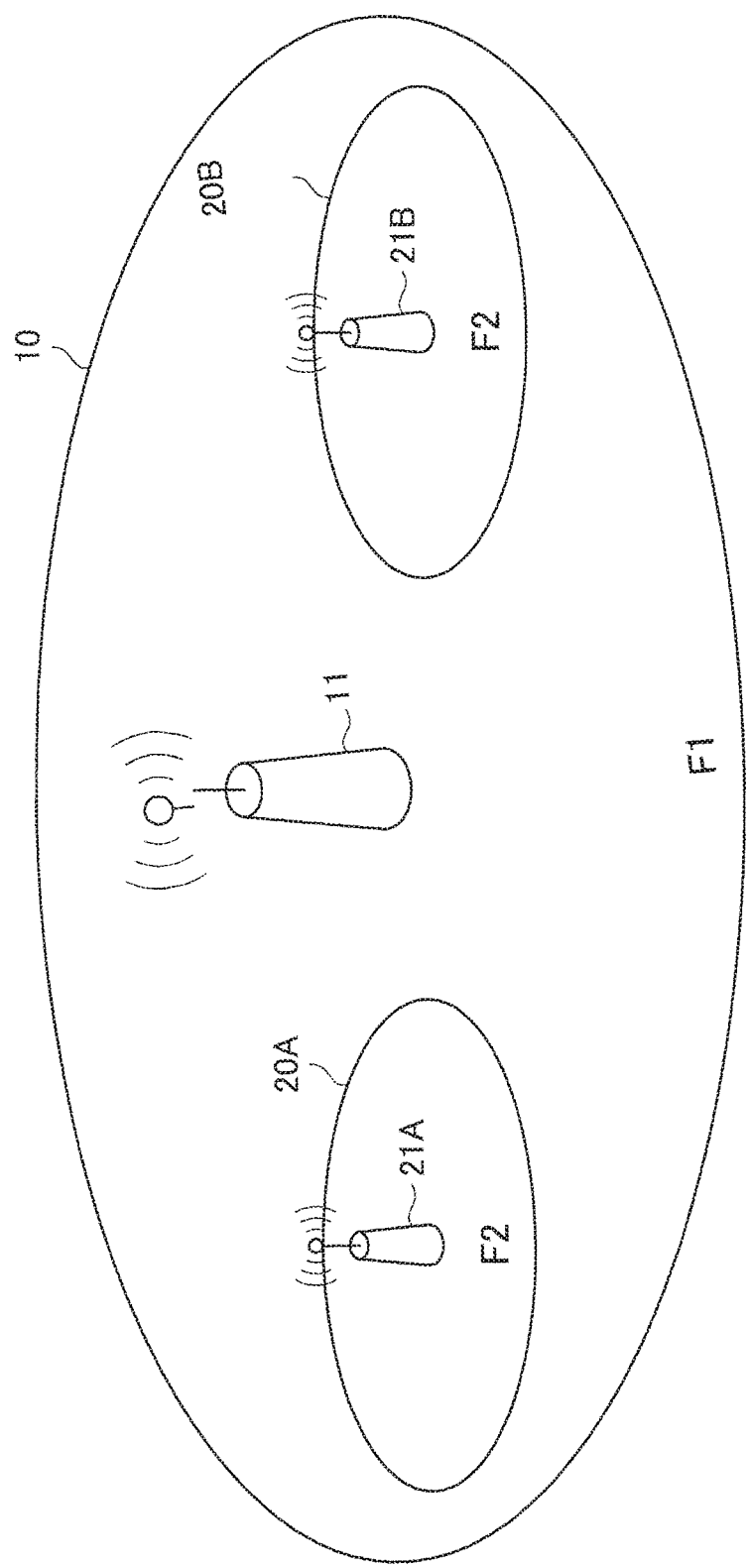
FIG. 1 is an explanatory diagram illustrating a first scenario (scenario A) of small cells.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Introduction
2. Schematic configuration of communication system according to embodiment of the present disclosure
3. First Embodiment
3.1 Overview
3.2 Configuration of macro eNB
3.3 Configuration of pico eNB
3.4 Configuration of UE
3.5 Flow of process
3.6 First modification example
3.7 Second modification example
4. Second Embodiment
4.1 Overview
4.2 Configuration of macro eNB
4.3 Configuration of pico eNB
4.4 Configuration of UE
4.5 Flow of process
4.6 Modification example
5. Third Embodiment
5.1 Overview
5.2 Configuration of macro eNB
5.5 Flow of process
6. Fourth Embodiment
6.1 Overview
6.2 Configuration of macro eNB
6.3 Configuration of pico eNB
6.4 Configuration of UE
6.5 Flow of process
7. Fifth Embodiment
7.1 Overview
7.2 Configuration of UE
7.3 Flow of process
8. Application examples
8.1. Applications related to eNB
8.2. Applications related to UE
9. Conclusion

1. Introduction

First, carrier aggregation, measurement, and a small cell will be described with reference to FIGS. 1 and 2.

(Carrier Aggregation of Release 10)

Component Carrier

In carrier aggregation of Release 10, up to five component carriers (CCs) are bundled and used by a user equipment (UE). Each CC is a bandwidth of up to 20 MHz. In carrier aggregation, CCs continuing in a frequency direction are used in some cases and CCs separated in the frequency direction are used in some cases. When the CCs distant on the frequency axis are used, a propagation state can be considerably different between the used CCs. In carrier aggregation, the CCs to be used can be set for each UE.

Primary CC and Secondary CC

In carrier aggregation, one of the plurality of CCs used by the UE is a special CC. The one special CC is referred to as a primary component carrier (PCC). Of the plurality of CCs, the remaining CCs are referred to as secondary component carriers (SCCs).

The PCC may differ depending on the UE. Since the PCC is the most important CC among the plurality of CCs, the CC for which communication quality is the stablest is preferable. Which CC is used as the PCC actually depends on the way in which they are installed.

The CC with which a UE initially establishes connection is the PCC for the UE. The SCC is added to the PCC. That is, the PCC is a main frequency band and the SCC is an auxiliary frequency band. The SCC is changed by deleting the existing SCC and adding a new SCC. The PCC is changed in an inter-frequency handover sequence of the related art. In carrier aggregation, a UE cannot use only the SCC, but necessarily uses one PCC.

The PCC is used to control connection (for example, setup of the connection or maintenance of the connection). Even when a UE uses a plurality of CCs, the UE does not enter a connection state with each CC. The UE enters the connection state with only the PCC.

The PCC is also referred to as a primary cell. The SCC is also referred to as a secondary cell.

Cross Carrier Scheduling

As the CCs, there are CCs in which a physical downlink control channel is present and CCs in which the PDCCH is not present. At least, the PDCCH is present in the PCC. When the PDCCH is not present in a certain CC, control information (scheduling information) for this CC is transmitted with the PDCCH of another CC. This form is referred to as cross carrier scheduling.

In each search space of the PDCCH, there are a plurality of pieces of downlink control information (DCI). In the DCI, there is a 3-bit carrier identity field (CIF). The CIF designates another CC. That is, in the DCI, there is control information of the CC designated by the CIF.

One CC is controlled not by a plurality of CCs, but is necessarily controlled by one CC. In other words, the control information for one CC is not distributed and disposed in a plurality of CCs, but is disposed in one CC. The UE is notified in advance whether there is the CIF in the CC by RRC signaling.

ePDCCH

In Release 11, the problem that the region of the PDCCH lacks was closed up. Accordingly, a new control region, an enhanced PDCCH (ePDCCH) was developed. It has been decided that the ePDCCH is to be disposed in the region of the PDSCH of the related art.

(Measurement)

Measurement refers to measurement of quality of a transmission line. The measurement is performed by a UE. Then, a result of the measurement is reported to an evolved node B (eNB) by the UE.

Measurement Targets

As measurement targets, there are 3 kinds of frequency bands. First, a frequency band used by a serving cell is a measurement target. That is, the frequency band is a frequency band used for radio communication by a UE during connection to an eNB. In the case of carrier aggregation, a PCC and an SCC are measurement targets. Second, a frequency band present in a whitelist included in system information transmitted by an eNB is a measurement target frequency band. Third, a frequency band detected by a UE is a measurement target frequency band.

RSRP and CRS

Representative downlink measurement results are reference signal received power (RSRP) and reference signal received Quality (RSRQ). The RSRP and the RSRQ are values obtained by measurement using a cell specific reference symbol (CRS). Specifically, the RSRP is a result obtained by measuring the power of the CRS. The RSRQ is calculated from the RSRP and a received signal strength indicator (RSSI). Normally, a UE reports both of the RSRP and the RSRQ.

Purpose to Use Measurement Results

The RSRP and the RSSQ are used for cell selection, cell reselection, and handover.

For example, when a UE is an RRC connection state, the measurement results reported by the UE are used, for example, for a handover decision. That is, an eNB performs the handover decision based on the measurement results reported by the UE.

For example, when the UE is in an RRC idle state, the measurement results reported by the UE are used, for example, to select a cell. That is, the UE performs measurement even when the UE is in a radio resource control (RRC) idle state. Accordingly, the UE can select an optimum cell or eNB for receiving information with a paging channel and select an optimum cell or eNB when random access is performed.

Report Events

A predetermined event triggers reporting of the measurement results by the UE. That is, when a predetermined event occurs (when a condition of the predetermined event is satisfied), the UE reports the measurement results to the eNB. In Release 8, 5 kinds of events, events A1 to A5, are decided as the predetermined events. Further, an event A6 for carrier aggregation is decided as the predetermined event.

For example, a condition of the event A1 is that the quality (or example, the RSRP or the RSRQ) of a serving cell is better than a threshold value. A condition of the event A2 is that the quality of a serving cell is worse than the threshold value. A condition of the event A3 is that the quality of a neighbor cell is better than the quality of a serving cell by the threshold value or more. A condition of the event A4 is that the quality of a neighbor cell is better than the threshold value. A condition of the event A5 is that the quality of a serving cell is worse than a first threshold value and the quality of a neighbor cell is better than a second threshold value.

When carrier aggregation is used, a condition of the event A3 is that the quality of a neighbor cell is better than the quality of a primary cell by a threshold value or more. A condition of the event A5 is that the quality of a primary cell is worse than the first threshold value and the quality of a neighbor cell is better than the second threshold value. A condition of the event A6 is that the quality of a neighbor cell is better than the quality of a secondary cell by the threshold value or more.

(Small Cell)

Transmission Power

The transmission power of a small cell is less than the transmission power of a base station of a macro cell. As a result, the radius of the small cell is less than the radius of the macro cell.

Pico eNB of Release 10

In LTE, specifically, a small cell referred to as a pico cell is used. In LTE, a base station is referred to as an evolved Node B (eNB). A base station of the pico cell is referred to as a pico eNB. A base station of a macro cell is referred to as a macro eNB.

In Release 10 of the Third Generation Partnership Project (3 GPP), a pico eNB includes an analog unit and an antenna unit connected to a macro eNB by an optical fiber and is referred to as a remote radio head (RRH). The macro eNB and the pico eNB use the same frequency band. The pico cell partially or entirely overlaps with the macro cell. Such a disposition form of the base stations is referred to as a heterogeneous network (Het-Net). In the Het-Net, since it is important to reduce interference between the macro eNB and the pico eNB, methods for reducing the interference have been actively discussed in the 3GPP. As one of the methods, an examination of providing an almost blank subframe (ABS) by which the macro eNB stops most of the transmission has been made.

Small Cell in Release 12

A small cell examined in Release 12 is also, for example, a pico cell. This point is the same between Release 12 and Release 10. On the other hand, Release 12 describes a scenario in which a macro cell and a pico cell use different frequency bands. For example, a macro eNB uses a frequency band lower by about 2 GHz and a pico eNB uses a frequency band higher by about 5 GHz.

Since the macro cell is broader than the pico cell, it has also been examined that the macro eNB transmits a control signal instead of the pico eNB.

Two scenarios for a small cell have been examined. Hereinafter, specific examples of this point will be described with reference to FIGS. 1 and 2.

FIG. 1 is an explanatory diagram illustrating a first scenario (scenario A) of small cells. In the present specification, the first scenario is referred to as scenario A. Scenario A is a scenario in which a UE is located simultaneously in coverages of both of a macro cell and a small cell. Referring to FIG. 1, a macro cell 10 and a macro eNB 11 are illustrated. A pico cell 20A and a pico eNB 21A, and a pico cell 20B and a pico eNB 21B are also illustrated. The macro eNB 11 uses a frequency band F1 and the pico eNBs 21 use a frequency band F2. In this case, in scenario A, the UE uses the frequency band F1 to perform radio communication with the macro eNB 11 and uses the frequency band F2 to perform radio communication with the pico eNBs 21. Scenario A is, for example, a scenario in which the macro eNB 11 is used outdoors and the pico eNBs 21 are used outdoors or indoors.

Figure 2:
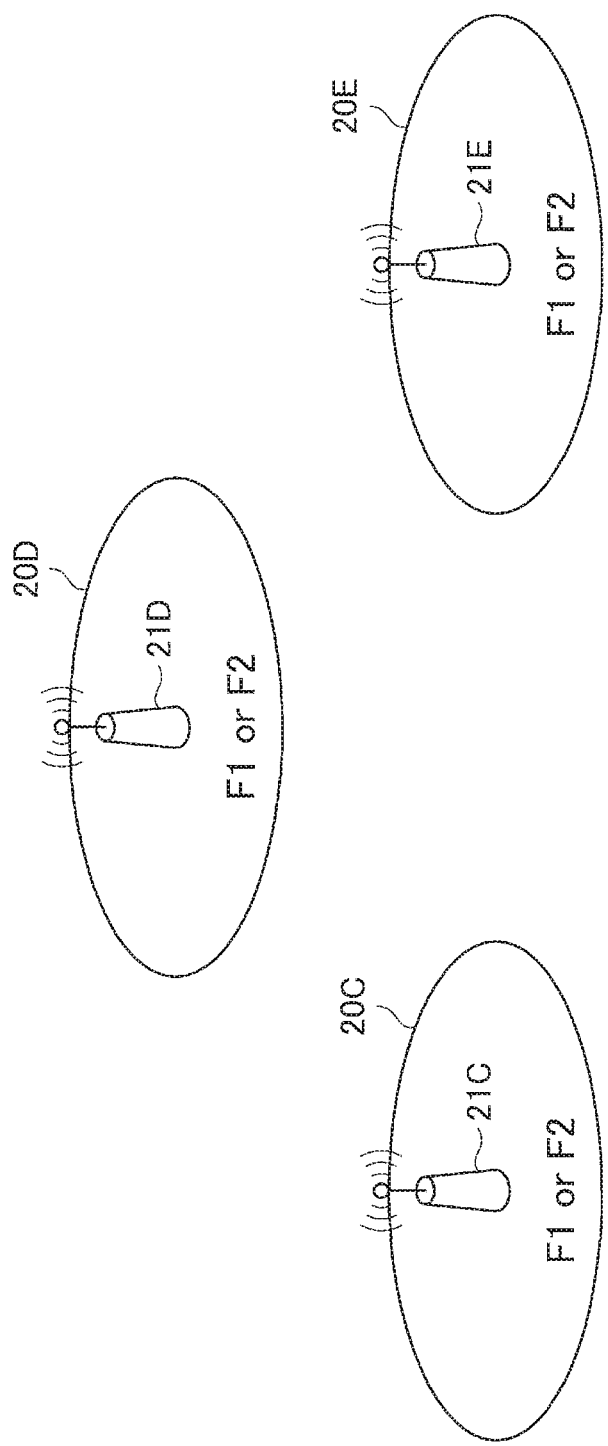
FIG. 2 is an explanatory diagram illustrating a second scenario (scenario A) of small cells.

FIG. 2 is an explanatory diagram illustrating a second scenario (scenario B) of small cells. In the present specification, the second scenario is referred to as scenario B. Scenario B is a scenario in which a UE is not located simultaneously in coverages of both of a macro cell and a small cell. Specifically, scenario B is a scenario in which the UE is located in the coverage of the small cell, but is not located in the coverage of the macro cell. Referring to FIG. 2, a pico cell 20c and a pico eNB 21C, a pico cell 20D and a pico eNB 21D, and a pico cell 20E and a pico eNB 21E are illustrated. In scenario B, the pico eNBs 21 uses a frequency band F1 or a frequency band F2. For example, in scenario B, the pico eNBs 21 are considered to also use the frequency band F2. In this case, in scenario B, the UE can use the frequency band F2 to perform radio communication with the pico eNBs 21. In scenario B, whether the pico cells 20 overlap with a macro cell is not mentioned.

Relation Between Scenario A and Scenario B

In scenario A, by using a CC used in the macro cell as the PCC, it is possible to reduce a frequency of handover in which much signaling is necessary. As a result, it is possible to reduce loads on the UE and the eNB.

When the pico eNB is disposed indoors, no radio wave of the macro eNB arrives indoors. As a result, the scenario of the small cells is considered to be scenario B rather than scenario A. Thus, when one UE is focused on, for example, when one UE goes back and forth between indoors and outdoors, a scenario for the one UE can be switched between scenario A and scenario B. In this way, the switching between scenario A and scenario B can occur for each UE.

Relation Between Scenario of Small Cell and Carrier Aggregation

In each of a macro cell and a pico cell, a plurality of CCs are considered to be used. In this case, a combination of the CCs for the macro cell and the CCs for the pico cell is considered to be used in carrier aggregation.

In scenario A, the CCs for the macro cell are considered to be used as the PCC. On the other hand, in scenario B, since the CCs for the macro cell are not used, a CC for the pico cell is used as the PCC.

Figure 3:
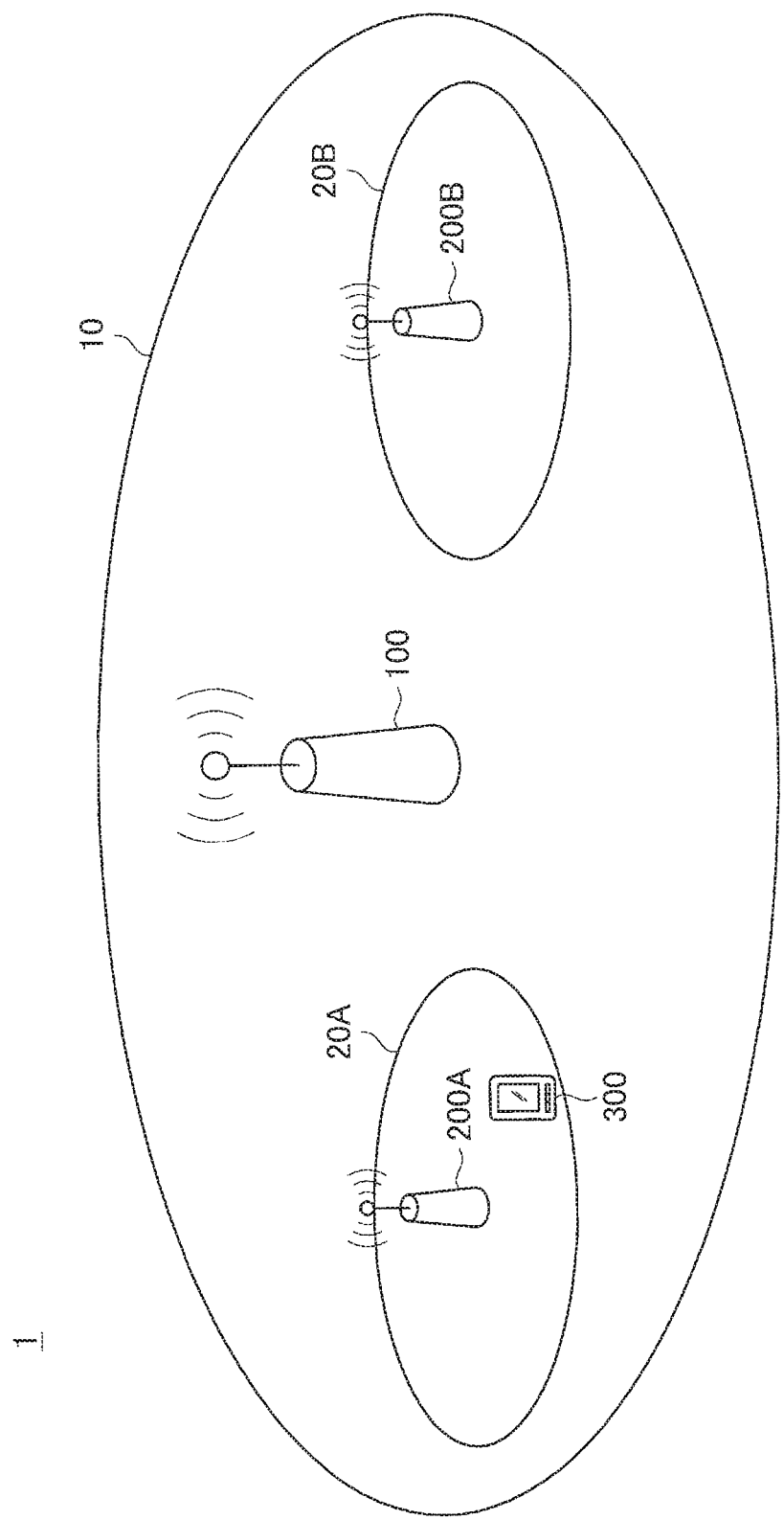
FIG. 3 is an explanatory diagram illustrating an example of a schematic configuration of a communication system according to an embodiment of the present disclosure.

2. Schematic Configuration of Communication System According to Embodiment of Present Disclosure Next, a schematic configuration of a communication system 1 according to an embodiment of the present disclosure will be described with reference to FIG. 3. FIG. 3 is an explanatory diagram illustrating an example of the schematic configuration of a communication system 1 according to the embodiment of the present disclosure. Referring to FIG. 3, the communication system 1 includes macro eNB 100, a pico eNB 200, and a UE 300. In this example, the communication system 1 is a system conforming to LTE, LTE-Advanced, or a compliant communication scheme.

(Macro eNB 100)

The macro eNB 100 performs radio communication with the UE 300 located in the macro cell 10.

For example, the macro eNB 100 uses a plurality of frequency bands to perform the radio communication. The plurality of frequency bands are a plurality of component carriers (CCs). For example, each of the plurality of CCs used by the macro eNB 100 is a band of 2 MHz.

For example, the macro eNB 100 supports the carrier aggregation. That is, the macro eNB 100 can use a plurality of component carriers (CCs) in the radio communication with one UE 300.

(Pico eNB 200)

The pico eNB 100 performs radio communication with the UE 300 located in the pico cell 20. The pico cell 20 partially or entirely overlaps with the macro cell 10.

For example, the pico eNB 200 uses a plurality of frequency bands to perform the radio communication. The plurality of frequency bands are a plurality of component carriers (CCs). For example, each of the plurality of CCs used by the pico eNB 200 is a band at a frequency band higher than the frequency band in which there are the CCs used by the macro eNB 100. For example, each of the plurality of CCs used by the pico eNB 200 is a band of 5 MHz.

For example, the pico eNB 200 supports the carrier aggregation. That is, the pico eNB 200 can use a plurality of component carriers (CCs) in the radio communication with one UE 300.

(UE 300)

The UE 300 performs the radio communication with the macro eNB 100 when the UE 300 is located in the macro cell 10. Further, the UE 300 performs the radio communication with the pico eNB 200 when the UE 300 is located in the pico cell 20.

For example, the UE 300 can perform the radio communication using a plurality of frequency bands. More specifically, for example, the UE 300 can use one main frequency band and one or more auxiliary frequency bands to perform the radio communication. That is, the UE 300 can support the carrier aggregation and use one PCC and one or more SCCs to perform the radio communication.

As a specific form of the carrier aggregation, for example, the UE 300 can use a plurality of CCs for the macro cell 10 to perform the radio communication with the macro eNB 100. For example, the UE 300 can use the plurality of CCs for the pico cell 20 to perform the radio communication with the pico eNB 200.

For example, while the UE 300 uses one or more CCs for the macro cell 10 to perform the radio communication with the macro eNB 100, the UE 300 can use one or more CCs for the pico cell 20 to perform the radio communication with the pico eNB 200. That is, the UE 300 supports the carrier aggregation in which a combination of the CC for the macro cell 10 and the CC for the pico cell 20 is used.

3. First Embodiment

Next, a first embodiment of the present disclosure will be described with reference to FIGS. 4 to 15.

3.1 Overview

Problem

In LTE, UEs are notified of a list (whitelist) of frequency bands which are measurement targets of the UEs by an eNB. For example, the frequency bands are component carriers (CC). In the whitelist, the CCs with higher priority of measurement are located at a higher level. The whitelist includes a list of the CCs, but it is unclear whether each CC is a CC for a macro cell or a CC for a pico cell. The whitelist is notified of as common information to UEs. The UEs receiving the whitelist perform measurement with the CCs with higher priority (that is, the CCs higher in the whitelist) earlier.

However, when pico cells are particularly disposed, which CCs for measurement have higher priority are different depending on situations of the UEs. Therefore, the UEs may perform undesirable measurement when the UEs perform the measurement according to the foregoing whitelist. As a result, the radio communication of the UEs can be adversely affected.

As a first example, a frequency of handover of the UE can increase.

More specifically, for example, when communication quality (that is, a measurement result) in the PCC becomes worse, a measurement result of a neighbor cell (for example, another CC) can be reported to the eNB by the event A3 or A5. As a result, the PCC can be switched to another CC. That is, handover of the PCC is performed. Therefore, when the CC for the pico cell is positioned at a higher level in the whitelist despite a possibility of the UE being distant from the pico cell for a short time, the PCC can be switched from the CC for the macro cell to the CC for the pico cell. When the UE is distant from the pico cell, the PCC is switched from the CC of the pico cell to the CC for the macro cell or the CC for another pico. Thus, there is a concern of handover frequently occurring.

As a second example, the throughput of the UE can decrease.

More specifically, for example, to perform measurement in another CC other than the CC which is being used, the UE provides a period called a measurement gap. In the measurement gap, the UE does not allow transmission of any data. Therefore, when a chance of the measurement in another CC other than the CC which is being used increases, the throughput of the UE decreases. Therefore, for example, when the UE uses only the CC for the pico cell in scenario B and there is the CC for the macro cell at a high level in the whitelist, the UE performs the measurement in the CC for the macro cell with high probability. Therefore, the throughput of the UE can decrease.

As described above, when the UE performs the measurement according to the whitelist, the UE can perform undesirable measurement. As a result, the radio communication of the UEs can be adversely affected.

Accordingly, when the pico cell is disposed in the first embodiment, the radio communication of the UE can be improved.

Solution

According to the first embodiment, the UE 300 is notified of band use information indicating which cell of the macro cell 10 and the pico cell 20 uses each of the plurality of frequency bands (CCs) used in one of the macro cell 10 and the pico cell 20.

Accordingly, for example, the UE 300 can know whether each CC (frequency band) in the whitelist is the CC for the macro cell or the CC for the pico cell. Thus, according to a situation of the UE 300, the UE 300 can relatively change priority of the measurement in the CC for the macro cell and priority of the measurement in the CC for the pico cell. Therefore, the UE 300 can perform more preferable measurement according to the situation of the UE 300. As a result, when the pico cell 20 is disposed, the radio communication of the UE 300 can be improved.

3.2. Configuration of Macro eNB

Figure 4:
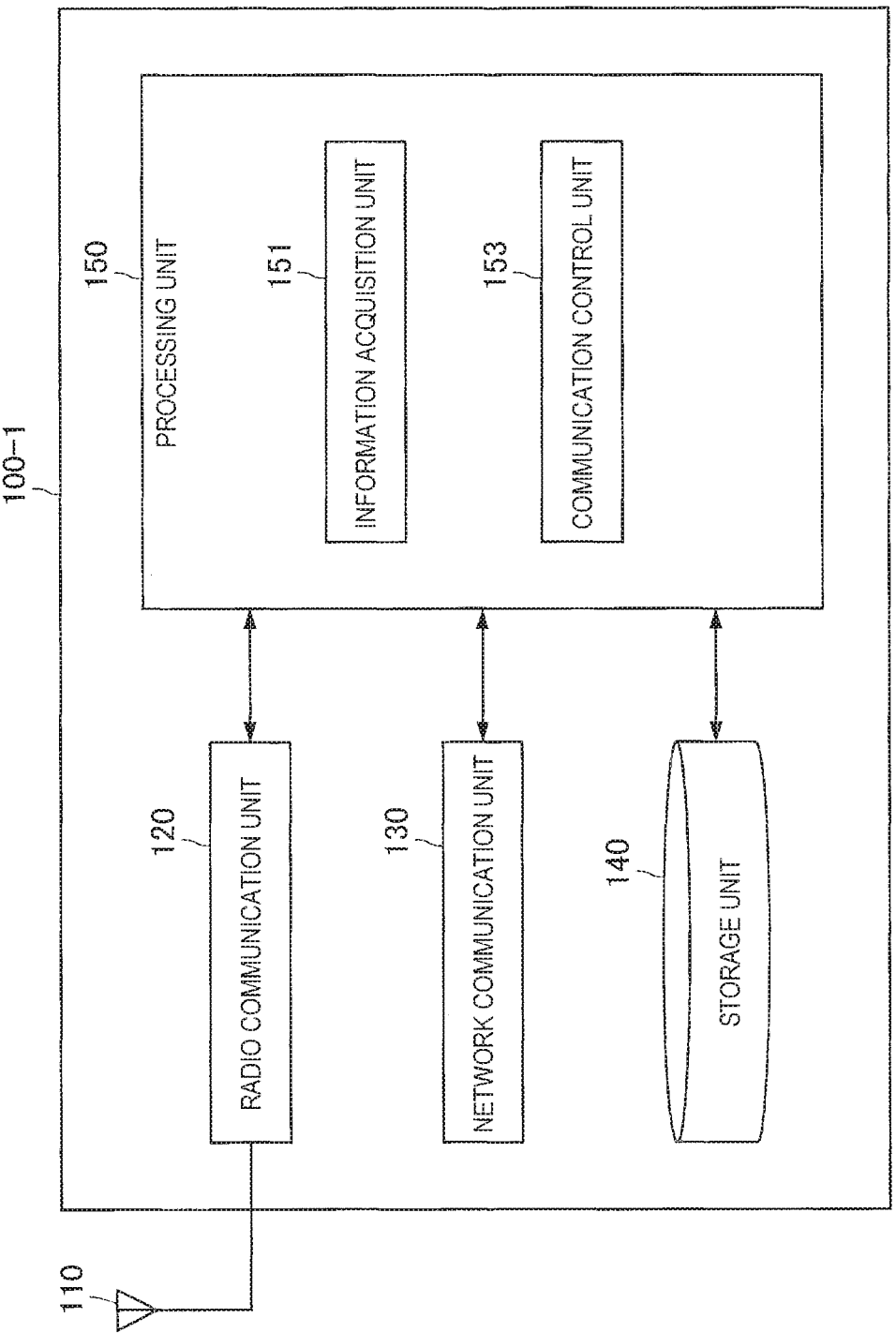
FIG. 4 is a block diagram illustrating an example of the configuration of a macro eNB according to a first embodiment.

Next, an example of the configuration of the macro eNB 100-1 according to the first embodiment will be described with reference to FIGS. 4 and 5. FIG. 4 is a block diagram illustrating an example of the configuration of the macro eNB 100-1 according to the first embodiment. Referring to FIG. 4, the macro eNB 100-1 includes an antenna unit 110, a radio communication unit 120, a network communication unit 130, a storage unit 140, and a processing unit 150.

(Antenna Unit 110)

The antenna unit 110 receives a radio signal and outputs the received radio signal to the radio communication unit 120. The antenna unit 110 transmits a transmission signal output by the radio communication unit 120.

(Radio Communication Unit 120)

The radio communication unit 120 performs the radio communication with the UE 300 located in the macro cell 10. For example, the radio communication unit 120 uses a plurality of frequency bands (that is, the CCs) to perform the radio communication.

(Network Communication Unit 130)

The network communication unit 130 communicates with another communication node. The other communication node includes, for example, the pico eNB 200. The other communication node includes another macro eNB 100. The other communication node includes a communication node of a core network. For example, the core network is an evolved packet core (EPC) and the communication node includes a mobility management entity (MME) and a serving gateway (S-GW).

(Storage Unit 140)

The storage unit 140 stores a program and data for an operation of the macro eNB 100.

(Processing Unit 150)

The processing unit 150 provides various functions of the macro eNB 100-1. The processing unit 150 includes an information acquisition unit 151 and a communication control unit 153.

(Information Acquisition Unit 151)

The information acquisition unit 151 acquires information necessary to control the communication control unit 153. For example, the information acquisition unit 151 acquires information from another device via the radio communication unit 120. For example, the information acquisition unit 151 acquires information stored in the storage unit 140.

For example, the information acquisition unit 151 acquires priority information indicating temporary priority of the measurement among the plurality of frequency bands (CCs) each used in one of the macro cell 10 and the pico cell 20.

In particular, in the first embodiment, the information acquisition unit 151 acquires the band use information indicating which cell of the macro cell 10 and the pico cell 20 uses each of the plurality of frequency bands (CCs) used in one of the macro cell 10 and the pico cell 20.

Specifically, for example, the information acquisition unit 151 acquires a whitelist indicating whether each CC is the CC for the macro cell or the CC for the pico cell. That is, the whitelist including the band use information is acquired. As described above, the whitelist is a list of the CCs which are measurement targets of the UE. In the whitelist, the CCs with higher priority of measurement are located at a higher level. That is, the whitelist includes the priority information. Thus, the whitelist includes both of the band use information and the priority information. For example, the whitelist is stored in the storage unit 140 and is acquired from the storage unit 140. Hereinafter, a specific example of the whitelist will be described with reference to FIG. 5.

FIG. 5 is an explanatory diagram illustrating an example of the whitelist indicating whether each CC is a CC for a macro cell or a CC for a pico cell. Referring to FIG. 5, the whitelist including CC 1 to CC 5 is illustrated. In the whitelist, CC 1 to CC 5 are positioned in the order of the priority of the measurement. That is, the CC with the highest priority of the measurement is CC 1 and is positioned at the highest level in the whitelist. On the other hand, the CC with lowest priority of the measurement is CC 5 and is positioned in the lowest level in the whitelist. The whitelist indicates whether each CC is the CC for the macro cell or the C for the pico cell. For example, the whitelist indicates that the CC 1 is the CC for the macro cell and the CC 5 is the CC for the pico cell. For example, the whitelist including the band use information and the priority information is acquired.

(Communication Control Unit 153)

The communication control unit 153 performs control related to the radio communication in the macro cell 10.

Notification of Priority Information and Band Use Information

For example, the communication control unit 153 notifies a UE 300-1 of the priority information.

In particular, in the first embodiment, the communication control unit 153 notifies the UE 300-1 of the band use information.

For example, the communication control unit 153 notifies the UE 300-1 of the whitelist indicating whether each CC is the CC for the macro cell or the CC for the pico cell. That is, the UE 300-1 is notified of the whitelist including both of the priority information and the band use information. Specifically, for example, the communication control unit 153 informs of system information including the whitelist in the macro cell 10 via the radio communication unit 120. A specific example of the whitelist is illustrated in FIG. 5.

The band use information is information that is used by the UE 300-1 to decide the priority of the measurement among the plurality of frequency bands (CCs). The priority information is also information that is used by the UE 300-1 to decide the priority of the measurement among the plurality of frequency bands (CCs).

By notifying the UE 300-1 of the band use information in this way, for example, the UE 300-1 can know whether each CC in the whitelist is the CC for the macro cell or the CC for the pico cell. Thus, according to a situation of the UE 300-1, the UE 300-1 can relatively change the priority of the measurement in the CC for the macro cell and the priority of the measurement in the pico cell CC. Therefore, the UE 300-1 can perform more preferable measurement performed according to the situation of the UE 300-1. As a result, when the pico cell 20 is disposed, the radio communication of the UE 300-1 can be improved.

The whitelist may be notified of separately by the RRC signaling instead of being reported as part of the system information. The band use information may be notified of as another piece of information instead of being notified of as part of the whitelist.

The notification of the band use information to the UE 300-1 may be notification via the pico eNB 200. That is, the band use information may be notified of by the pico eNB 200 and may not be notified of by the macro eNB 100. In this case, the communication control unit 153 may control the pico eNB 200 so that the UE 300-1 is notified of the band use information. The communication control unit 153 may not perform a special operation and the pico eNB 200 may autonomously notify the UE 300-1 of the band use information. Accordingly, it is possible to reduce a load on the macro eNB.

Notification of Adjustment Information

For example, in regard to the priority decided by the UE 300-1, the relative priority among the frequency bands (CCs) used in the macro cell 10 and the frequency bands (CCs) used in the pico cell 20 depends on a situation of the UE 300-1.

In this case, for example, the communication control unit 153 notifies the UE 300-1 of adjustment information which is adjustment information for deciding the priority among the plurality of frequency bands (CCs) and adjusting the relative priority and is adjustment information generated based on the situation of the UE 300-1. For example, the communication control unit 153 generates the adjustment information based on the situation of the UE 300-1 and notifies the UE 300-1 of the adjustment information. For example, the individual UE 300-1 is notified of the adjustment information by the RRC signaling. When the UE 300-1 is notified of the adjustment information, the UE 300-1 adjusts the relative priority among the CCs for the macro cell and the CCs for the pico cell based on the adjustment information when deciding the priority of the measurement among the plurality of CCs.

For example, the adjustment information is information that indicates one of an increase in the priority of the measurement of the CCs for the macro cell and an increase in the priority of the measurement of the CCs for the pico cell. For example, when the adjustment information indicates the increase in the priority of the measurement of the CCs for the macro cell, the UE 300-1 adjusts the relative priority by increasing the priority of some or all of the CCs for the macro cell in the acquired whitelist. For example, when the adjustment information indicates the increase in the priority of the measurement of the CCs for the pico cell, the UE 300-1 adjusts the relative priority by increasing the priority of some or all of the CCs for the pico cell in the acquired whitelist.

Situation of UE: Movement Situation

For example, the situation of the UE 300-1 includes a movement situation of the UE 300-1. That is, the adjustment information is generated based on the movement situation of the UE 300-1.

Specifically, for example, when the UE 300-1 does not move, the adjustment information indicating the increase in the priority of the measurement of the CCs for the pico cell is generated and notified of Accordingly, for example, when the UE 300-1 is located in the pico cell 20, the UE 300-1 preferentially performs measurement in the CC of the pico cell 20. Therefore, for example, when the UE 300-1 uses only the CC for the pico cell (that is, in the case of scenario B), there is a low possibility of the UE 300 performing the measurement in the CC for the macro cell. As a result, there is a low possibility of the measurement gap being provided, and thus the throughput of the UE 300-1 can be improved. Further, there is a high possibility of the UE 300-1 using the CC of the pico cell 20 as the PCC and/or the SCC. As a result, offloading of traffic in the macro cell can be realized.

The movement situation of the UE 300-1 can be acquired based on a timing advanced value for the UE 300-1, a result of angle of arrival (AoA) measurement used for downlink beamforming, and the like. Information indicating the movement situation of the UE 300-1 may be provided from the UE 300-1 to the macro eNB 100-1.

Situation of UE: Communication Quality in CC for Macro Cell

For example, the situation of the UE 300-1 includes communication quality of the UE 300-1 in the frequency band (CC) used in the macro cell 10. That is, the adjustment information is generated based on the communication quality of the UE 300 in the CC for the macro cell.

Specifically, as a first example, when the UE 300-1 moves and the communication quality in the CC for the macro cell used as the PCC by the UE 300-1 is bad, the adjustment information indicating the increase in the priority of the measurement of the CC for the macro cell is generated and notified of As a second example, when the communication quality in the CC for the macro cell used as the PCC by the UE 300-1 is bad and when the communication quality is good but the communication quality in the CC for another macro cell is not good, the adjustment information indicating the increase in the priority of the measurement of the CC for the macro cell is generated and notified of Accordingly, for example, even when the communication quality of the UE 300-1 in the CC for the macro cell is bad, the measurement of another CC for the macro cell is preferentially performed. Therefore, even when the PCC is switched, there is a higher possibility of the PCC being switched from the CC for the macro cell to another CC for the macro cell. As a result, there is a low possibility of the PCC being switched to the CC for the pico cell and being subsequently further switched to the CC for the macro cell. That is, the frequency of handover is suppressed.

The communication quality of the UE 200 in the CC for the macro cell may be a reported measurement result or may be another piece of information (for example, a channel quality indicator (CQI)) regarding the communication quality.

As described above, in regard to the priority decided by the UE 300-1, the relative priority among the CCs for the macro cell and the CCs for the pico cell depends on the situation of the UE 300-1. Accordingly, the UE 300-1 can perform more preferable measurement performed according to the situation of the UE 300-1. As a result, when the pico cell 20 is disposed, the radio communication of the UE 300-1 can be improved.

By notifying the UE 300-1 of the adjustment information, it is possible to reliably control the measurement of the UE 300-1 from a network side.

Role Sharing of Notification

For example, the communication control unit 153 notifies the UE 300-1 using the CC for the macro cell as the PCC of the adjustment information. On the other hand, the pico eNB 200-1 notifies the UE 300-1 using the CC for the pico cell as the PCC of the adjustment information.

The communication control unit 153 may notify the UE 300-1 using the CC for the macro cell (that is, the UE 300-1 corresponding to scenario A) of the adjustment information. In this case, the pico eNB 200-1 may notify the UE 300-1 not using the CC for the macro cell (that is, the UE 300-1 corresponding to scenario B) of the adjustment information.

3.3. Configuration of Pico eNB

Figure 6:
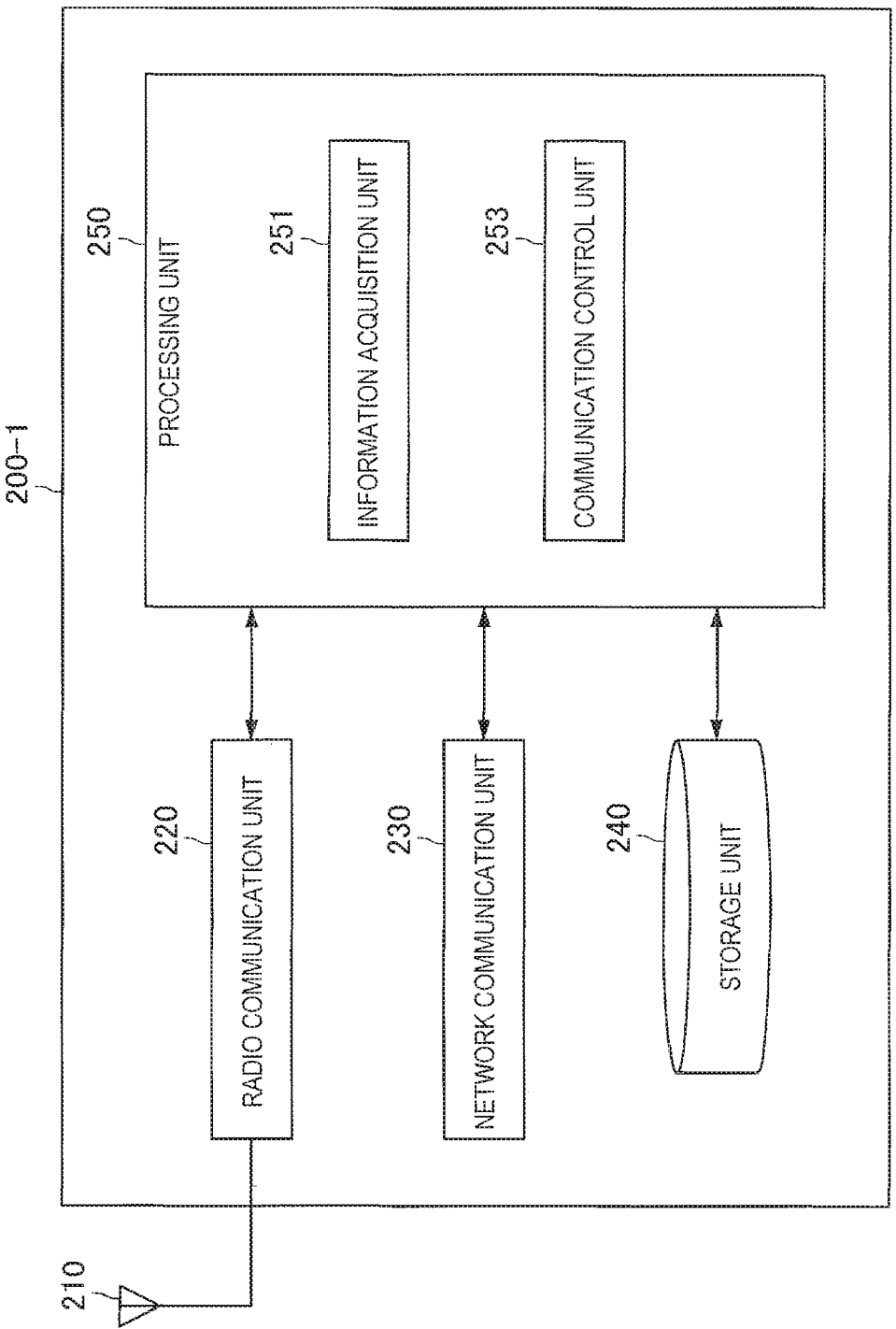
FIG. 6 is a block diagram illustrating an example of the configuration of a pico eNB according to the first embodiment.

Next, the example of the configuration of the pico eNB 200-1 according to the first embodiment will be described with reference to FIG. 6. FIG. 6 is a block diagram illustrating an example of the configuration of the pico eNB 200-1 according to the first embodiment. Referring to FIG. 6, the pico eNB 200-1 includes an antenna unit 210, a radio communication unit 220, a network communication unit 230, a storage unit 240, and a processing unit 250.

(Antenna Unit 210)

The antenna unit 210 receives a radio signal and outputs the received radio signal to the radio communication unit 220. The antenna unit 210 transmits the transmitted signal output by the radio communication unit 220.

(Radio Communication Unit 220)

The radio communication unit 220 performs the radio communication with the UE 300 located in the pico cell 20.

For example, the radio communication unit 120 uses a plurality of frequency bands (that is, the CCs) to perform the radio communication.

(Network Communication Unit 230)

The network communication unit 230 communicates with another communication node. The other communication node includes, for example, the micro eNB 100. The other communication node includes another pico eNB 200. The other communication node includes a communication node of a core network. For example, the core network is an EPC and the communication node includes a MME and a S-GW (Storage Unit 240)

The storage unit 240 stores a program and data for an operation of the pico eNB 200.

(Processing Unit 250)

The processing unit 250 provides various functions of the pico eNB 200-1. The processing unit 250 includes an information acquisition unit 251 and a communication control unit 253.

(Information Acquisition Unit 251)

The information acquisition unit 251 acquires information necessary to control the communication control unit 253. For example, the information acquisition unit 251 acquires information from another device via the radio communication unit 220. For example, the information acquisition unit 251 acquires information stored in the storage unit 240.

For example, the information acquisition unit 251 acquires the priority information. In particular, in the first embodiment, the information acquisition unit 251 acquires the band use information. On the viewpoints, the information acquisition unit 251 is the same as the information acquisition unit 151 of the macro eNB 100-1.

(Communication Control Unit 253)

The communication control unit 253 performs control related to the radio communication in the pico cell 20.

Notification of Priority Information and Band Use Information

For example, the communication control unit 253 notifies a UE 300-1 of the priority information. In particular, in the first embodiment, the communication control unit 253 notifies the UE 300-1 of the band use information. On the viewpoints, the communication control unit 253 is the same as the communication control unit 153 of the macro eNB 100-1. However, the following points are taken into consideration.

The notification of the band use information to the UE 300-1 may be notification via the pico eNB 200. That is, the band use information may be notified of by the pico eNB 200 and may not be notified of by the macro eNB 100. In this case, the communication control unit 253 may notify the UE 300-1 of the band use information according to control of the macro eNB 100 or may autonomously notify the UE 300-1 of the band use information. Accordingly, it is possible to reduce a load on the macro eNB.

Notification of Adjustment Information

As described above, for example, in regard to the priority decided by the UE 300-1, the relative priority among the frequency bands (CCs) used in the macro cell 10 and the frequency bands (CCs) used in the pico cell 20 depends on a situation of the UE 300-1.

In this case, for example, the communication control unit 253 notifies the UE 300-1 of the adjustment information. On the viewpoints, the communication control unit 253 is the same as the communication control unit 153 of the macro eNB 100-1. However, the following points are taken into consideration.

Situation of UE: Communication Quality in CC for Macro Cell

The adjustment information notified of by the pico eNB 200-1 is generated based on a situation of the UE 300-1. For example, the situation of the UE 300-1 (for example, including a movement situation of the UE 300-1) does not include communication quality of the UE 200 in the CC for the macro cell.

The situation of the UE 300-1 may include the communication quality of the UE 200 in the CC for the macro cell. In this case, the communication control unit 253 may acquire the communication quality of the UE 200 in the CC for the macro cell from the macro eNB 100-1 or the UE 300-1.

Role Sharing of Notification

For example, the communication control unit 253 notifies the UE 300-1 using the CC for the pico cell as the PCC of the adjustment information. On the other hand, the macro eNB 100-1 notifies the UE 300-1 using the CC for the macro cell as the PCC of the adjustment information.

The communication control unit 253 may notify the UE 300-1 (that is, the UE 300-1 corresponding to scenario B) not using the CC for the macro cell of the adjustment information. In this case, the macro eNB 100-1 may notify the UE 300-1 (that is, the UE 300-1 corresponding to scenario A) using the CC for the macro cell of the adjustment information.

3.4. Configuration of UE

Figure 7:
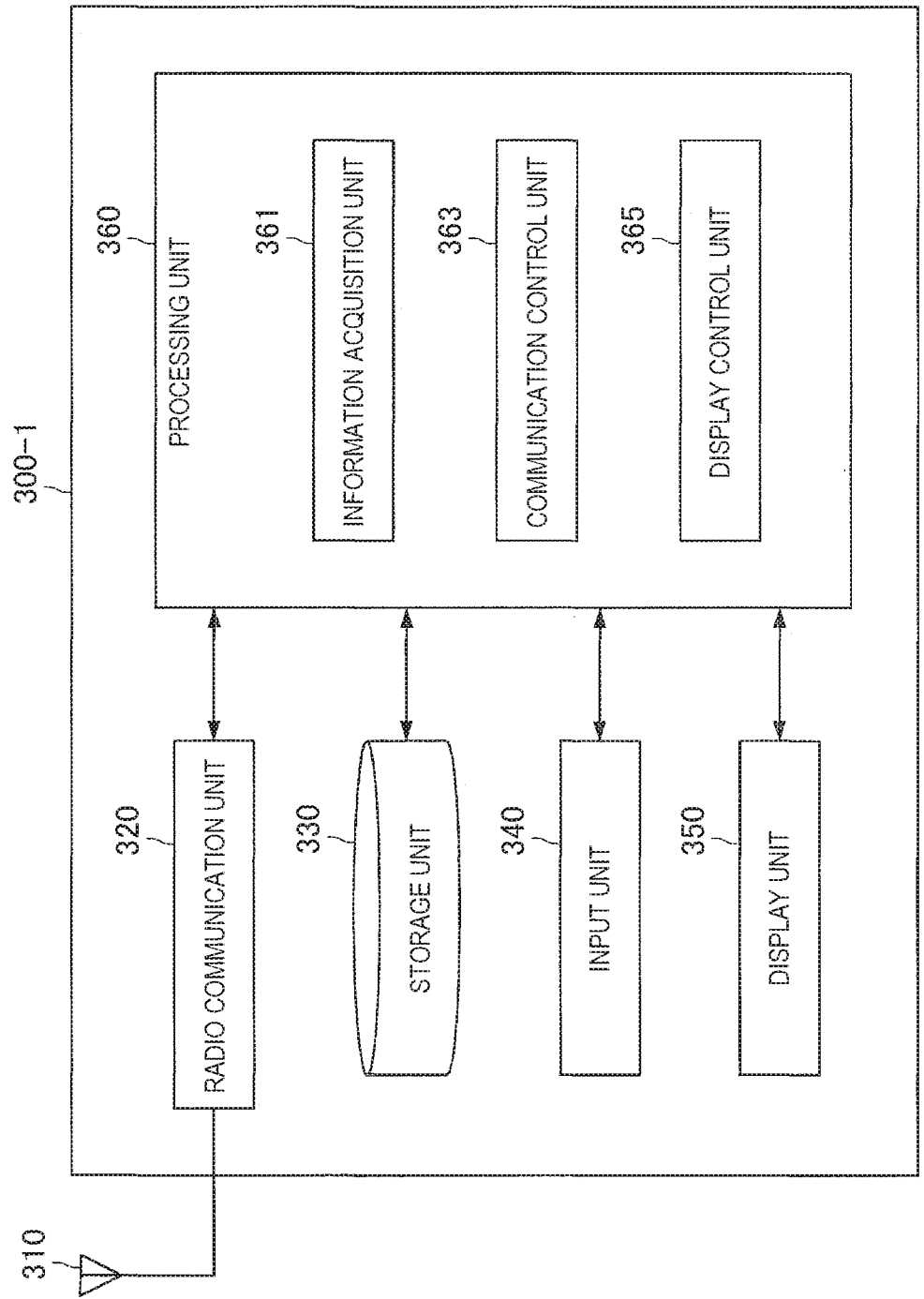
FIG. 7 is a block diagram illustrating an example of the configuration of a UE according to the first embodiment.

Next, the configuration of the UE 300-1 according to the first embodiment will be described with reference to FIG. 7. FIG. 7 is a block diagram illustrating an example of the configuration of the UE 300-1 according to the first embodiment. Referring to FIG. 7, the UE 300-1 includes an antenna unit 310, a radio communication unit 320, a storage unit 330, an input unit 340, a display unit 350, and a processing unit 360.

(Antenna Unit 310)

The antenna unit 310 receives a radio signal and outputs the received radio signal to the radio communication unit 320. The antenna unit 310 transmits a transmission signal output by the radio communication unit 320.

(Radio Communication Unit 320)

The radio communication unit 320 performs radio communication with the macro eNB 100 when the UE 300 is located in the macro cell 10. The radio communication unit 320 performs radio communication with the pico eNB 200 when the UE 300 is located in the pico cell 20.

For example, the radio communication unit 320 uses the plurality of frequency bands (that is, the CCs) to perform the radio communication. Specifically, for example, the radio communication unit 320 uses the plurality of CCs for the macro cell to perform the radio communication with the macro eNB 100. For example, the radio communication unit 320 uses the plurality of CCs for the pico cell to perform the radio communication with the pico eNB 200. For example, while the radio communication unit 320 uses one or more CCs for the macro cell to perform the radio communication with the macro eNB 100, the radio communication unit 320 uses one or more CCs for the pico cell to perform the radio communication with the pico eNB 200.

(Storage Unit 330)

The storage unit 330 stores a program and data for an operation of the UE 300.

(Input Unit 340)

The input unit 340 receives an input by a user of the UE 300. Then, the input unit 340 supplies an input result to the processing unit 360.

(Display Unit 350)

The display unit 350 displays an output screen (that, an output image) from the UE 300. For example, the display unit 350 displays the output screen according to control by the processing unit 360 (a display control unit 365).

(Processing Unit 360)

The processing unit 360 supplies various functions of the UE 300-1. The processing unit 360 includes an information acquisition unit 361, a communication control unit 363, and the display control unit 365.

(Information Acquisition Unit 361)

The information acquisition unit 361 acquires information necessary for control by the communication control unit 363. For example, the information acquisition unit 361 acquires information from another device via the radio communication unit 320. For example, the information acquisition unit 361 acquires information stored in the storage unit 330.

Acquisition of Priority Information and Band Use Information

For example, the information acquisition unit 361 acquires the priority information when the priority information is notified of by the macro eNB 100-1 or the pico eNB 200-1.

In particular, in the first embodiment, the information acquisition unit 361 acquires the band use information when the band use information is notified by the macro eNB 100-1 or the pico eNB 200-1.

Specifically, for example, the whitelist indicating whether each CC is the CC for the macro cell or the CC for the pico cell is notified of by the macro eNB 100-1 or the pico eNB 200-1. That is, the whitelist includes both of the band use information and the priority information. The information acquisition unit 361 acquires the whitelist via the radio communication unit 320.

Acquisition of Adjustment Information

For example, the information acquisition unit 361 acquires the adjustment information when the adjustment information is notified of by the macro eNB 100-1 or the pico eNB 200-1.

Specifically, for example, when the UE 300-1 uses the CC for the macro cell as the PCC, the macro eNB 100-1 notifies the UE 300-1 of the adjustment information. Then, the information acquisition unit 361 acquires the adjustment information via the radio communication unit 320. For example, when the UE 300-1 uses the CC for the pico cell as the PCC, the pico eNB 200-1 notifies the UE 300-1 of the adjustment information. Then, the information acquisition unit 361 acquires the adjustment information via the radio communication unit 320.

(Communication Control Unit 363)

The communication control unit 363 performs control related to the radio communication by the UE 300-1.

In particular, in the first embodiment, the communication control unit 363 controls the radio communication based on the band use information. For example, the communication control unit 363 decides the priority of the measurement among the plurality of frequency bands (CCs) based on the band use information (and the priority information). Specifically, for example, the communication control unit 363 decides the priority of the measurement among the plurality of CCs based on the whitelist indicating whether each CC is the CC for the macro cell or the CC for the pico cell.

For example, the communication control unit 363 decides the priority of the measurement among the plurality of frequency bands (CCs) based on the adjustment information.

Specifically, for example, when the adjustment information indicates the increase in the priority of the measurement of the CCs for the macro cell, the communication control unit 363 adjusts the relative priority among the CCs for the macro cell and the CCs for the pico cell by increasing the priority of some or all of the CCs for the macro cell in the acquired whitelist. Then, the communication control unit 363 decides the adjusted priority in the whitelist as the final priority.

For example, when the adjustment information indicates the increase in the priority of the measurement of the CCs for the pico cell, the communication control unit 363 adjusts the relative priority by increasing the priority of some or all of the CCs for the pico cell in the acquired whitelist. Then, the communication control unit 363 decides the adjusted priority in the whitelist as the final priority.

(Display Control Unit 365)

The display control unit 365 controls display of an output screen by the display unit 350. For example, the display control unit 365 generates an output screen to be displayed by the display unit 350 and causes the display unit 350 to display the output screen.

3.5 Flow of Process

Next, examples of the communication control process according to the first embodiment will be described with reference to FIGS. 8 to 12.

(First Communication Control Process: Notification of Whitelist (eNB))

Figure 8:
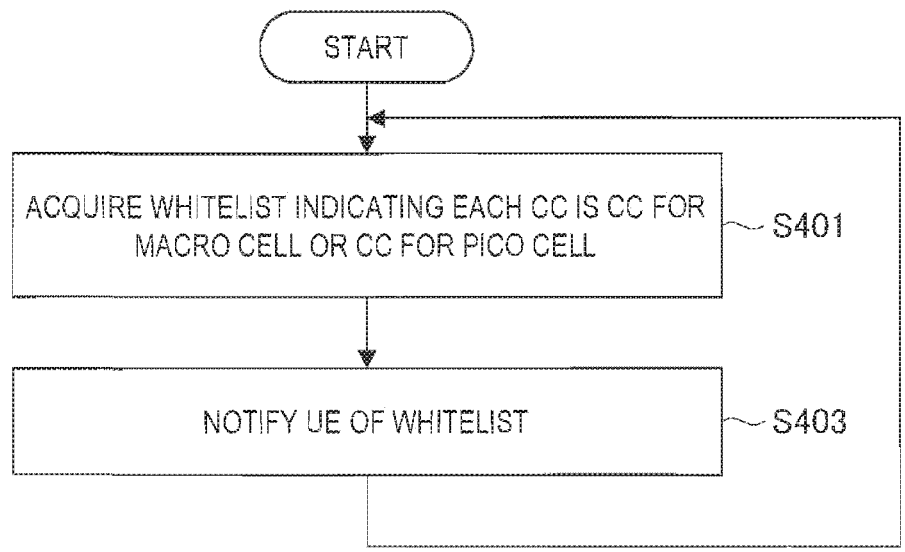
FIG. 8 is a flowchart illustrating an example of a schematic flow of a first communication control process according to the first embodiment.

FIG. 8 is a flowchart illustrating an example of a schematic flow of a first communication control process according to the first embodiment. The first communication control process is a whitelist notification process according to the first embodiment and is performed by the macro eNB 100-1. The first communication control process can also be performed by the pico eNB 200-1.

In step S401, the information acquisition unit 151 acquires the whitelist indicating whether each CC is the CC for the macro cell or the CC for the pico cell.

Next, in step S403, the communication control unit 153 notifies the UE 300-1 of the whitelist. Then, the process returns to step S401.

(Second Communication Control Process: Generation and Notification of Adjustment Information (Macro eNB))

First Example

Figure 9:
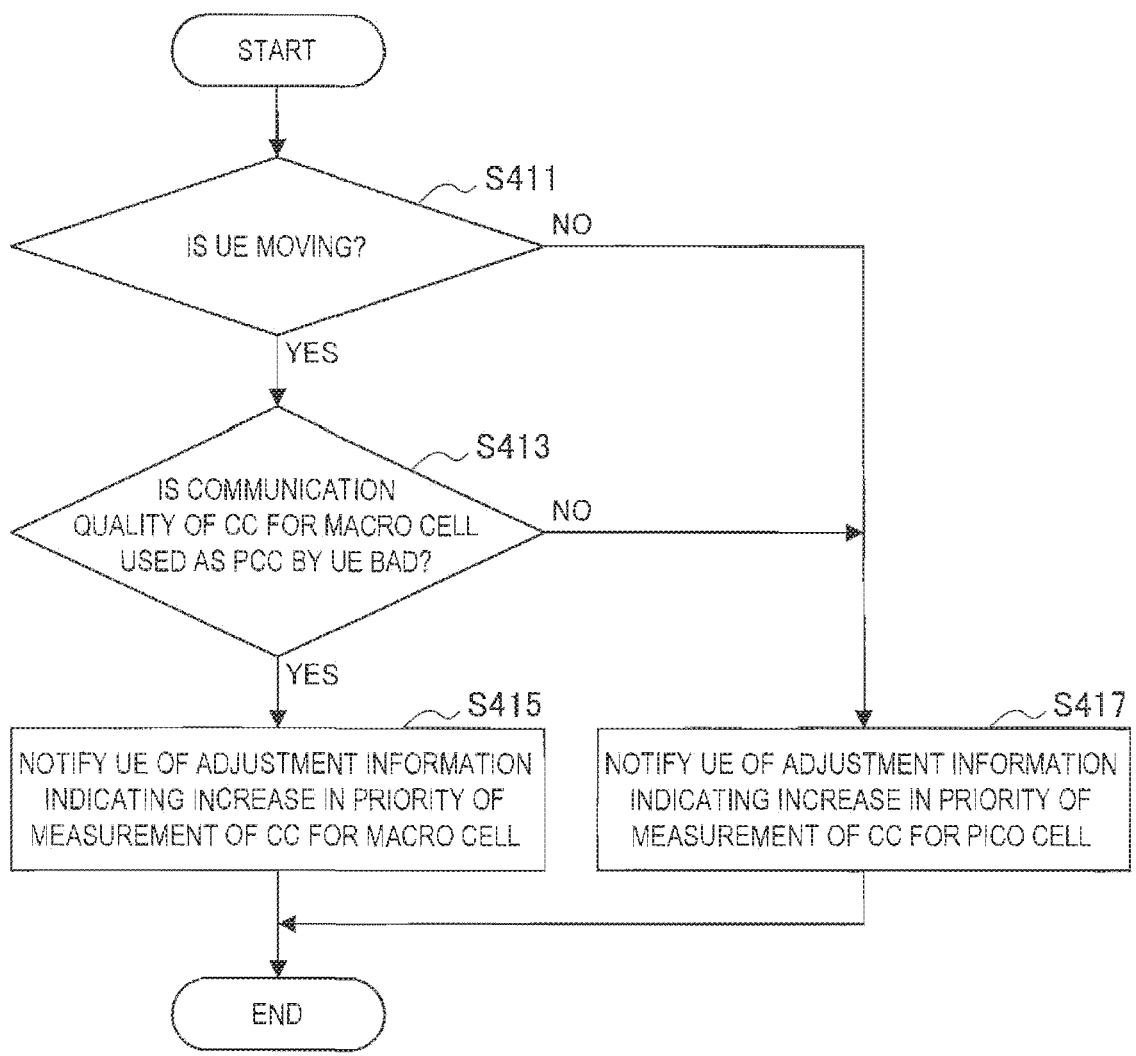
FIG. 9 is a flowchart illustrating a first example of a schematic flow of a second communication control process according to the first embodiment.

FIG. 9 is a flowchart illustrating a first example of a schematic flow of a second communication control process according to the first embodiment. The second communication control process is an adjustment information notification process according to the first embodiment and is performed by the macro eNB 100-1. The second communication control process is performed when the UE 300-1 uses the CC for the macro cell as the PCC.

In step S411, the communication control unit 153 determines whether the UE 300-1 is moving. When the UE 300-1 is determined to be moving, the process proceeds to step S413. Otherwise, the process proceeds to step S417.

In step S413, the communication control unit 153 determines whether the communication quality of the CC for the macro cell used as the PCC by the UE 300-1 is bad. When the communication quality is determined to be bad, the process proceeds to step S415. Otherwise, the process proceeds to step S417.

In step S415, the communication control unit 153 notifies the UE 300-1 of the adjustment information indicating the increase in the priority of the measurement of the CC for the macro cell. Then, the process ends.

In step S417, the communication control unit 153 notifies the UE 300-1 of the adjustment information indicating the increase in the priority of the measurement of the CC for the pico cell. Then, the process ends.

Second Example

Figure 10:
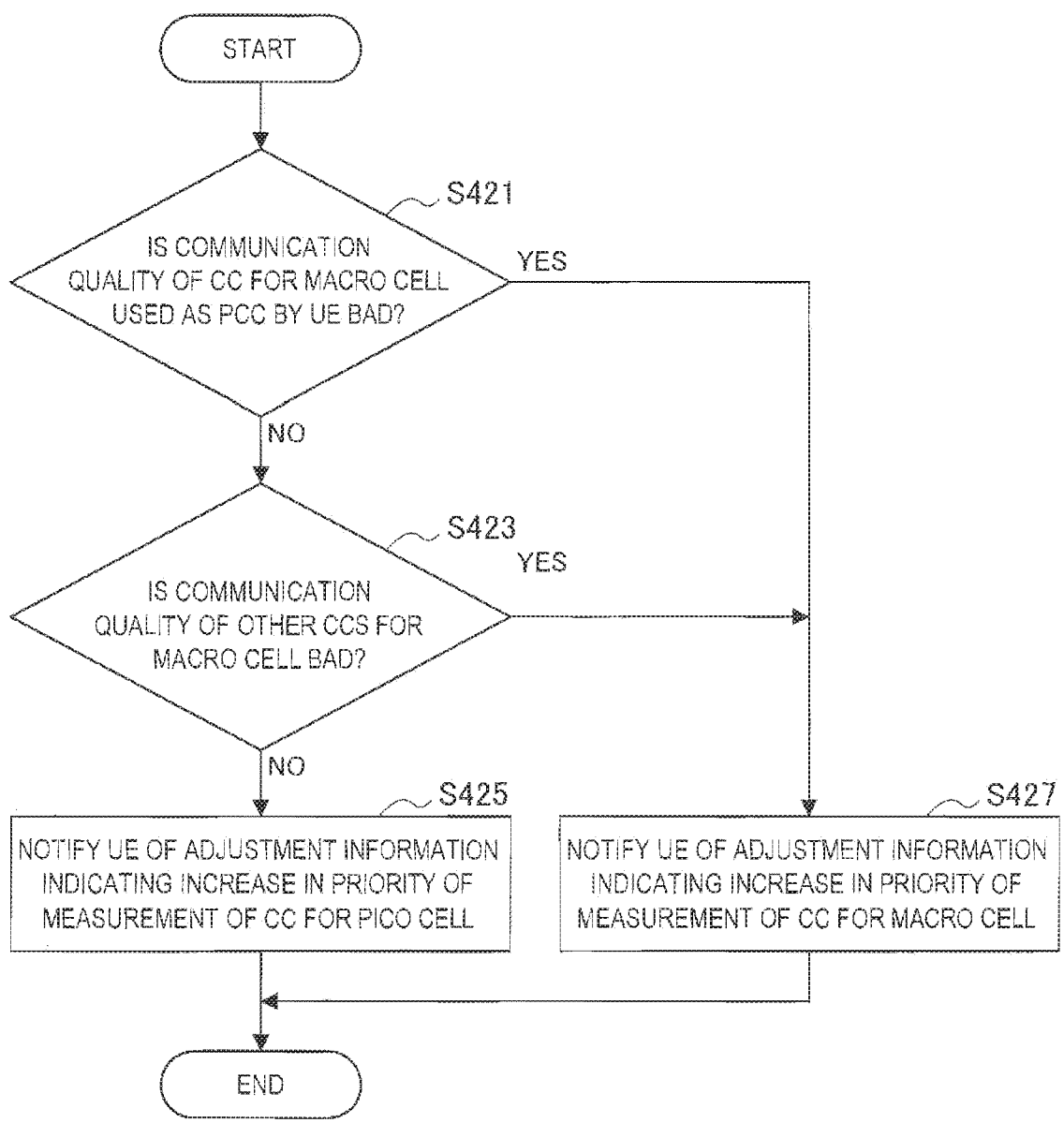
FIG. 10 is a flowchart illustrating a second example of a schematic flow of a second communication control process according to the first embodiment.

FIG. 10 is a flowchart illustrating a second example of a schematic flow of the second communication control process according to the first embodiment.

In step S421, the communication control unit 153 determines whether the communication quality of the CC for the macro cell used as the PCC by the UE 300-1 is bad. When the communication quality is determined to be bad, the process proceeds to step S427. Otherwise, the process proceeds to step S423.

In step S423, the communication control unit 153 determines whether the communication quality of the other CCs for the macro cell is bad. When the communication quality is determined to be bad, the process proceeds to step S427. Otherwise, the process proceeds to step S425.

In step S425, the communication control unit 153 notifies the UE 300-1 of the adjustment information indicating the increase in the priority of the measurement of the CC for the pico cell. Then, the process ends.

In step S427, the communication control unit 153 notifies the UE 300-1 of the adjustment information indicating the increase in the priority of the measurement of the CC for the macro cell. Then, the process ends.

(Third Communication Control Process: Generation and Notification of Adjustment Information (Pico eNB))

Figure 11:
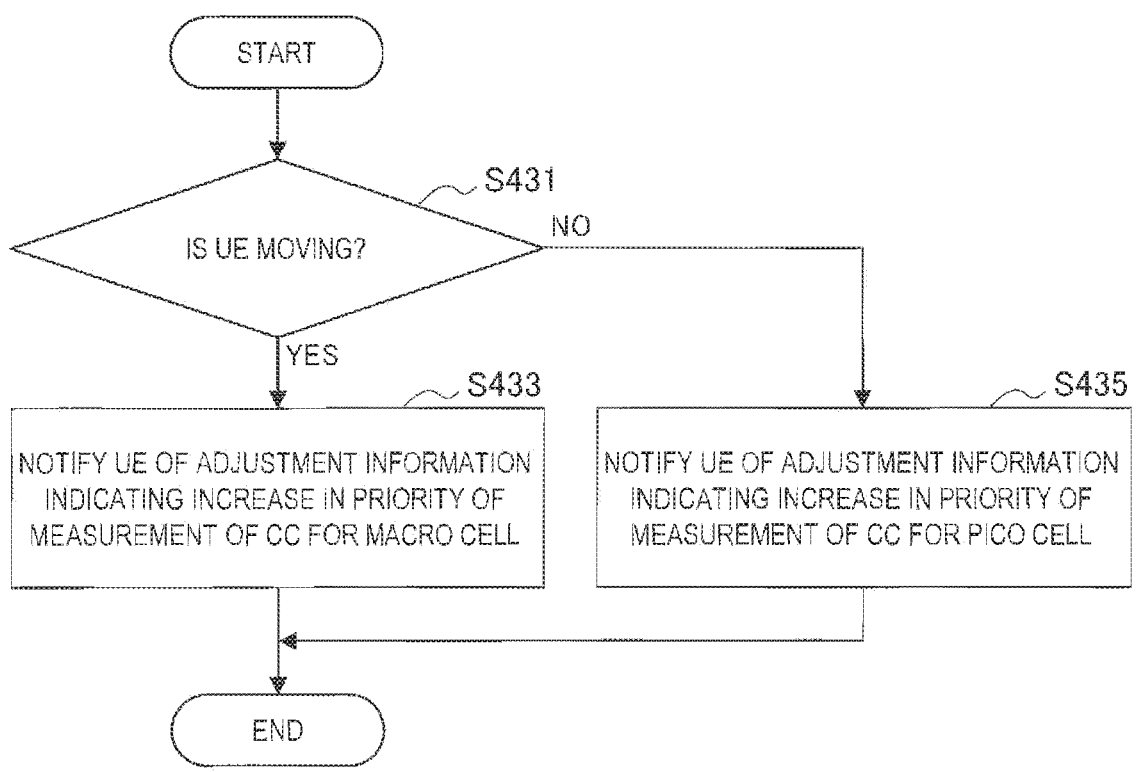
FIG. 11 is a flowchart illustrating an example of a schematic flow of a third communication control process according to the first embodiment.

FIG. 11 is a flowchart illustrating an example of a schematic flow of a third communication control process according to the first embodiment. The third communication control process is an adjustment information notification process according to the first embodiment and is performed by the pico eNB 200-1. The third communication control process is performed when the UE 300-1 uses the CC for the pico cell as the PCC.

In step S431, the communication control unit 253 determines whether the UE 300-1 is moving. When the UE 300-1 is determined to be moving, the process proceeds to step S433. Otherwise, the process proceeds to step S435.

In step S433, the communication control unit 253 notifies the UE 300-1 of the adjustment information indicating the increase in the priority of the measurement of the CC for the macro cell. Then, the process ends.

In step S435, the communication control unit 253 notifies the UE 300-1 of the adjustment information indicating the increase in the priority of the measurement of the CC for the pico cell. Then, the process ends.

(Fourth Communication Control Process: Decision of Priority of Measurement (UE))

Figure 12:
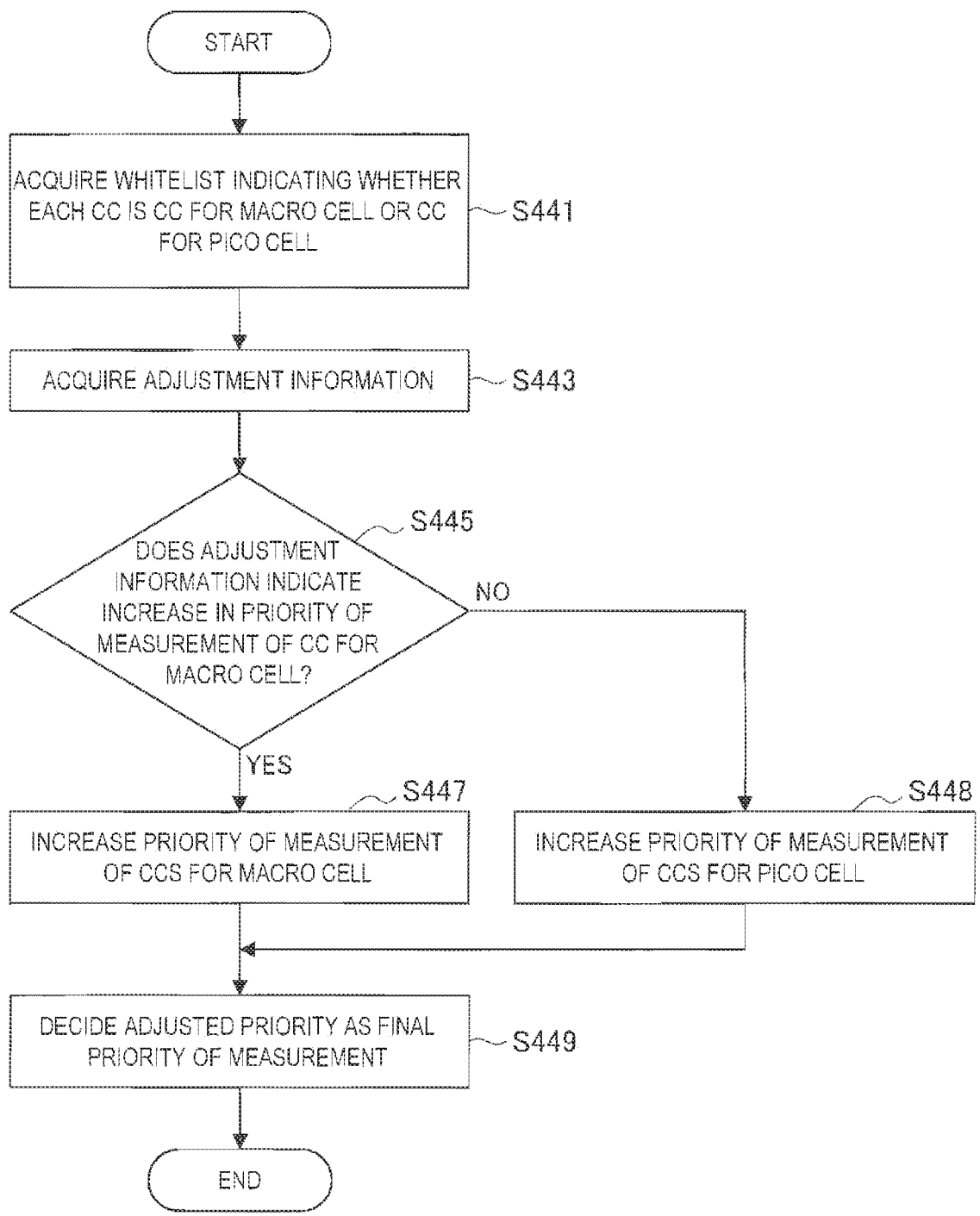
FIG. 12 is a flowchart illustrating an example of a schematic flow of a fourth communication control process according to the first embodiment.

FIG. 12 is a flowchart illustrating an example of a schematic flow of a fourth communication control process according to the first embodiment. The fourth communication control process is a process of deciding the priority of the measurement according to the first embodiment and is performed by the UE 300-1.

In step S441, the information acquisition unit 361 acquires the whitelist indicating whether each CC is the CC for the macro cell or the CC for the pico cell via the radio communication unit 320.

In step S443, the information acquisition unit 361 acquires the adjustment information via the radio communication unit 320.

In step S445, the communication control unit 363 determines whether the adjustment information indicates the increase in the priority of the measurement of the CC for the macro cell. When the adjustment information indicates the increase in the priority of the measurement of the CC for the macro cell, the process proceeds to step S447. Otherwise (that is, the adjustment information indicates the increase in the priority of the measurement of the CC for the pico cell), the process proceeds to step S448.

In step S447, the communication control unit 363 adjusts the relative priority among the CCs for the macro cell and the CCs for the pico cell by increasing the priority of some or all of the CCs for the macro cell in the acquired whitelist.

In step S448, the communication control unit 363 adjusts the relative priority among the CCs for the pico cell and the CCs for the pico cell by increasing the priority of some or all of the CCs for the macro cell in the acquired whitelist.

In step S449, the communication control unit 363 decides the adjusted priority in the whitelist as the final priority.

Then, the process ends.

3.6 First Modification Example

Next, a first modification example of the first embodiment will be described. According to the first modification example, the macro eNB 100-1 and the pico eNB 100-1 do not notify the UE 300-1 of the adjustment information, and the UE 300-1 adjusts the relative priority among the CCs for the macro cell and the CCs for the pico cell not based on the adjustment information but based on a situation of the UE 300-1 itself (Macro eNB 100-1: Communication Control Unit 153)

Notification of Adjustment Information

In particular, in the first modification example of the first embodiment, the communication control unit 153 does not generate the adjustment information and does not notify the UE 300-1 of the adjustment information.

(Pico eNB 100-1: Communication Control Unit 253)

Notification of Adjustment Information

In particular, in the first modification example of the first embodiment, the communication control unit 253 does not generate the adjustment information and does not notify the UE 300-1 of the adjustment information.

(UE 300-1: Information Acquisition Unit 361)

Acquisition of Adjustment Information

In particular, in the first modification example of the first embodiment, the information acquisition unit 361 does not acquire the adjustment information.

(UE 300-1: Communication Control Unit 363)

Even in the modification example of the first embodiment, as described above, the communication control unit 363 decides the priority of the measurement among the plurality of frequency bands (CCs) based on the band use information (and the priority information). Specifically, for example, the communication control unit 363 decides the priority of the measurement among the plurality of CCs based on the whitelist indicating whether each CC is the CC for the macro cell or the CC for the pico cell.

In particular, in the first modification example of the first embodiment, the communication control unit 363 decides the priority of the measurement among the plurality of frequency bands (CCs) and adjusts the relative priority among the frequency bands (CCs) used in the macro cell 10 and the frequency bands (CCs) used in the pico cell 20 based on the situation of the UE 300-1. That is, the UE 300-1 adjusts the relative priority among the CCs for the macro cell and the CCs for the pico cell not based on the adjustment information from the macro eNB 100-1 or the pico eNB 200-1 but based on the situation of the UE 300-1 itself Situation of UE: Movement Situation For example, the situation of the UE 300-1 includes a movement situation of the UE 300-1.

Specifically, for example, the UE 300-1 is not moving. In this case, the communication control unit 363 adjusts the relative priority by increasing the priority of some or all of the CCs for the pico cell in the acquired whitelist. Then, the communication control unit 363 decides the adjusted priority in the whitelist as the final priority.

Accordingly, for example, when the UE 300-1 is located in the pico cell 20, the UE 300-1 preferentially performs measurement in the CC of the pico cell 20. Therefore, for example, when the UE 300-1 uses only the CC for the pico cell (that is, in the case of scenario B), there is a low possibility of the UE 300-1 performing the measurement in the CC for the macro cell. As a result, there is a low possibility of the measurement gap being provided, and thus the throughput of the UE 300-1 can be improved. Further, there is a high possibility of the UE 300-1 using the CC of the pico cell 20 as the PCC and/or the SCC. As a result, offloading of traffic in the macro cell can be realized.

Situation of UE: Communication Quality in CC for Macro Cell

For example, the situation of the UE 300-1 includes communication quality of the UE 300-1 in the frequency band (CC) used in the macro cell 10.

Specifically, for example, the UE 300-1 is moving and the communication quality in the CC for the macro cell used as the PCC by the UE 300-1 is bad. In this case, the communication control unit 363 adjusts the relative priority among the CCs for the macro cell and the CCs for the pico cell by increasing the priority of some or all of the CCs for the macro cell in the acquired whitelist. Then, the communication control unit 363 decides the adjusted priority in the whitelist as the final priority.

For example, the communication quality in the CC for the macro cell used as the PCC by the UE 300-1 is bad, or even when the communication quality is good, the communication quality in the other CCs for the macro cell is not good. In this case, the communication control unit 363 may adjust the relative priority among the CCs for the macro cell and the CCs for the pico cell by increasing the priority of some or all of the CCs for the macro cell in the acquired whitelist. Then, the communication control unit 363 may decide the adjusted priority in the whitelist as the final priority.

By adjusting the priority of the measurement based on the communication quality of the UE 300-1 in the CCs for the macro cell in this way, the measurement of the other CCs for the macro cell is preferentially performed, for example, even when the communication quality of the UE 300-1 in the CC for the macro cell is bad. Therefore, even when the PCC is switched, there is a higher possibility of the PCC being switched from the CC for the macro cell to another CC for the macro cell. As a result, there is a low possibility of the PCC being switched to the CC for the pico cell and being subsequently further switched to the CC for the macro cell. That is, the frequency of handover is suppressed.

As described above, the UE 300-1 adjusts the relative priority among the CCs for the macro cell and the CCs for the pico cell based on the situation of the UE 300-1.

Accordingly, the UE 300-1 can perform more preferable measurement performed according to the situation of the UE 300-1. As a result, when the pico cell 20 is disposed, the radio communication of the UE 300-1 can be improved. Since the process of each UE 300-1 is performed on the side of the UE 300-1, it is possible to reduce a load on the eNB side.

(Flow of Process: Decision of Priority of Measurement (UE))

Figure 13:
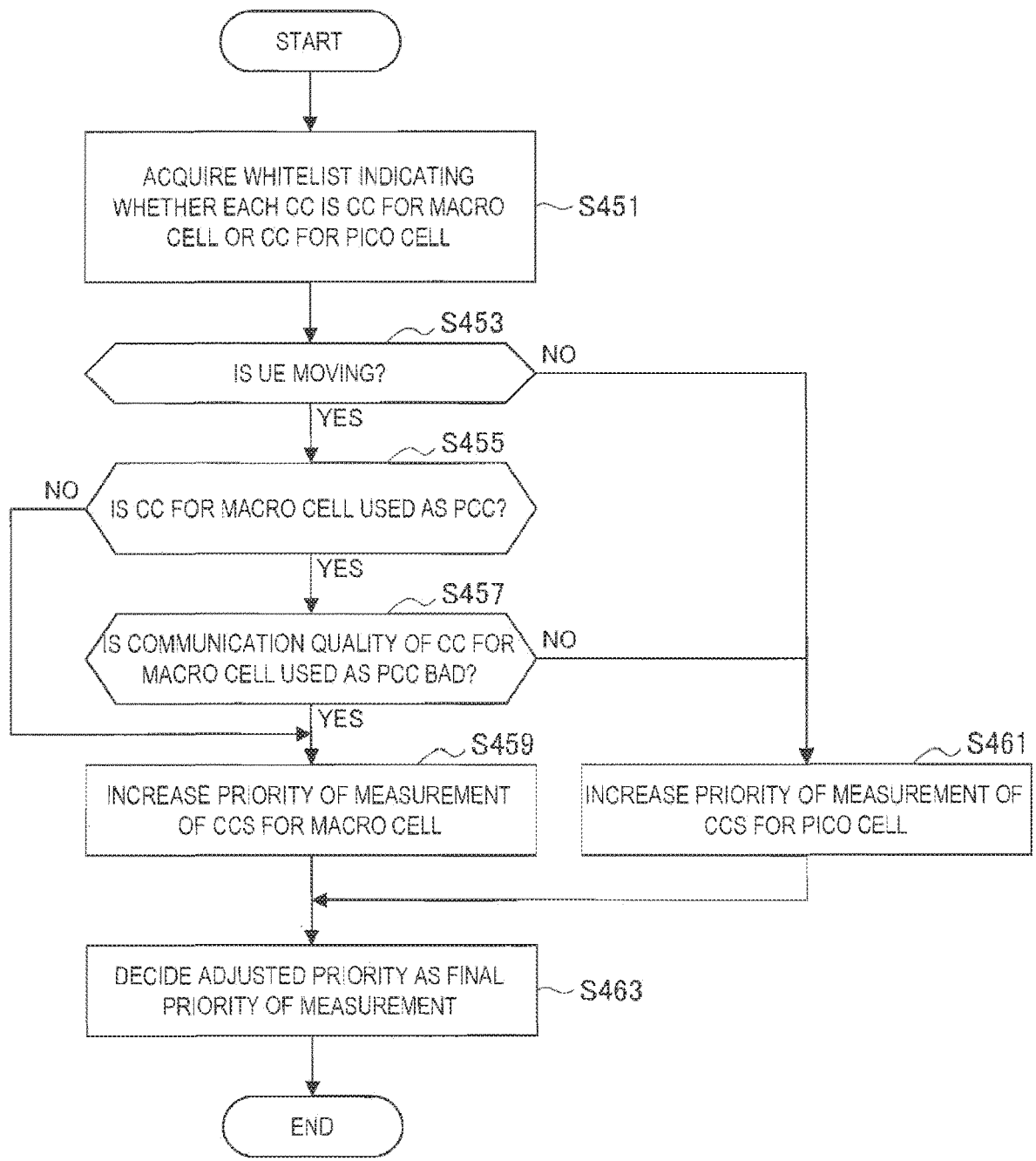
FIG. 13 is a flowchart illustrating an example of a schematic flow of a communication control process according to a first modification example of the first embodiment.

FIG. 13 is a flowchart illustrating an example of a schematic flow of a communication control process according to the first modification example of the first embodiment. The communication control process is a process of deciding the priority of the measurement according to the first modification example of the first embodiment and is performed by the UE 300-1.

In step S451, the information acquisition unit 361 acquires the whitelist indicating whether each CC is the CC for the macro cell or the CC for the pico cell via the radio communication unit 320.

In step S453, the communication control unit 363 determines whether the UE 300-1 is moving. When the UE 300-1 is determined to be moving, the process proceeds to step S455. Otherwise, the process proceeds to step S461.

In step S455, the communication control unit 363 determines whether the UE 300-1 uses the CC for the macro cell as the PCC. When the UE 300-1 uses the CC for the macro cell as the PCC, the process proceeds to step S457. Otherwise, the process proceeds to step S459.

In step S457, the communication control unit 363 determines whether the communication quality of the CC for the macro cell used as the PCC by the UE 300-1 is bad. When the communication quality is determined to be bad, the process proceeds to step S459. Otherwise, the process proceeds to step S461.

In step S459, the communication control unit 363 adjusts the relative priority among the CCs for the macro cell and the CCs for the pico cell by increasing the priority of some or all of the CCs for the macro cell in the acquired whitelist.

In step S461, the communication control unit 363 adjusts the relative priority among the CCs for the pico cell and the CCs for the pico cell by increasing the priority of some or all of the CCs for the macro cell in the acquired whitelist.

In step S463, the communication control unit 363 decides the adjusted priority in the whitelist as the final priority. Then, the process ends.

3.7 Second Modification Example

Next, a second modification example of the first embodiment will be described. According to the second modification example, the macro eNB 100-1 and the pico eNB 100-1 do not notify of the adjustment information and notify individual priority information (whitelist) of each UE 300 in which the relative priority among the CCs for the macro cell and the CCs for the pico cell is adjusted.

(Macro eNB 100-1: Information Acquisition Unit 151)

In the second modification example of the first embodiment, as described above, the information acquisition unit 151 also acquires the band use information.

(Macro eNB 100-1: Communication Control Unit 153)

Notification of Priority Information and Band Use Information

In the second modification example of the first embodiment, as described above, the communication control unit 153 notifies the UE 300-1 of the band use information.

In particular, in the second modification example of the first embodiment, the communication control unit 153 acquires priority information indicating the priority of the measurement among the plurality of frequency bands (CCs). The priority information is individual information of each UE 300-1.

As described above, for example, in regard to the priority decided by the UE 300-1, the relative priority among the frequency bands (CCs) used in the macro cell 10 and the frequency bands (CCs) used in the pico cell 20 depends on a situation of the UE 300-1. In the second modification example of the first embodiment, the individual priority information of each UE 300-1 is the priority information in which the relative priority among the frequency bands (CCs) used in the macro cell 10 and the frequency bands (CCs) used in the pico cell 20 is adjusted based on the situation of the UE 300-1.

Specifically, for example, in the second modification example of the first embodiment, the macro eNB 100-1 (the communication control unit 153) adjusts the relative priority of the CCs for the macro cell and the CCs for the pico cell based on the situation of the UE 300-1, and then notifies the UE 300 of the adjusted whitelist of each UE 300.

Accordingly, the UE 300-1 can perform the measurement according to the priority in the notified whitelist. Therefore, it is possible to control the measurement of the UE 300-1 from a network side more reliably. Further, installation of the UE 300-1 is further simplified.

(Pico eNB 200-1: Information Acquisition Unit 251)

In the second modification example of the first embodiment, the information acquisition unit 251 of the pico eNB 200-1 also performs the same operation as the above-described operation of the information acquisition unit 151 of the macro eNB 100-1.

(Pico eNB 200-1: Communication Control Unit 253)

In the second modification example of the first embodiment, the communication control unit 253 of the pico eNB 200-1 also performs the same operation as the above-described operation of the communication control unit 153 of the macro eNB 100-1.

(Flow of Process: Notification of Whitelist (Macro eNB))

Figure 14:
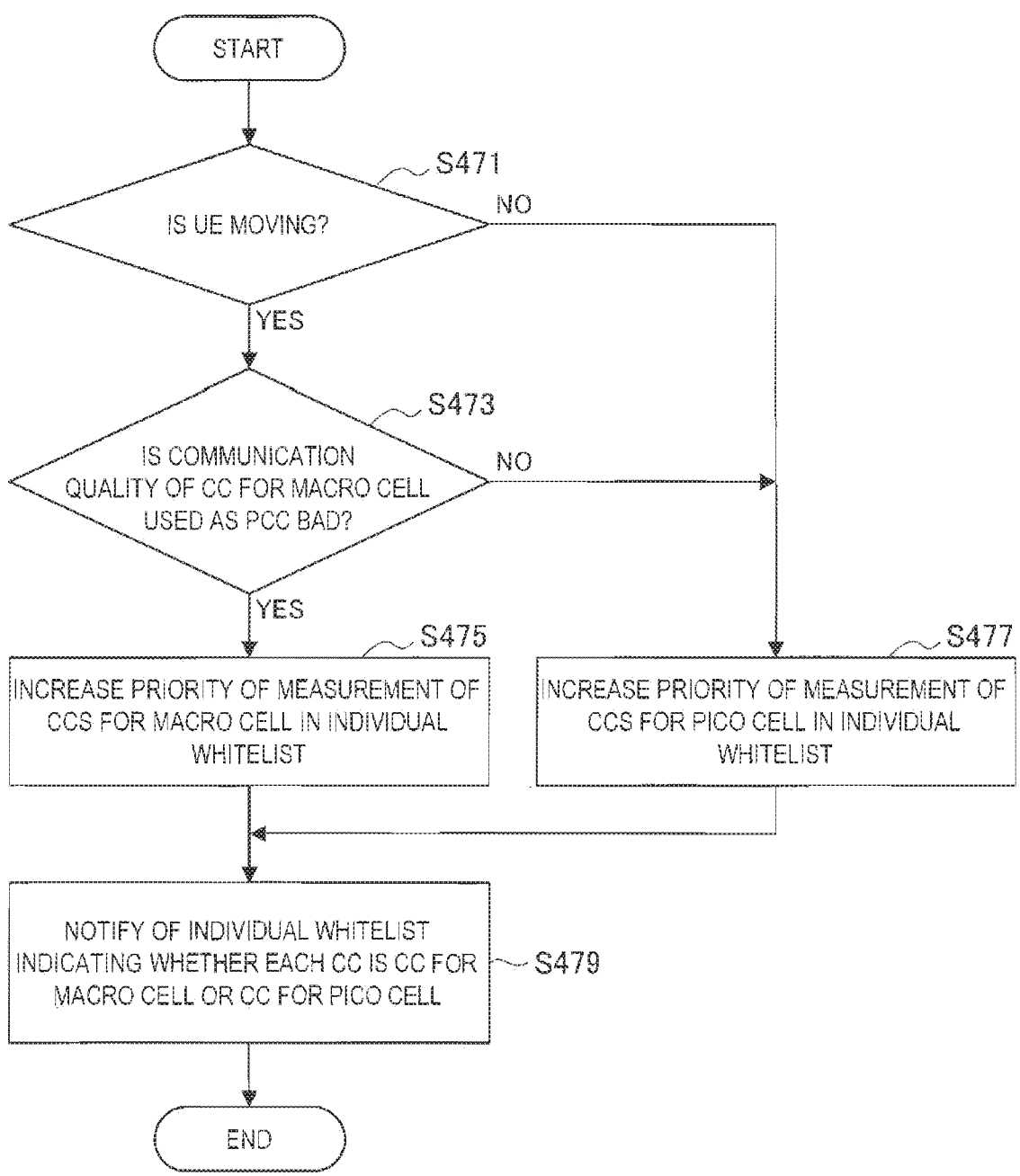
FIG. 14 is a flowchart illustrating an example of a schematic flow of a first communication control process according to a second modification example of the first embodiment.

FIG. 14 is a flowchart illustrating an example of a schematic flow of a first communication control process according to the second modification example of the first embodiment. The first communication control process is a whitelist notification process according to the second modification example of the first embodiment and is performed by the macro eNB 100-1. The first communication process is performed when the UE 300-1 uses the CC for the macro cell as the PCC.

In step S471, the communication control unit 153 determines whether the UE 300-1 is moving. When the UE 300-1 is determined to be moving, the process proceeds to step S473. Otherwise, the process proceeds to step S477.

In step S473, the communication control unit 153 determines whether the communication quality of the CC for the macro cell used as the PCC by the UE 300-1 is bad. When the communication quality is determined to be bad, the process proceeds to step S475. Otherwise, the process proceeds to step S477.

In step S475, the communication control unit 153 adjusts the relative priority among the CCs for the macro cell and the CCs for the pico cell by increasing the priority of some or all of the CCs for the macro cell in the notified whitelist.

In step S477, the communication control unit 153 adjusts the relative priority among the CCs for the macro cell and the CCs for the pico cell by increasing the priority of some or all of the CCs for the pico cell in the notified whitelist.

In step S479, the communication control unit 153 notifies the UE 300-1 of the adjusted whitelist. Then, the process ends.

(Flow of Process: Notification of Whitelist (Pico eNB))

Figure 15:
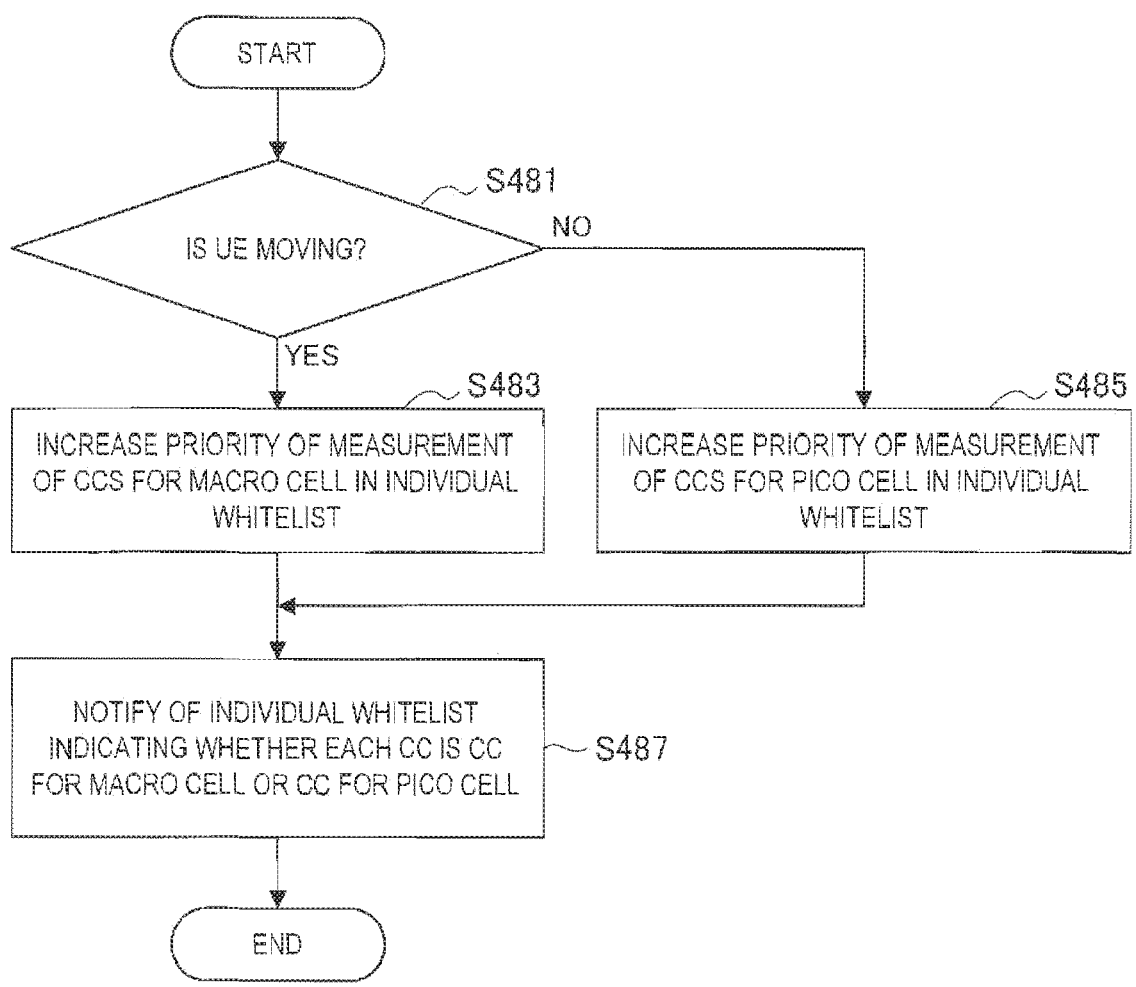
FIG. 15 is a flowchart illustrating an example of a schematic flow of a second communication control process according to a second modification example of the first embodiment.

FIG. 15 is a flowchart illustrating an example of a schematic flow of a second communication control process according to the second modification example of the first embodiment. The second communication control process is a whitelist notification process according to the second modification example of the first embodiment and is performed by the pico eNB 200-1. The second communication process is performed when the UE 300-1 uses the CC for the pico cell as the PCC.

In step S481, the communication control unit 253 determines whether the UE 300-1 is moving. When the UE 300-1 is determined to be moving, the process proceeds to step S483. Otherwise, the process proceeds to step S485.

In step S483, the communication control unit 253 adjusts the relative priority among the CCs for the macro cell and the CCs for the pico cell by increasing the priority of some or all of the CCs for the macro cell in the notified whitelist.

In step S485, the communication control unit 253 adjusts the relative priority among the CCs for the macro cell and the CCs for the pico cell by increasing the priority of some or all of the CCs for the pico cell in the notified whitelist.

In step S487, the communication control unit 253 notifies the UE 300-1 of the adjusted whitelist. Then, the process ends.

4. Second Embodiment

Next, a second embodiment of the present disclosure will be described with reference to FIGS. 16 to 20.

4.1 Overview

Problem

A macro cell is a broad region. Therefore, when a UE enters the macro cell, the UE stays in the macro cell for a relatively long time in many cases even when the UE is moving. Therefore, when handover of a PCC is handover to a CC for the macro cell or handover from a CC for the macro cell in the case of the carrier aggregation, there is an enough time to perform processes accompanied with the handover of the PCC. For example, at the time of the handover to the CC for the macro cell, there is an enough time to perform a process (synchronization, measurement, activation, or the like) of adding an SCC after the handover. For example, at the time of the handover to the CC for the macro cell, there is an enough time to perform a process (deactivation or the like) of releasing an SCC before the handover.

On the other hand, a pico cell is a narrower region than a macro cell. Therefore, even when a UE enters the pico cell, the UE can be away from the pico cell for a short time. In particular, when the UE is moving, the UE can be away from the pico cell for a short time. For this reason, when handover of a PCC is handover to a CC for the pico cell or handover from a CC for the pico cell in the case of the carrier aggregation, there is a possibility of not much time being made to perform processes accompanied with the handover. For example, at the time of the handover to the CC for the pico cell, there is a possibility of not much time being made to perform a process (synchronization, measurement, activation, or the like) of adding an SCC after the handover. Further, at the time of the handover from the CC for the pico cell, there is a possibility of not much time being made to perform a process (deactivation, or the like) of releasing an SCC before the handover. In particular, when the maximum number of SCCs (that is, four SCCs) is used, a process for the maximum number of SCCs is necessary, and thus this process may be difficult.

Even when a UE is located in a pico cell, a CC for a macro cell can also be considered to be used as a PCC. However, for example, when the pico cell is disposed indoors out of the coverage of the macro cell, the UE use only the CC for the pico cell without using the CC for the macro cell. That is, a scenario of a small cell in the UE is scenario B. For example, in this case, the UE uses the CC for the pico cell as the PCC. As described above, when the CC for the pico cell is used as the PCC, there is a concern of not enough time to perform processes accompanied with handover of the PCC.

Accordingly, in the second embodiment, when the frequency band (the CC for the pico cell) used for the pico cell is used as one main frequency band (PCC), the processes accompanied with the handover can be reduced.

Solution

According to the second embodiment, when the UE uses the CC for the pico cell as the PCC, the maximum number of CCs used as the SCCs by the UE is restricted to a smaller number.

Accordingly, for example, even when the UE uses the CC for the pico cell as the PCC, a process of adding the SCC after the handover of the PCC to the CC for the pico cell and a process of releasing the SCC before the handover of the PCC from the CC for the pico cell are reduced. That is, when the CC for the pico cell is used as the PCC, the processes accompanied with the handover are reduced.

4.2. Configuration of Macro eNB

Figure 16:
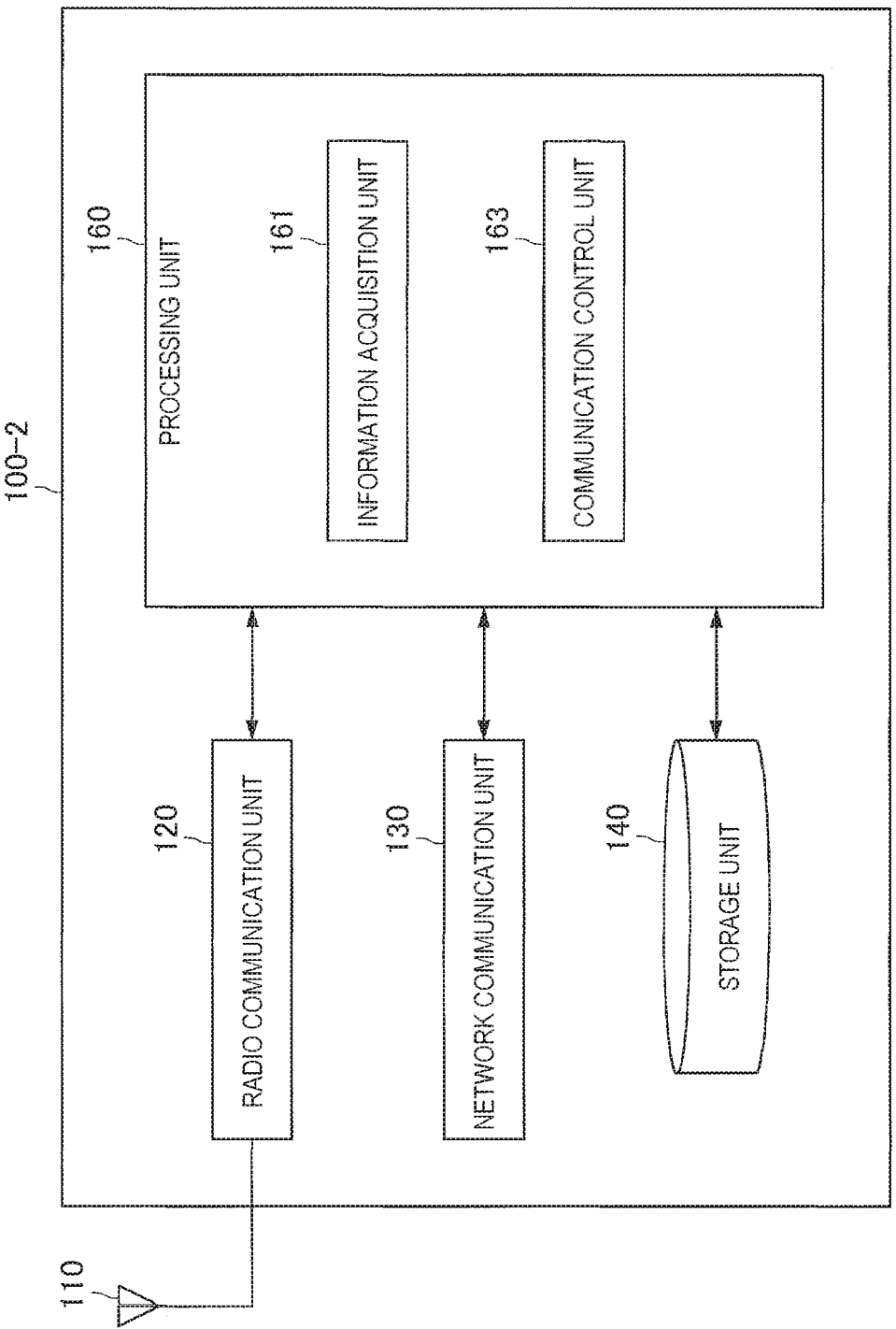
FIG. 16 is a block diagram illustrating an example of the configuration of a macro eNB according to a second embodiment.

Next, the example of the configuration of the macro eNB 100-2 according to the second embodiment will be described with reference to FIG. 16. FIG. 16 is a block diagram illustrating an example of the configuration of the macro eNB 100-2 according to the first embodiment. Referring to FIG. 16, the macro eNB 100-2 includes an antenna unit 110, a radio communication unit 120, a network communication unit 130, a storage unit 140, and a processing unit 160.

Here, there is no difference in forms of the antenna unit 110, the radio communication unit 120, the network communication unit 130, and the storage unit 140 between the second embodiment and the above-described first embodiment. Thus, here, only the processing unit 160 will be described.

(Processing Unit 160)

The processing unit 160 supplies various functions of the macro eNode 100-2. The processing unit 160 includes an information acquisition unit 161 and a communication control unit 163.

(Information Acquisition Unit 161)

The information acquisition unit 161 acquires information necessary for control by the communication control unit 163. For example, the information acquisition unit 161 acquires information from another device via the radio communication unit 120. For example, the information acquisition unit 161 acquires information stored in the storage unit 140.

Number of CCs Used as SCCs by UE

For example, the information acquisition unit 161 acquires the number of CCs used as the SCCs by a UE 300-2.

Specifically, for example, the number of CCs for the macro cell used as the SCCs by the UE 300-2 is stored in the storage unit 140 and the information acquisition unit 161 acquires the number of CCs for the macro cell used as the SCCs by the UE 300-2 from the storage unit 140. The information acquisition unit 161 acquires the number of CCs for the pico cell used as the SCCs by the UE 300-2 from a pico eNB 200-2 via the network communication unit 130. Then, the information acquisition unit 161 acquires the number of CCs used as the SCCs by the UE 300-2 by adding the number of CCs for the macro cell used as the SCCs by the UE 300-2 and the number of CCs for the pico cell used as the SCCs by the UE 300-2.

(Communication Control Unit 163)

The communication control unit 163 performs control related to the radio communication in the macro cell 10.

Restriction of Maximum Number of SCCs Used by UE

In particular, in the second embodiment, the communication control unit 163 restricts the maximum number of frequency bands (CCs) used as the SCCs by the UE 300-2 to a smaller number when the UE 300-2 uses the frequency band (CC) used in the pico cell 20 as the PCC.

For example, the communication control unit 163 restricts the maximum number of CCs used as the SCCs by the UE 300-2 to a smaller number than the normal maximum number (four) when the UE 300-2 uses the CC for the pico cell as the PCC. Here, the smaller number (that is, the restricted maximum number) is referred to as a restriction maximum number.

Specifically, for example, when the UE 300-2 uses the CC for the pico cell as the PCC and the number of CCs used as the SCCs by the UE 300-2 is the restriction maximum number, the communication control unit 163 does not perform a process of the eNB side for adding the SCC. Conversely, when the UE 300-2 uses the CC for the pico cell as the PCC but the number of CCs used as the SCCs by the UE 300-2 is less than the restriction maximum number, the communication control unit 163 can perform the process of the eNB side for adding the SCC. That is, the communication control unit 163 can perform the process of the eNB side for adding the CC for the macro cell as the SCC.

The process of the eNB side for adding the SCC includes, for example, activation for using the CC for the macro cell as the SCC and RRC connection reconfiguration. For example, the process of the eNB side for adding the SCC is performed via the pico eNB 200-2. When the UE 300-2 can directly communicate with the macro eNB 100-2, the process of the eNB side for adding the SCC may be performed directly between the macro eNB 100-2 and the UE 300-2.

For example, even when the UE 300-2 uses the CC for the pico cell as the PCC through the restriction of the maximum number of SCCs, as described above, the maximum number of SCCs further decreases. Therefore, the process of adding the SCC after the handover of the PCC to the CC for the pico cell and the process of releasing the SCC before the handover of the PCC from the CC for the pico cell can be reduced. That is, when the CC for the pico cell is used as the PCC, the processes accompanied with the handover can be reduced.

For example, the restriction maximum number depends on a movement situation of the UE 300-2. More specifically, for example, when the UE 300-2 is moving, the restriction maximum number is a first maximum number. When the UE 300-2 is not moving, the restriction maximum number is a second number (>the first number). For example, the first number is 1 and the second number is 2.

Accordingly, when a time in which the UE 300-2 is away from the pico cell 20 is assumed to be shorter, the restriction maximum number further decreases, and thus the processes accompanied with the handover are further reduced. Conversely, when the time in which the UE 300-2 is away from the pico cell 20 is assumed to be longer, the restriction maximum number further increases, and thus the processes accompanied with the handover are reduced and the throughput in the pico cell 20 can also be ensured.

The movement situation of the UE 300-2 can be acquired based on a timing advanced value for the UE 300-2, a result of angle of arrival (AoA) measurement used for downlink beamforming, and the like. Information indicating the movement situation of the UE 300-2 may be provided from the UE 300-2. This information may be supplied to the macro eNB 100-2 by the pico eNB 200-2.

4.3. Configuration of Pico eNB

Figure 17:
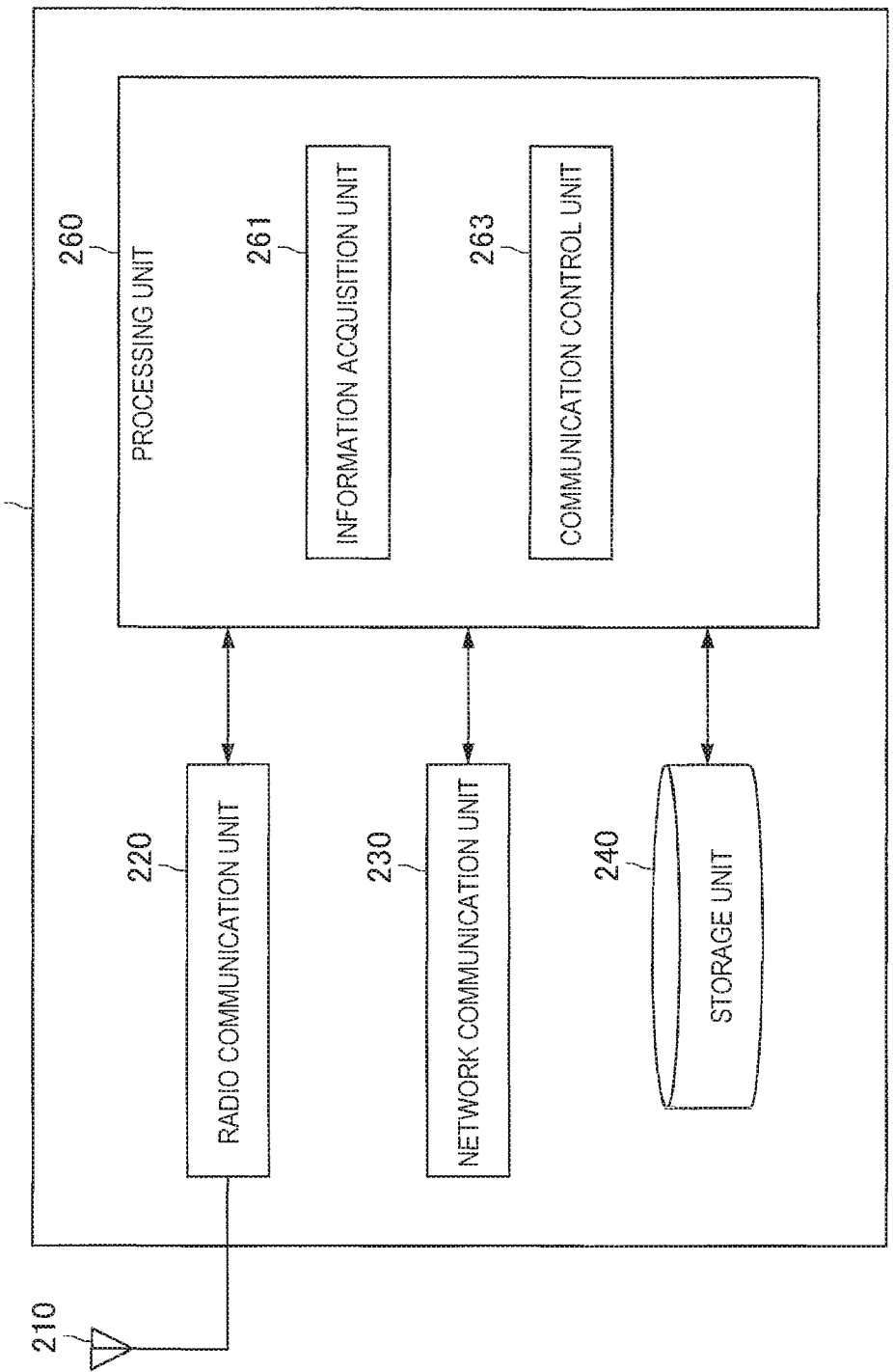
FIG. 17 is a block diagram illustrating an example of the configuration of a pico eNB according to the second embodiment.

Next, the example of the configuration of the pico eNB 200-2 according to the second embodiment will be described with reference to FIG. 17. FIG. 17 is a block diagram illustrating an example of the configuration of the pico eNB 200-2 according to the second embodiment. Referring to FIG. 17, the pico eNB 200-2 includes an antenna unit 210, a radio communication unit 220, a network communication unit 230, a storage unit 240, and a processing unit 260.

Here, there is no difference in forms of the antenna unit 210, the radio communication unit 220, the network communication unit 230, and the storage unit 240 between the second embodiment and the above-described first embodiment. Thus, here, only the processing unit 260 will be described.

(Processing Unit 260)

The processing unit 260 supplies various functions of the pico eNode 200-2. The processing unit 260 includes an information acquisition unit 261 and a communication control unit 263.

(Information Acquisition Unit 261)

The information acquisition unit 261 acquires information necessary for control by the communication control unit 263. For example, the information acquisition unit 261 acquires information from another device via the radio communication unit 220. For example, the information acquisition unit 261 acquires information stored in the storage unit 240.

Number of CCs Used as SCCs by UE

For example, the information acquisition unit 261 acquires the number of CCs used as the SCCs by a UE 300-2.

Specifically, for example, the number of CCs for the pico cell used as the SCCs by the UE 300-2 is stored in the storage unit 240 and the information acquisition unit 261 acquires the number of CCs for the pico cell used as the SCCs by the UE 300-2 from the storage unit 240. The information acquisition unit 261 acquires the number of CCs for the macro cell used as the SCCs by the UE 300-2 from a macro eNB 100-2 via the network communication unit 230. Then, the information acquisition unit 261 acquires the number of CCs used as the SCCs by the UE 300-2 by adding the number of CCs for the pico cell used as the SCCs by the UE 300-2 and the number of CCs for the macro cell used as the SCCs by the UE 300-2.

(Communication Control Unit 263)

The communication control unit 263 performs control related to the radio communication in the pico cell 20.

Restriction on Maximum Number of SCCs Used by UE

In particular, in the second embodiment, the communication control unit 263 restricts the maximum number of CCs used as the SCCs by the UE 300-2 to a smaller number (that is, the restriction maximum number) than the maximum number (four) at the normal time when the UE 300-2 uses the CC for the pico cell as the PCC.

Specifically, for example, when the UE 300-2 uses the CC for the pico cell as the PCC and the number of CCs used as the SCCs by the UE 300-2 is the restriction maximum number, the communication control unit 263 does not perform a process of the eNB side for adding the SCC. Conversely, when the UE 300-2 uses the CC for the pico cell as the PCC but the number of CCs used as the SCCs by the UE 300-2 is less than the restriction maximum number, the communication control unit 263 can perform the process of the eNB side for adding the SCC. That is, the communication control unit 263 can perform the process of the eNB side for adding the CC for the pico cell as the SCC.

The process of the eNB side for adding the SCC includes, for example, activation for using the CC for the pico cell as the SCC and RRC connection reconfiguration.

For example, even when the UE 300-2 uses the CC for the pico cell as the PCC through the restriction of the maximum number of SCCs, as described above, the maximum number of SCCs further decreases. Therefore, the process of adding the SCC after the handover of the PCC to the CC for the pico cell and the process of releasing the SCC before the handover of the PCC from the CC for the pico cell can be reduced. That is, when the CC for the pico cell is used as the PCC, the processes accompanied with the handover can be reduced.

For example, the restriction maximum number depends on a movement situation of the UE 300-2. This point has been described in the macro eNB 100-2 (the communication control unit 163).

4.4 Configuration of UE

Figure 18:
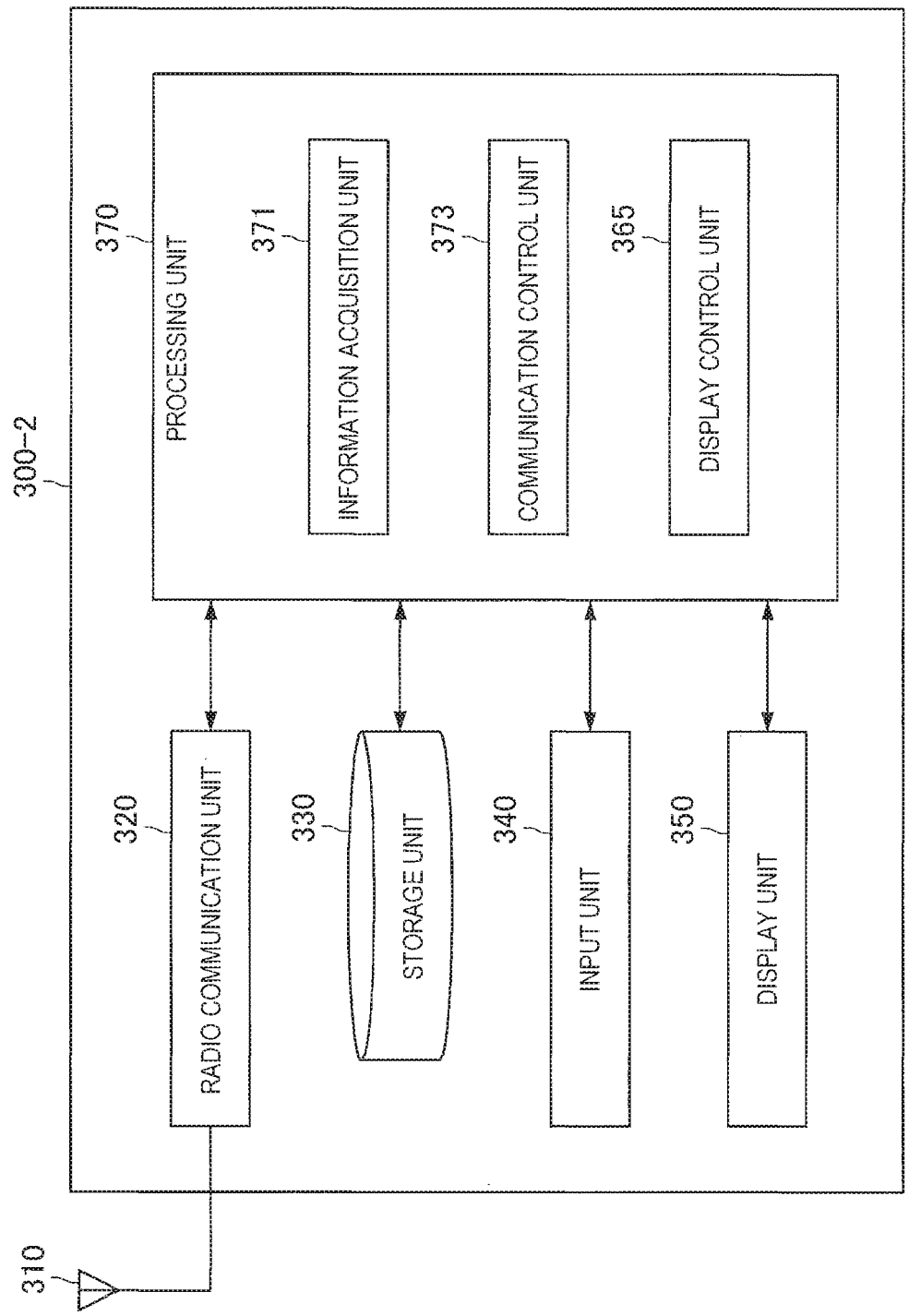
FIG. 18 is a block diagram illustrating an example of the configuration of a UE according to the second embodiment.

Next, an example of the configuration of the UE 300-2 according to the second embodiment will be described with reference to FIG. 18. FIG. 18 is a block diagram illustrating an example of the configuration of the UE 300-2 according to the second embodiment. Referring to FIG. 18, the UE 300-2 includes an antenna unit 310, a radio communication unit 320, a storage unit 330, an input unit 340, a display unit 350, and a processing unit 370.

Here, there is no difference in forms of the antenna unit 310, the radio communication unit 320, the storage unit 330, the input unit 340, the display unit 350, and the display control unit 365 included in a processing unit between the second embodiment and the above-described first embodiment. Thus, here, only an information acquisition unit 371 and a communication control unit 373 in a processing unit 370 will be described.

(Information Acquisition Unit 371)

The information acquisition unit 371 acquires information necessary for control by the communication control unit 373. For example, the information acquisition unit 371 acquires information from another device via the radio communication unit 320. For example, the information acquisition unit 371 acquires information stored in the storage unit 330.

(Communication Control Unit 373)

The communication control unit 373 performs control related to the radio communication by the UE 300-2.

4.5 Flow of Process

Next, examples of the communication control process according to the second embodiment will be described with reference to FIG. 19.

Figure 19:
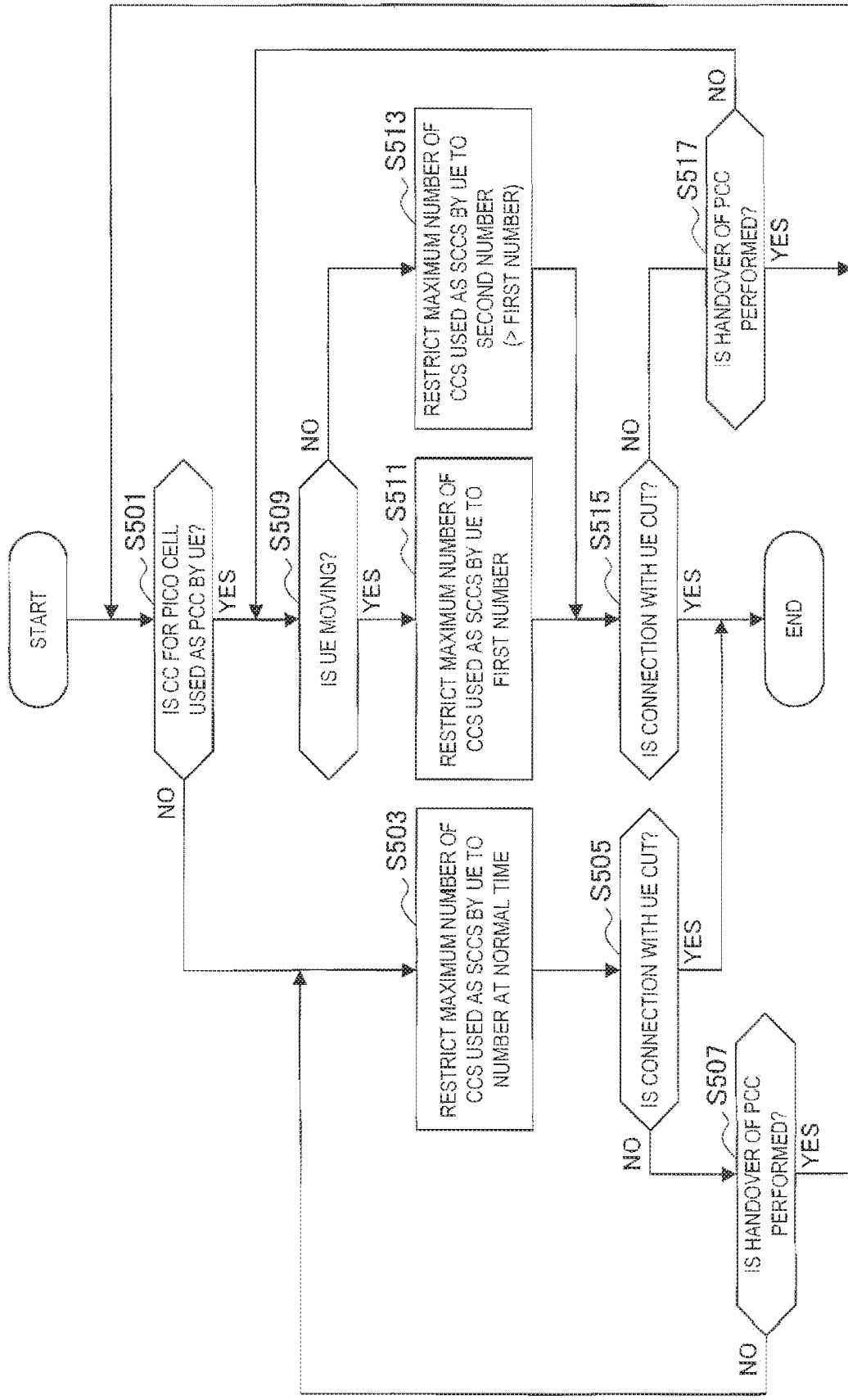
FIG. 19 is a flowchart illustrating a schematic flow of a communication control process according to the second embodiment.

FIG. 19 is a flowchart illustrating an example of a schematic flow of a communication control process according to the second embodiment. The communication control process is a process of restricting the maximum number of SCCs used by the UE and is performed by the macro eNB 100-2 according to the second embodiment. The communication control process can also be performed by the pico eNB 200-2.

In step S501, the communication control unit 163 determines whether the UE 300-2 uses the CC for the pico cell as the PCC. When the CC for the pico cell is used as the PCC, the process proceeds to step S509. Otherwise, the process proceeds to step S503.

In step S503, the communication control unit 163 restricts the maximum number of CCs used as the SCCs by the UE 300-2 to the number at the normal time (for example, four).

In step S505, the communication control unit 163 determines whether connection with the UE 300-2 is cut off. When the connection with the UE 300-2 is cut off, the process ends. Otherwise, the process proceeds to step S507.

In step S507, the communication control unit 163 determines whether the handover of the PCC of the UE 300-2 is performed. When the handover is performed, the process returns to step S501. Otherwise, the process returns to step S503.

In step S509, the communication control unit 163 determines whether the UE 300-2 is moving. When the UE 300-2 is determined to be moving, the process proceeds to step S511. Otherwise, the process proceeds to step S513.

In step S511, the communication control unit 163 restricts the maximum number of CCs used as the SCCs by the UE to a first number (for example, 1).

In step S513, the communication control unit 163 restricts the maximum number of CCs used as the SCCs by the UE to a second number (for example, 2) greater than the first number.

In step S515, the communication control unit 163 determines whether connection with the UE 300-2 is cut off. When the connection with the UE 300-2 is cut off, the process ends. Otherwise, the process proceeds to step S517.

In step S517, the communication control unit 163 determines whether the handover of the PCC of the UE 300-2 is performed. When the handover is performed, the process returns to step S501. Otherwise, the process returns to step S509.

4.6 Modification Example

Next, a modification example of the second embodiment will be described. According to the modification example when the UE 300-2 uses the CC for the pico cell as the PCC, the UE 300-2 autonomously restricts the maximum number of CCs used as the SCCs to a smaller number.

(Macro eNB 100-2: Information Acquisition Unit 161)
Acquisition of Band Use Information In the modification example of the second embodiment, for example, the information acquisition unit 161 acquires the band use information indicating which cell of the macro cell 10 and the pico cell 20 uses each of the plurality of frequency bands (CCs) used in one of the macro cell 10 and the pico cell 20.

Specifically, for example, as in the information acquisition unit 151 according to the first embodiment, the information acquisition unit 161 acquires a whitelist indicating whether each CC is the CC for the macro cell or the CC for the pico cell.

(Macro eNB 100-2: Communication Control Unit 163)
Restriction on Maximum Number of SCCs Used by UE In the modification example of the second embodiment, for example, the communication control unit 163 uses the normal maximum number as the maximum number of frequency bands (CCs) used as the SCCs by the UE 300-2 irrespective of use of the CCs for the pico cell by the UE 300-2.

Notification of Band Use Information

In the modification example of the second embodiment, for example, the communication control unit 163 notifies the UE 300-2 of the band use information.

Specifically, for example, as in the communication control unit 153 of the first embodiment, the communication control unit 163 notifies the UE 300-2 of the whitelist indicating whether each CC is the CC for the macro cell or the CC for the pico cell.

(Pico eNB 200-2: Information Acquisition Unit 261)

In the modification example of the second embodiment, for example, the information acquisition unit 261 of the pico eNB 200-2 performs the same operation as the operation described above in the information acquisition unit 161 of the macro eNB 100-2.

(Pico eNB 200-2: Communication Control Unit 263)

In the modification example of the second embodiment, for example, the communication control unit 263 of the pico eNB 200-2 performs the same operation as the operation described above in the communication control unit 163 of the macro eNB 100-2.

(UE 300-2: Information Acquisition Unit 371)
Acquisition of Band Use Information In the modification example of the second embodiment, for example, the information acquisition unit 371 acquires the band use information when the band use information is notified of by the macro eNB 100-2 or the pico eNB 200-2.

Specifically, for example, the whitelist indicating whether each CC is the CC for the macro cell or the CC for the pico cell is notified of by the macro eNB 100-2 or the pico eNB 200-2. The information acquisition unit 371 acquires the whitelist via the radio communication unit 320.

(UE 300-2: Communication Control Unit 373)
Restriction on Maximum Number of SCCs In particular, in the second embodiment, the communication control unit 373 restricts the maximum number of the frequency bands (CCs) used as the SCCs by the UE 300-2 to a smaller number when the frequency band (CC) used in the pico cell 20 is used as the PCC.

For example, when the UE 300-2 uses the CC for the pico cell as the PCC, the communication control unit 373 restricts the maximum number of CCs used as the SCCs by the UE 300-2 to a smaller number (that is, the restriction maximum number) than the normal maximum number (four).

Specifically, for example, from the band use information, the communication control unit 373 comprehends whether the CC used as the PCC by the UE 200-2 is the CC for the macro cell or the CC for the pico cell. When the CC for the macro cell is used as the PCC, the communication control unit 373 does not use the SCCs greater than the normal maximum number and uses the SCCs equal to or less than the normal maximum number. Conversely, when the CC for the pico cell is used as the PCC, the communication control unit 373 does not use the SCCs greater than the restriction maximum number and uses the SCCs equal to or less than the restriction maximum number.

For example, the restriction maximum number depends on a movement situation of the UE 300-2. This point has been described in the macro eNB 100-2 (the communication control unit 163) in the second embodiment.

(Flow of Process: Restriction on Maximum Number of SCCs Used (UE))

Next, an example of the communication control process according to the modification example of the second embodiment will be described with reference to FIG. 20.

Figure 20:
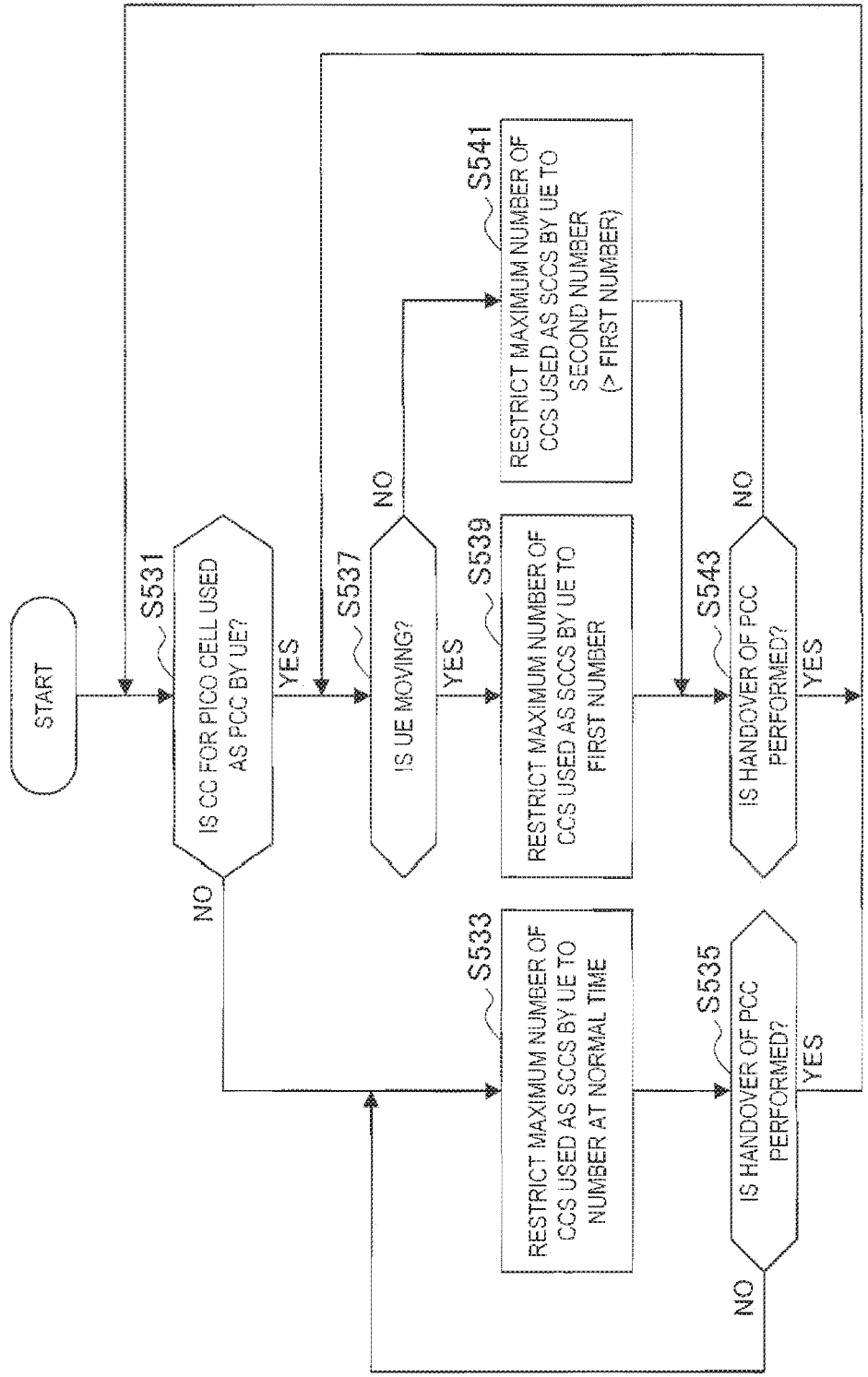
FIG. 20 is a flowchart illustrating a schematic flow of a communication control process according to a modification example of the second embodiment.

FIG. 20 is a flowchart illustrating a schematic flow of the communication control process according to the modification example of the second embodiment. The communication control process is a process of restricting the maximum number of SCCs according to the modification example of the second embodiment and is performed by the UE 300-2.

In step S531, the communication control unit 373 determines whether the UE 300-2 uses the CC for the pico cell as the PCC. When the CC for the pico cell is used as the PCC, the process proceeds to step S533. Otherwise, the process proceeds to step S533.

In step S533, the communication control unit 373 restricts the maximum number of CCs used as the SCCs by the UE 300-2 to the number at the normal time (for example, four).

In step S535, the communication control unit 373 determines whether the handover of the PCC of the UE 300-2 is performed. When the handover is performed, the process returns to step S531. Otherwise, the process returns to step S533.

In step S537, the communication control unit 373 determines whether the UE 300-2 is moving. When the UE 300-2 is determined to be moving, the process proceeds to step S539. Otherwise, the process proceeds to step S541.

In step S539, the communication control unit 373 restricts the maximum number of CCs used as the SCCs by the UE to a first number (for example, 1).

In step S541, the communication control unit 373 restricts the maximum number of CCs used as the SCCs by the UE to a second number (for example, 2) greater than the first number.

In step S543, the communication control unit 373 determines whether the handover of the PCC of the UE 300-2 is performed. When the handover is performed, the process returns to step S531. Otherwise, the process returns to step S537.

5. Third Embodiment

Figure 21:
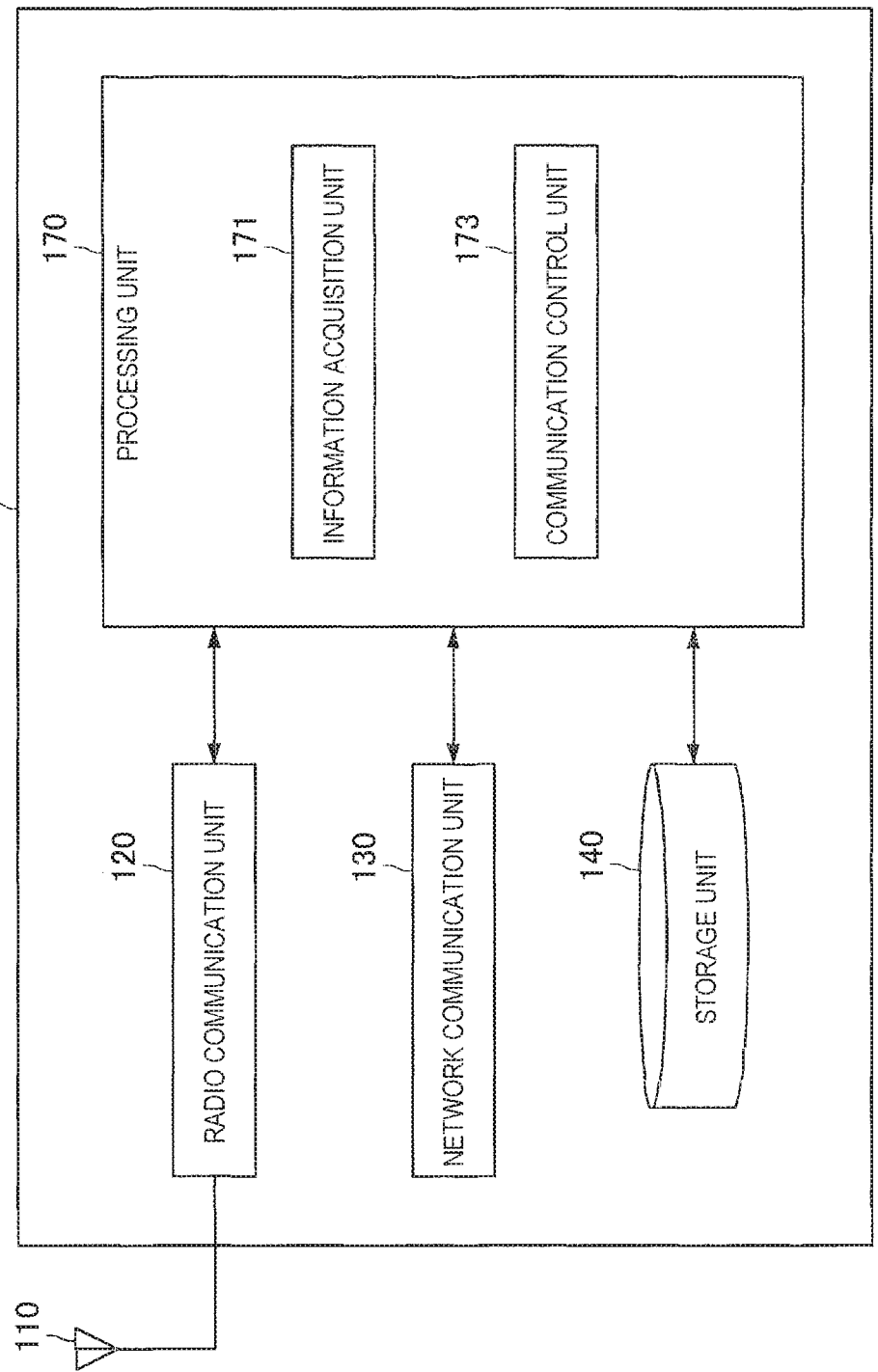
FIG. 21 is a block diagram illustrating an example of the configuration of a macro eNB according to a third embodiment.
Figure 22:
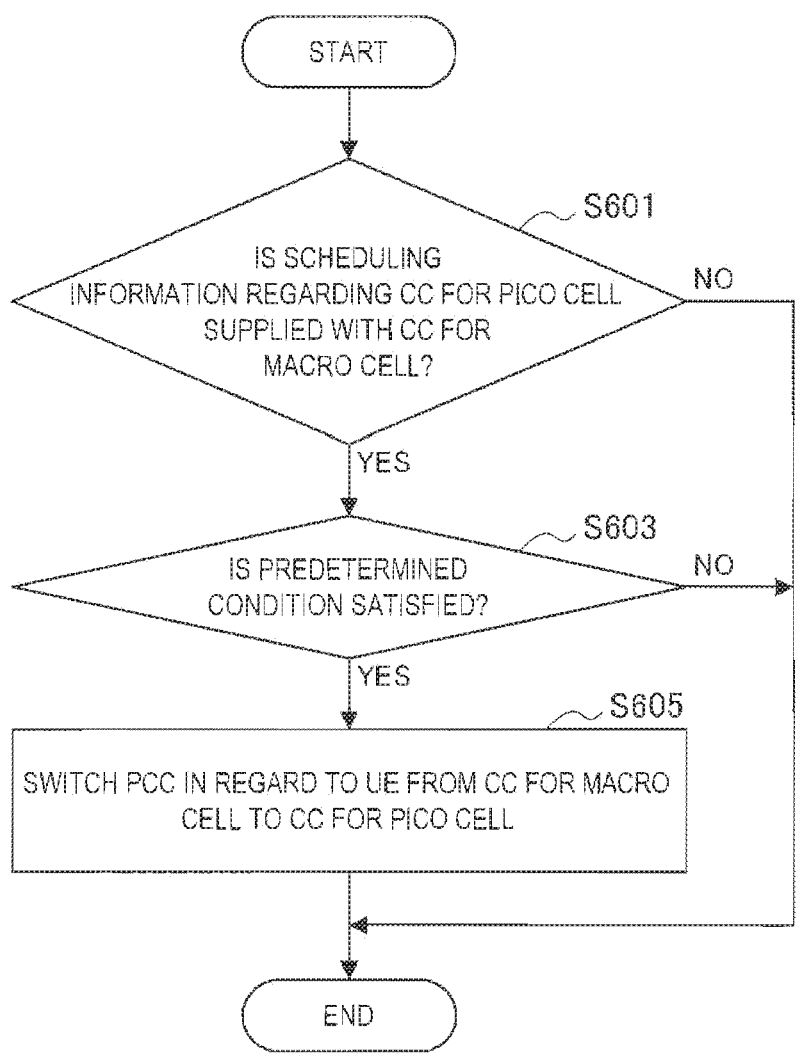
FIG. 22 is a flowchart illustrating a schematic flow of a communication control process according to a modification example of the third embodiment.

Next, a third embodiment of the present disclosure will be described with reference to FIGS. 21 and 22.

5.1 Overview

Problem

In cross carrier scheduling, control information (scheduling information) regarding a certain CC is transmitted with a PDCCH of another CC. For example, control information regarding a CC for a pico cell can be transmitted with a PDCCH of a CC for a macro cell. More specifically, for example, control information regarding a CC for a pico cell used as an SCC can be transmitted with a PDCCH of a CC for a macro cell used as a PCC.

However, when the number of pico cells corresponding to a macro cell is large and the control information regarding the CCs for the pico cells is transmitted with the PDCCH of the CCs for the macro cell, the PDCCH (and the ePDCCH) of the CCs for the macro cell can be depleted. In particular, for example, when UEs uses many CCs, the depletion of the PDCCH (and the ePDCCH) of the CCs for the macro cell is considerable.

Accordingly, in the third embodiment, a load on transmission of the control information in the macro cell is configured to be able to be reduced.

Solution

According to the third embodiment, when control information (scheduling information) regarding a CC for a pico cell is supplied to a UE with a CC for a macro cell and a predetermined condition is satisfied, radio communication with the UE is controlled such that the control information is not transmitted with the CC for the macro cell.

Accordingly, for example, transmission of the control information regarding the CC for the pico cell with the CC for the macro cell is restricted. As a result, it is possible to reduce the load on the transmission of the control information in the macro cell.

5.2 Configuration of Macro eNB

Next, an example of the configuration of a macro eNB 100-3 according to the third embodiment will be described with reference to FIG. 21. FIG. 21 is a block diagram illustrating an example of the configuration of the macro eNB 100-3 according to the third embodiment. Referring to FIG. 21, the macro eNB 100-3 includes an antenna unit 110, a radio communication unit 120, a network communication unit 130, a storage unit 140, and a processing unit 170.

Here, there is no difference in forms of the antenna unit 110, the radio communication unit 120, the network communication unit 130, and the storage unit 140 between the third embodiment and the above-described first embodiment. Thus, here, only the processing unit 170 will be described.

(Processing Unit 170)

The processing unit 170 supplies various functions of the macro eNode 100-3. The processing unit 170 includes an information acquisition unit 171 and a communication control unit 173.

(Information Acquisition Unit 171)

The information acquisition unit 171 acquires information necessary for control by the communication control unit 173. For example, the information acquisition unit 171 acquires information from another device via the radio communication unit 120. For example, the information acquisition unit 171 acquires information stored in the storage unit 140.

(Communication Control Unit 173)

The communication control unit 173 performs control related to the radio communication in the macro cell 10.

In particular, in the third embodiment, when control information regarding the CC used in the pico cell is provided using the frequency band frequency band (CC) used in the macro cell 10 by the UE, when a predetermined condition is satisfied, the communication control unit 173 controls the radio communication by the UE 300 in a manner that the control information is not transmitted with the frequency band used in the macro cell 10 to the UE 300.

Specific Control

For example, the frequency band (CC) used in the macro cell 10 is a frequency band used as the PCC by the UE 300. The communication control unit 173 controls the radio communication with the UE 300 so that the control information is not transmitted to the UE 300 with the frequency band (CC) used in the macro cell 10 by switching the PCC in regard to the UE 300 from the frequency band (CC) used in the macro cell 10 to the frequency band (CC) used in the pico cell 20. That is, when the control information regarding the CC for the pico cell is supplied with the CC for the macro cell used as the PCC and a predetermined condition is satisfied, the communication control unit 173 switches the PCC in regard to the UE 300 from the CC for the macro cell to the CC for the pico cell. Specifically, for example, when the predetermined condition is satisfied, the communication control unit 173 performs handover of the PCC in regard to the UE 300 from the CC for the macro cell to the CC for the pico cell.

Accordingly, for example, the transmission of the control information regarding the CC for the pico cell with the CC for the macro cell is restricted. As a result, it is possible to reduce the load on the transmission of the control information in the macro cell 10. In particular, according to the method of switching the PCC, when the CC for the macro cell is used as the PCC in a scenario in which the control information regarding the SCC is supplied with the PCC, it is possible to reduce the load on the transmission of the control information in the macro cell 10.

Predetermined Condition

First Example

As a first example, the predetermined condition includes a first condition of a movement situation of the UE 300. For example, the first condition is that the UE 300 is not moving.

Specifically, for example, the scheduling information of the CC for the pico cell used as the SCC by the UE 300 is supplied with the CC for the macro cell used as the PCC by the UE 300. In this case, when the UE 300 is not moving, the communication control unit 173 switches the PCC in regard to the UE 300 from the CC for the macro cell to the CC for the pico cell. Conversely, when the UE 300 is moving, the communication control unit 173 does not switch the PCC in regard to the UE 300 from the CC for the macro cell to the CC for the pico cell.

Accordingly, for example, when the UE 300 is not moving, the control information (scheduling information) regarding the CC for the pico cell is not supplied with the CC for the macro cell. Therefore, it is possible to reduce the load on the transmission of the control information in the macro cell 10. When the UE 300 is moving, the CC for the macro cell is used as the PCC. Therefore, even when the UE 300 is away from the pico cell 20, handover of the PCC is unnecessary. That is, a frequency of the handover is suppressed. As a result, it is possible to reduce the load on the transmission of the control information regarding a handover procedure in the macro cell 10.

The movement situation of the UE 300 can be acquired based on a timing advanced value for the UE 300, a result of AoA measurement used for downlink beamforming, and the like. Information indicating the movement situation of the UE 300 may be provided from the UE 300 to the macro eNB 100-2.

Second Example

As a second example, the predetermined condition includes a second condition of the number of CCs used by the UE 300. For example, the second condition is that the number of CCs for the pico cell for which the control information is transmitted with the CCs for the macro cell exceeds a predetermined number.

Specifically, for example, the scheduling information of the CCs for the pico cell used as the SCCs by the UE 300 is supplied with the CC for the macro cell used as the PCC by the UE 300. In this case, when the number of CCs for the pico cell used as the SCCs by the UE 300 exceeds the predetermined number (for example, two), the communication control unit 173 switches the PCC in regard to the UE 300 from the CC for the macro cell to the CC for the pico cell. Conversely, when the number of CCs for the pico cell used as the SCCs by the UE 300 is equal to or less than the predetermined number (for example, two), the communication control unit 173 does not switch the PCC in regard to the UE 300 from the CC for the macro cell to the CC for the pico cell.

Accordingly, when the number of CCs for the pico cell in which the control information (scheduling information) is supplied with the CCs for the macro cell is large (that is, the load on the transmission of the control information is particularly large), the control information regarding the CCs for the pico cell is not supplied with the CCs for the macro cell. Thus, it is possible to reduce the load on the transmission of the control information in the macro cell 10.

Third Example

As a third example, the foregoing predetermined condition includes a third condition of the number of UEs 300 to which the control information regarding the frequency band used in the pico cell 20 is supplied with the frequency band (CC) used in the macro cell 10. For example, the third condition is that the number of UEs 300 to which the control information regarding the CC for the pico cell is transmitted with the CC for the macro cell exceeds a predetermined number.

Specifically, for example, the scheduling information of the CCs for the pico cell used as the SCCs by the UEs 300 is supplied with the CCs for the macro cell used as the PCCs by the UEs 300. For example, the number of UEs 300 (the UEs 300 to which the control information regarding the CCs for the pico cell is supplied with the CCs for the macro cell) using the CCs for the macro cell as the PCCs exceeds the predetermined number. In this case, the communication control unit 173 switches the PCCs in regard to some (or all) of the UEs 300 from the CCs for the macro cell to the CCs for the pico cell. Conversely, for example, the number of UEs 300 (the UEs 300 to which the control information regarding the CCs for the pico cell is supplied with the CCs for the macro cell) using the CCs for the macro cell as the PCCs is equal to or less than the predetermined number. In this case, the communication control unit 173 does not switch the PCCs in regard to some (or all) of the UEs 300 from the CCs for the macro cell to the CCs for the pico cell.

Accordingly, when the number of UEs 300 to which the control information regarding the CCs for the pico cell is supplied with the CCs for the macro cell is large (that is, the load on the transmission of the control information is particularly large), the control information regarding the CCs for the pico cell is not supplied to some (or all) of the UEs 300 with the CCs for the macro cell. Thus, it is possible to reduce the load on the transmission of the control information in the macro cell 10.

Fourth Example

As a fourth example, the predetermined condition includes a fourth condition of a time in which the control information regarding the frequency band (CC) used in the pico cell 20 is supplied to the UE 300 with the frequency band (CC) used in the macro cell 10. For example, the fourth condition is that the time in which the control information regarding the CC for the pico cell is supplied to the UE 300 with the CC for the macro cell exceeds a predetermined time.

Specifically, for example, the scheduling information of the CC for the pico cell used as the SCC by the UE 300 is supplied with the CC for the macro cell used as the PCC by the UE 300. In this case, a time in which the control information regarding the CC for the pico cell used as the SCC is supplied to the UE 300 with the CC for the macro cell used as the PCC (or a time in which the CC for the macro cell is used as the PCC by the UE 300) exceeds a predetermined time. Then, the communication control unit 173 switches the PCC in regard to the UE 300 from the CC for the macro cell to the CC for the pico cell. Conversely, the time in which the control information regarding the CC for the pico cell used as the SCC is supplied to the UE 300 with the CC for the macro cell used as the PCC (or the time in which the CC for the macro cell is used as the PCC by the UE 300) does not exceed the predetermined time. In this case, the communication control unit 173 does not switch the PCC in regard to the UE 300 from the CC for the macro cell to the CC for the pico cell.

Accordingly, the UE 300 to which the control information regarding the CC for the pico cell has been supplied with the CC for the macro cell is not supplied with the CC for the macro cell with the control information regarding the CC for the pico cell. Thus, it is possible to reduce the load on the transmission of the control information in the macro cell 10. A chance to supply the control information on the CC for the pico cell with the CC for the macro cell can be equal between the UEs 300.

Other Control Examples

The examples in which the PCC in regard to the UE 300 is switched from the CC for the macro cell to the CC for the pico cell when the predetermined condition is satisfied have been described, but the third embodiment is not limited thereto.

For example, when the predetermined condition is satisfied, the supply of the control signal regarding the CC for the pico cell with the CC for the macro cell may be stopped while the CC for the macro cell is maintained as the PCC. More specifically, for example, when the predetermined condition is satisfied, the UE 300 may be controlled such that the CC for transmitting the control signal regarding the CC for the pico cell is supplied with another CC (for example, the CC for the pico cell) from the CC for the macro cell which is the PCC.

For example, the control information regarding the CC for the pico cell may be supplied with the CC for the macro cell used as the SCC. In this case, when the predetermined condition is satisfied, the supply of the control signal regarding the CC for the pico cell with the CC for the macro cell may be stopped. More specifically, for example, when the predetermined condition is satisfied, the UE 300 may be controlled such that the CC for transmitting the control signal regarding the CC for the pico cell is supplied with another CC (for example, the CC for the pico cell) from the CC for the macro cell which is the SCC.

5.3 Flow of Process

Next, an example of a communication control process according to the third embodiment will be described with reference to FIG. 22. FIG. 22 is a flowchart illustrating an example of a schematic flow of the communication control process according to the third embodiment. The communication control process is performed by the macro eNB 100-3.

In step S601, the communication control unit 163 determines whether the scheduling information regarding the CC for the pico cell is supplied with the CC for the macro cell in regard to the UE 300. When the scheduling information is supplied with the CC for the macro cell, the process proceeds to step S603. Otherwise, the process ends.

In step S603, the communication control unit 163 determines whether the predetermined condition is satisfied. When the predetermined condition is satisfied, the process proceeds to step S605. Otherwise, the process ends.

In step S605, the communication control unit 163 switches the PCC in regard to the UE 300 from the CC for the macro cell to the CC for the pico cell. Then, the process ends.

6. Fourth Embodiment

Next, a fourth embodiment of the present disclosure will be described with reference to FIGS. 23 to 28.

6.1 Overview

Problem

In the carrier aggregation, a change in a PCC is accompanied with handover. Therefore, when a CC for the pico cell becomes the PCC and the UE 300 enters and leaves the pico cell 20, handover to the CC for the pico cell and handover from the CC for the pico cell can occur. That is, a ping-pong phenomenon of the handover can occur. Accordingly, the PCC is considered to be preferably the CC for the macro cell rather than the CC for the pico cell.

On the other hand, to improve the throughput of the entire communication system, it is preferable to perform offloading of traffic from the macro cell to the pico cell. Therefore, the SCC is considered to be preferably the CC for the pico cell rather than the CC for the macro cell.

As described above, the PCC and the SCC can be said to be more suitable for one of the CC for the macro cell and the CC for the pico cell rather than any one of the CC for the macro cell and the CC for the pico cell.

However, whether the CC is the CC for the macro cell or the CC for the pico cell is not considered in reporting of measurement which is an opportunity to switch the PCC and the SCC. For example, as a reporting condition of triggering reporting of a measurement result, there is the event A3. The condition of the event A3 is that the quality of a neighbor cell is better than the quality of a primary cell by the threshold value. However, whether the neighbor cell and the primary cell are the macro cell or the pico cell is not considered in the threshold value. Therefore, it is not easier for the CC for the macro cell to become the PCC than the CC for the pico cell and it is not easier for the CC for the pico cell to become the SCC than the CC for the macro cell. As a result, there is a concern of a more proper CC being not used by the UE.

Accordingly, in the fourth embodiment, the more proper CC can be used in a terminal equipment (UE)

Solution

According to the fourth embodiment, when a combination of a first CC which is being used for one of the macro cell 10 and the pico cell 20 and a second CC which is being used as one of the macro cell 10 and the pico cell 20 satisfies a reporting condition for triggering reporting of a measurement result, the reporting of the measurement result is triggered. The reporting condition differs between a first case in which the first CC is the CC for the macro cell and the second CC is the CC for the pico cell and a second case in which the first CC is the CC for the pico cell and the second CC is the CC for the macro cell.

Accordingly, for example, a possibility of the reporting of the measurement result is changed between the first and second cases. As a result, the more proper CC can be used in a terminal equipment (UE).

6.2. Configuration of Macro eNB

Figure 23:
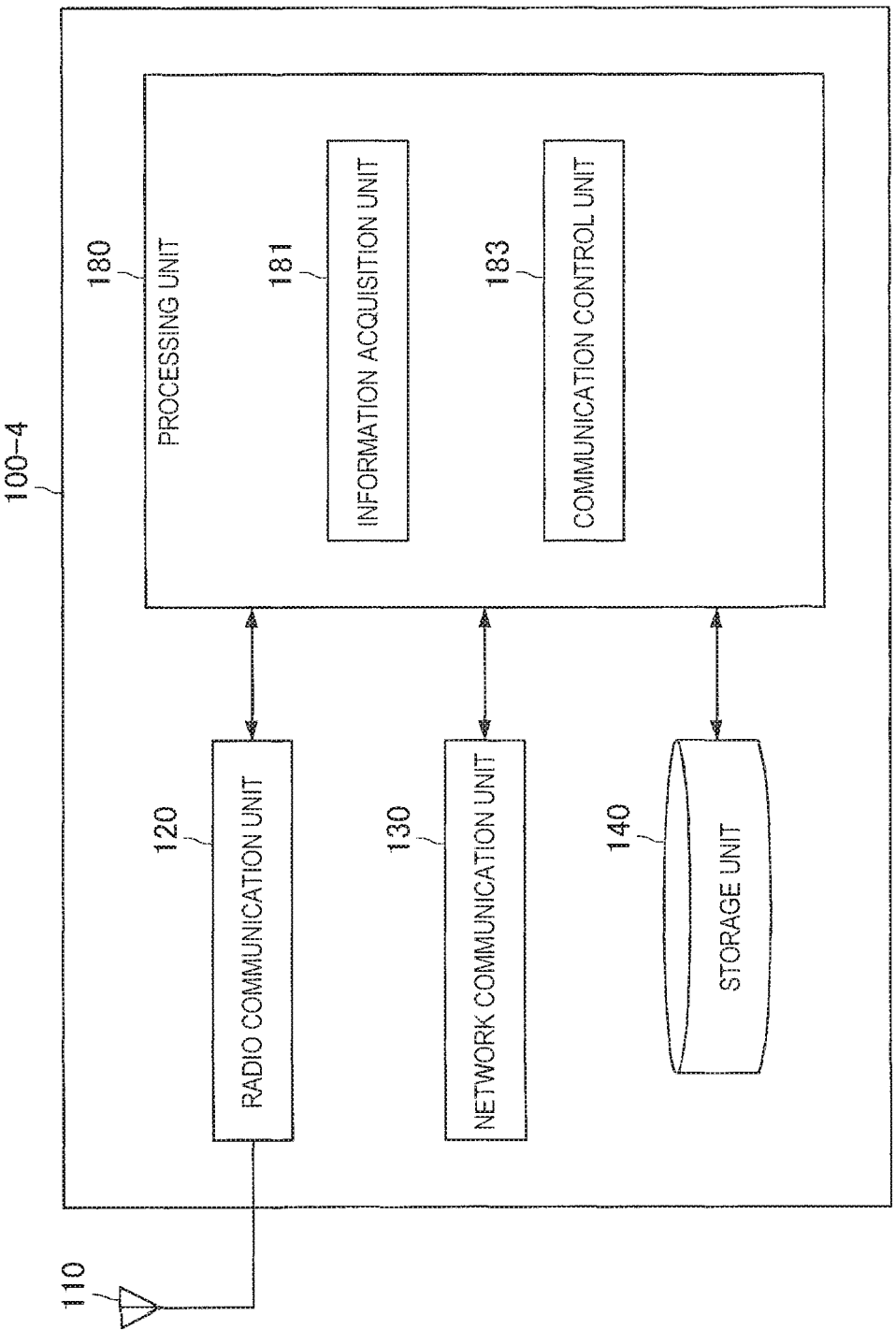
FIG. 23 is a block diagram illustrating an example of the configuration of a macro eNB according to a fourth embodiment.

Next, the example of the configuration of the macro eNB 100-4 according to the fourth embodiment will be described with reference to FIG. 23. FIG. 23 is a block diagram illustrating an example of the configuration of the macro eNB 100-4 according to the fourth embodiment. Referring to FIG. 23, the macro eNB 100-4 includes an antenna unit 110, a radio communication unit 120, a network communication unit 130, a storage unit 140, and a processing unit 180.

Here, there is no difference in forms of the antenna unit 110, the radio communication unit 120, the network communication unit 130, and the storage unit 140 between the fourth embodiment and the above-described first embodiment. Thus, here, only the processing unit 180 will be described.

(Processing Unit 180)

The processing unit 180 supplies various functions of the macro eNode 100-4. The processing unit 180 includes an information acquisition unit 181 and a communication control unit 183.

(Information Acquisition Unit 181)

The information acquisition unit 181 acquires information necessary for control by the communication control unit 183. For example, the information acquisition unit 181 acquires information from another device via the radio communication unit 120. For example, the information acquisition unit 181 acquires information stored in the storage unit 140.

Acquisition of Reporting Condition Information

In particular, in the fourth embodiment, the information acquisition unit 181 acquires information on the reporting condition for triggering the reporting of the measurement result (hereinafter referred to as "reporting condition information"). The reporting condition is a condition that a measurement result at a first frequency band (first CC) which is being used for one of the macro cell 10 and the pico cell 20 and a measurement result at a second frequency band (second CC) for one of the macro cell 10 and the pico cell 20 are satisfied.

There are several combination cases of the first frequency band (CC) and the second frequency band (CC). For example, there is a first case in which the first frequency band (CC) is a frequency band (CC) for the macro cell 10 and the second frequency band (CC) is a frequency band (CC) for the pico cell 20. There is a second case in which the first frequency band (CC) is a frequency band (CC) for the pico cell 20 and the second frequency band (CC) is a frequency band (CC) for the macro cell 10. The reporting condition differs between the first and second cases.

More specifically, for example, the reporting condition is a condition determined using a threshold value. The reporting condition information includes the threshold value. The threshold value differs between the first and second cases.

The measurement result is, for example, the RSRP and/or RSRQ.

PCC

For example, the first frequency band (first CC) is a frequency band (CC) which is being used as the PCC. In this case, it is more difficult to satisfy the reporting condition in the first case than in the second case.

For example, the reporting condition is a condition of the event A3 decided in 3GPP. The condition of the event A3 is that the quality of a neighbor cell is better than the quality of a primary cell by the threshold value or more. In this case, the threshold value is greater in the first case in which the primary cell (PCC) is the macro cell (CC for the macro cell) and the neighbor cell is the pico cell (CC for the pico cell) than in the second case in which the primary cell is the pico cell and the neighbor cell is the macro cell. That is, it is more difficult to satisfy the reporting condition in the first case than in the second case. For this reason, it is more difficult to report the measurement result in the first case than in the second case. In other words, it is easier to report the measurement result in the second case than in the first case.

For example, in other cases except for the first and second cases, a threshold value A is used. In the first case, a threshold value B greater than the threshold value A is used. In the second case, a threshold value C less than the threshold value A is used.

By the above-described reporting condition, it can be more difficult for the PCC to become the CC for the pico cell from the CC for the macro cell than to become the CC for the macro cell from the CC for the pico cell. In other words, it is easier for the PCC to become the CC for the macro cell from the CC for the pico cell than to become the CC for the pico cell from the CC for the macro cell. Accordingly, there is a high possibility of the CC for the macro cell being used as the PCC.

As another example, the reporting condition may be a condition of the event A5 decided in 3GPP. The condition of the event A5 is that the quality of a primary cell is worse than the first threshold value and the quality of a neighbor cell is better than the second threshold value. In this case, the first threshold may be less and/or the second threshold may be greater in the first case than in the second case.

SCC

For example, the first frequency band (first CC) is a frequency band (CC) which is being used as an SCC. In this case, it is easier to satisfy the reporting condition in the first case than in the second case.

For example, the reporting condition is a condition of the event A6 decided in 3GPP. The condition of the event A6 is that the quality of a neighbor cell is better than the quality of a secondary cell by the threshold value or more. In this case, the threshold is less in a first case in which the secondary cell (SCC) is a macro cell (CC for the macro cell) and the neighbor cell is a pico cell (CC for the pico cell) than in a second case in which the secondary cell is the pico cell and the neighbor cell is the macro cell. That is, it is easier to satisfy the reporting condition in the first case than in the second case. Therefore, the measurement result is reported more easily in the first case than in the second case.

For example, in other cases except for the first and second cases, a threshold value D is used. In the first case, a threshold value E less than the threshold value D is used. In the second case, a threshold value F greater than the threshold value D is used.

By the above-described reporting condition, for example, it can be easier for the SCC to become the CC for the pico cell from the CC for the macro cell than to become the CC for the macro cell from the CC for the pico cell. In other words, it is more difficult for the SCC to become the CC for the macro cell from the CC for the pico cell than to become the CC for the pico cell from the CC for the macro cell. Accordingly, there is a high possibility of the CC for the pico cell being used as the SCC.

According to the above-described reporting condition, for example, the possibility of the reporting of the measurement result is changed between the first and second cases. As a result, the more proper CC can be used in a terminal equipment (UE).

(Communication Control Unit 183)

The communication control unit 183 performs control related to the radio communication in the macro cell 10.

Acquisition of Reporting Condition Information

In particular, in the fourth embodiment, the communication control unit 183 notifies a UE 300-4 of the reporting condition information. The communication control unit 183 may individually notify the UE 300-4 of the reporting condition information by singling or may report the reporting condition information to the UE 300-4 by system information.

6.3. Configuration of Pico eNB

Figure 24:
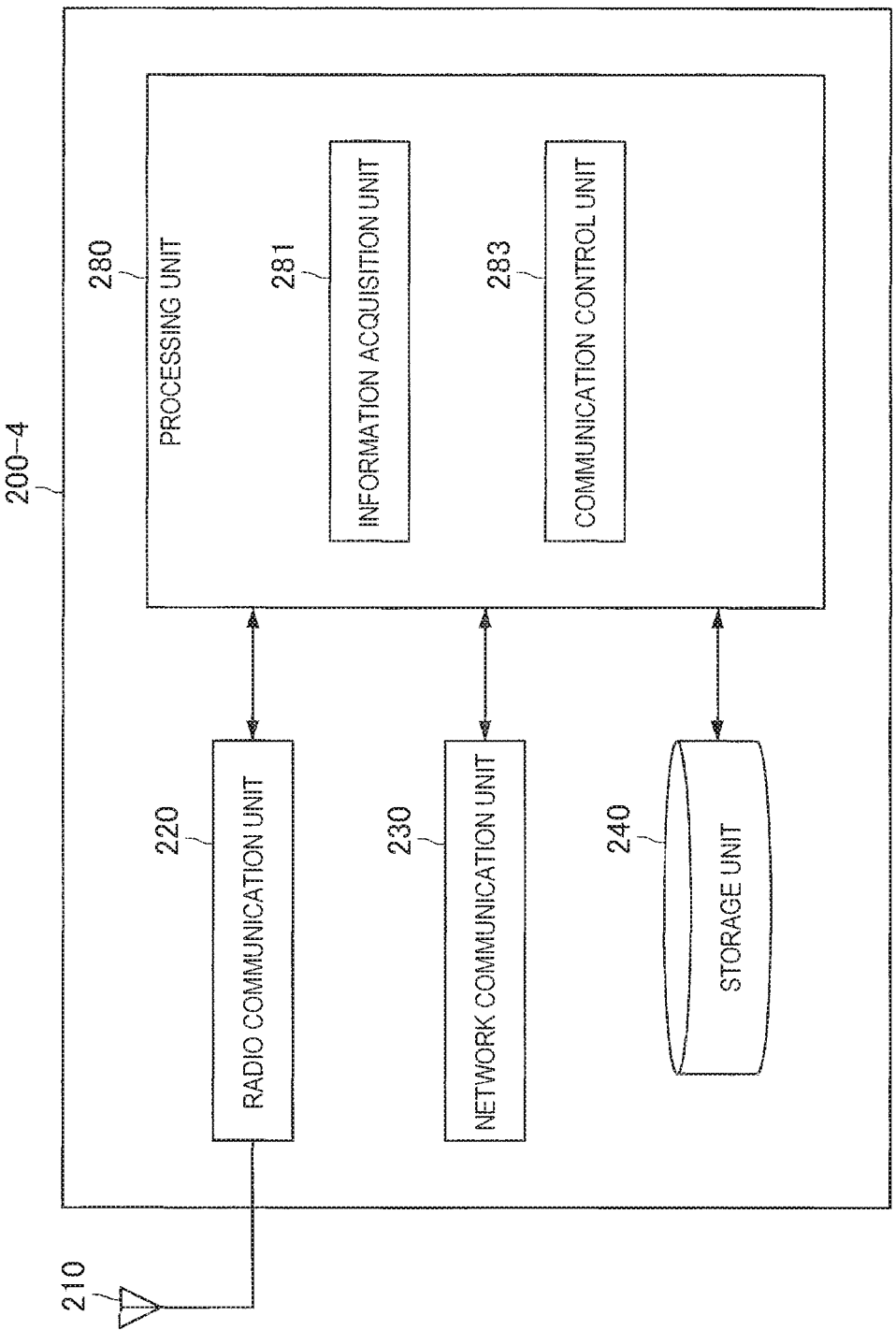
FIG. 24 is a block diagram illustrating an example of the configuration of a pico eNB according to the fourth embodiment.

Next, the example of the configuration of the pico eNB 200-4 according to the fourth embodiment will be described with reference to FIG. 24. FIG. 24 is a block diagram illustrating an example of the configuration of the pico eNB 200-4 according to the fourth embodiment. Referring to FIG. 24, the pico eNB 200-4 includes an antenna unit 210, a radio communication unit 220, a network communication unit 230, a storage unit 240, and a processing unit 280.

Here, there is no difference in forms of the antenna unit 210, the radio communication unit 220, the network communication unit 230, and the storage unit 240 between the fourth embodiment and the above-described first embodiment. Thus, here, only the processing unit 280 will be described.

(Information Acquisition Unit 281)

The information acquisition unit 281 acquires information necessary for control by the communication control unit 283. For example, the information acquisition unit 281 acquires information from another device via the radio communication unit 220. For example, the information acquisition unit 281 acquires information stored in the storage unit 240.

Acquisition of Reporting Condition Information

In particular, in the fourth embodiment, the information acquisition unit 281 acquires the reporting condition information as in the information acquisition unit 181 of the macro eNB 100-4.

(Communication Control Unit 283)

The communication control unit 283 performs control related to the radio communication in the pico cell 20.

Acquisition of Reporting Condition Information

In particular, in the fourth embodiment, the communication control unit 283 notifies the UE 300-4 of the reporting condition information as in the communication control unit 183 of the macro eNB 100-4.

6.4 Configuration of UE

Figure 25:
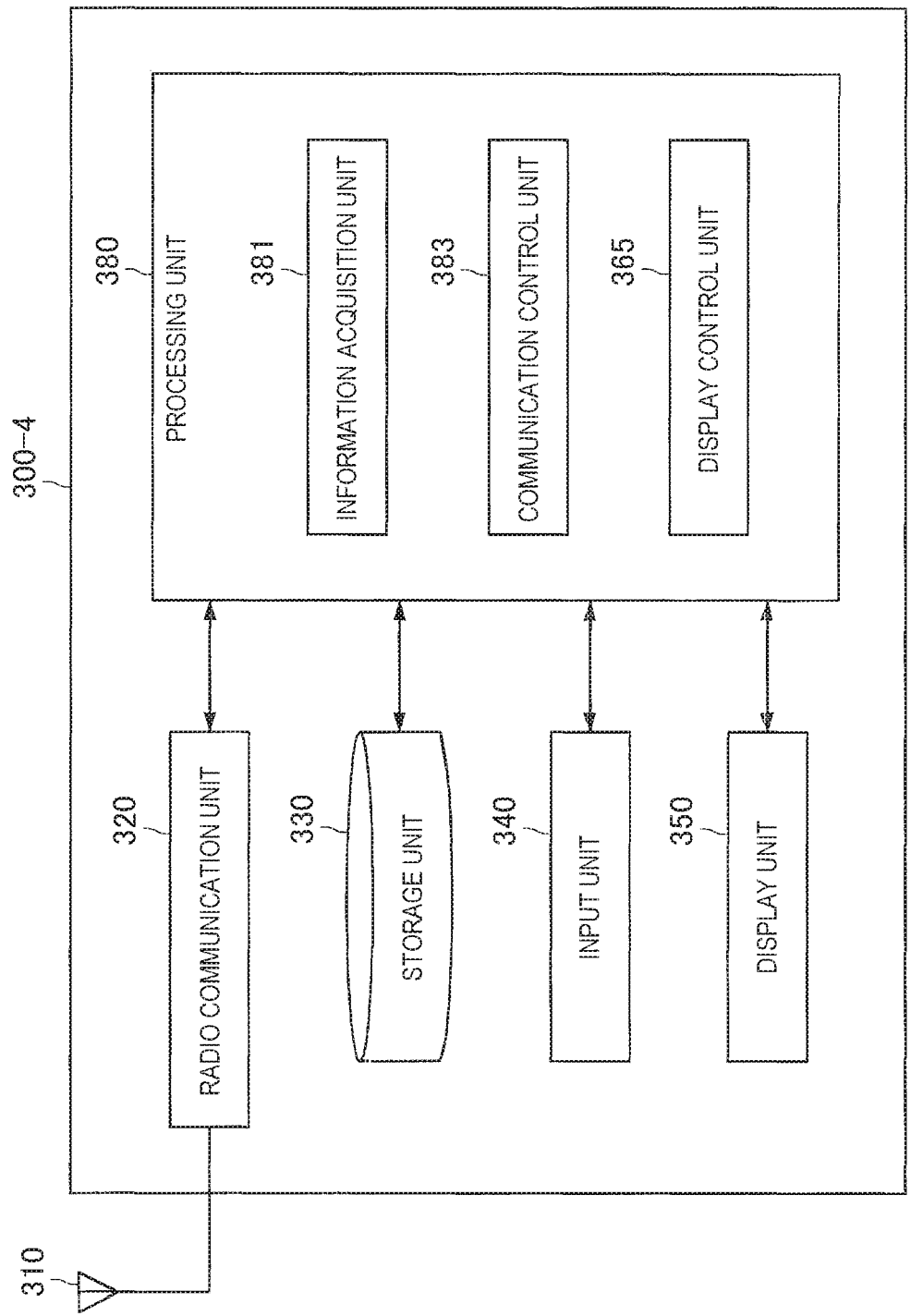
FIG. 25 is a block diagram illustrating an example of the configuration of a UE according to the fourth embodiment.

Next, an example of the configuration of the UE 300-4 according to the fourth embodiment will be described with reference to FIG. 25. FIG. 25 is a block diagram illustrating an example of the configuration of the UE 300-4 according to the fourth embodiment. Referring to FIG. 25, the UE 300-4 includes an antenna unit 310, a radio communication unit 320, a storage unit 330, an input unit 340, a display unit 350, and a processing unit 380.

Here, there is no difference in forms of the antenna unit 310, the radio communication unit 320, the storage unit 330, the input unit 340, the display unit 350, and the display control unit 365 included in a processing unit between the fourth embodiment and the above-described first embodiment. Thus, here, only an information acquisition unit 381 and a communication control unit 383 in a processing unit 380 will be described.

(Information Acquisition Unit 381)

The information acquisition unit 381 acquires information necessary for control by the communication control unit 383. For example, the information acquisition unit 381 acquires information from another device via the radio communication unit 320. For example, the information acquisition unit 381 acquires information stored in the storage unit 330.

Acquisition of Measurement Result

In particular, in the fourth embodiment, the information acquisition unit 381 acquires the measurement result at the first frequency band (first CC) which is being used for one of the macro cell 10 and the pico cell 20. The information acquisition unit 381 acquires the measurement result at the second frequency band (second CC) for one of the macro cell 10 and the pico cell 20. For example, the measurement result is the RSRP and/or the RSRQ.

Acquisition of Reporting Condition Information

For example, the information acquisition unit 381 acquires information (that is, the reporting condition information) on the reporting condition for triggering the reporting of the measurement result. Specifically, for example, when the macro eNB 100-4 or the pico eNB 200-4 notifies the UE 300-4 of the reporting condition information, the information acquisition unit 381 acquires the reporting condition information via the radio communication unit 320.

(Communication Control Unit 383)

The communication control unit 383 controls radio communication by the UE 300-4.

Trigger of Reporting of Measurement Result

In particular, in the fourth embodiment, the communication control unit 383 triggers the reporting of the measurement result when a combination of the measurement result at the first frequency band (first CC) and the measurement result at the second frequency band (second CC) satisfies the reporting condition. The reporting condition has been described above.

PCC

As described above, for example, the first CC is a CC which is being used as the PCC. It is more difficult to satisfy the reporting condition in the first case (the case in which the first CC is the CC for the macro cell and the second CC is the CC for the pico cell) than in the second case (the case in which the first CC is the CC for the pico cell and the second CC is the CC for the macro cell).

As described above, for example, the reporting condition is the condition of the event A3 or the condition of the event A5 decided in 3GPP.

By triggering the reporting based on the above-described reporting condition, for example, it is more difficult for the PCC to become the CC for the pico cell from the CC for the macro cell than to become the CC for the macro cell from the CC for the pico cell. In other words, it is easier for the PCC to become the CC for the macro cell from the CC for the pico cell than to become the CC for the pico cell from the CC for the macro cell. Thus, there is a high possibility of the CC for the macro cell being used as the PCC.

SCC

As described above, for example, the first CC is a CC which is being used as an SCC. It is easier to satisfy the reporting condition in the first case (a case in which the first CC is the CC for the macro cell and the second CC is a CC for the pico cell) than in the second case (a case in which the first CC is the CC for the pico cell and the second CC is a CC for the macro cell).

As described above, for example, the reporting condition is a condition of the event A6 decided in 3GPP.

By triggering the reporting based on the above-described reporting condition, for example, it is easier for the SCC to become the CC for the pico cell from the CC for the macro cell than to become the CC for the macro cell from the CC for the pico cell. In other words, it is more difficult for the SCC to become the CC for the macro cell from the CC for the pico cell than to become the CC for the pico cell from the CC for the macro cell. Thus, there is a high possibility of the CC for the pico cell being used as the SCC.

By triggering the reporting based on the above-described reporting condition, for example, a possibility of the reporting of the measurement result is changed between the first and second cases. As a result, the more proper CC can be used in a terminal equipment (UE).

Reporting of Measurement Result

For example, the communication control unit 383 reports the measurement result when the reporting of the measurement result is triggered.

For example, when the reporting condition is the condition of the event A3, the event A5, or the event A6, the communication control unit 383 reports the measurement result at the second CC (neighbor cell) to the macro eNB 100-4 or the pico eNB 200-4 via the radio communication unit 320. The communication control unit 383 may report the measurement result at the first CC (the primary cell or the secondary cell) to the macro eNB 100-4 or the pico eNB 200-4 instead of the measurement result at the second CC (neighbor cell) or along with the measurement result at the second CC (neighbor cell).

6.5 Flow of Process

Next, examples of the communication control process according to the fourth embodiment will be described with reference to FIGS. 26 to 28.

(First Communication Control Process: Notifying Reporting Condition Information (eNB))

Figure 26:
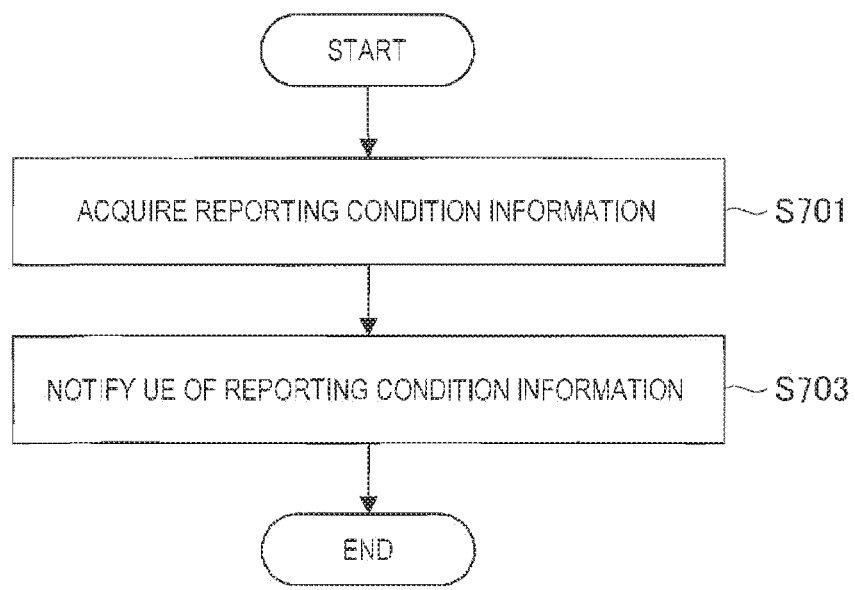
FIG. 26 is a flowchart illustrating a schematic flow of a first communication control process according to the fourth embodiment.

FIG. 26 is a flowchart illustrating a first example of a schematic flow of a communication control process according to the fourth embodiment. The first communication control process is a process for notifying reporting condition information according to the fourth embodiment. The first communication control process can also be performed by the pico eNB 200-4.

In step S701, the information acquisition unit 181 acquires the information (that is, the reporting condition information) on the reporting condition for triggering the reporting of the measurement result.

In step S703, the communication control unit 183 notifies the UE 300-4 of the reporting condition information. Then, the process ends.

(Second Communication Control Process: Reporting of Measurement Result Based on Reporting Condition (UE))

Figure 27:
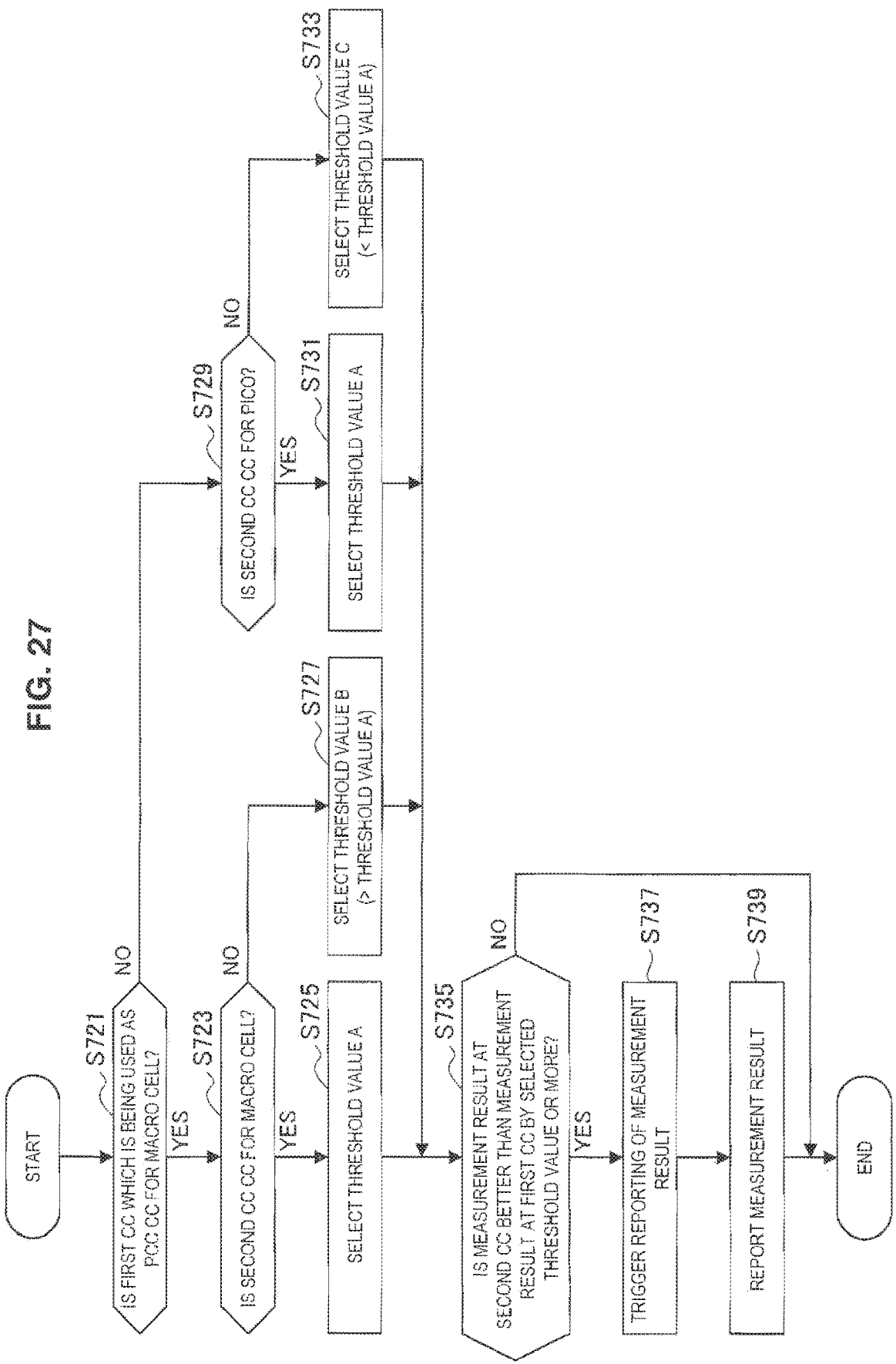
FIG. 27 is a flowchart illustrating a schematic flow of a second communication control process according to the fourth embodiment.

FIG. 27 is a flowchart illustrating an example of a schematic flow of a second communication control process according to the fourth embodiment. The second communication control process is a process of reporting the measurement result based on the reporting condition according to the fourth embodiment and is performed by the UE 300-4. In this example, the reporting condition is the condition of the event A3.

In step S721, the communication control unit 383 determines whether the first CC (primary cell) which is being used as the PCC is the CC for the macro cell. When the first CC is the CC for the macro cell, the process proceeds to step S723. Otherwise, the process proceeds to step S729.

In step S723, the communication control unit 383 determines whether the second CC (neighbor cell) is the CC for the macro cell. When the second CC is the CC for the macro cell, the process proceeds to step S725. Otherwise, the process proceeds to step S727.

In step S725, the communication control unit 383 selects the threshold value A as the threshold value of the reporting condition.

In step S727, the communication control unit 383 selects the threshold value B (>the threshold value A) as the threshold value of the reporting condition.

In step S729, the communication control unit 383 determines whether the second CC (neighbor cell) is the CC for the pico cell. When the second CC is the CC for the pico cell, the process proceeds to step S731. Otherwise, the process proceeds to step S733.

In step S731, the communication control unit 383 selects the threshold value A as the threshold value of the reporting condition.

In step S733, the communication control unit 383 selects the threshold value C (<the threshold value A) as the threshold value of the reporting condition.

In step S735, the communication control unit 383 determines whether the measurement result at the second CC (neighbor cell) is better than the measurement result at the first CC (primary cell) by the selected threshold value or more. When the measurement result at the second CC is better than the measurement result at the first CC by the selected threshold value or more, the process proceeds to step S737. Otherwise, the process ends.

In step S737, the communication control unit 383 triggers the reporting of the measurement result.

In step S739, the communication control unit 383 reports the measurement result. Then, the process ends.

(Third Communication Control Process: Reporting of Measurement Result Based on Reporting Condition (UE))

Figure 28:
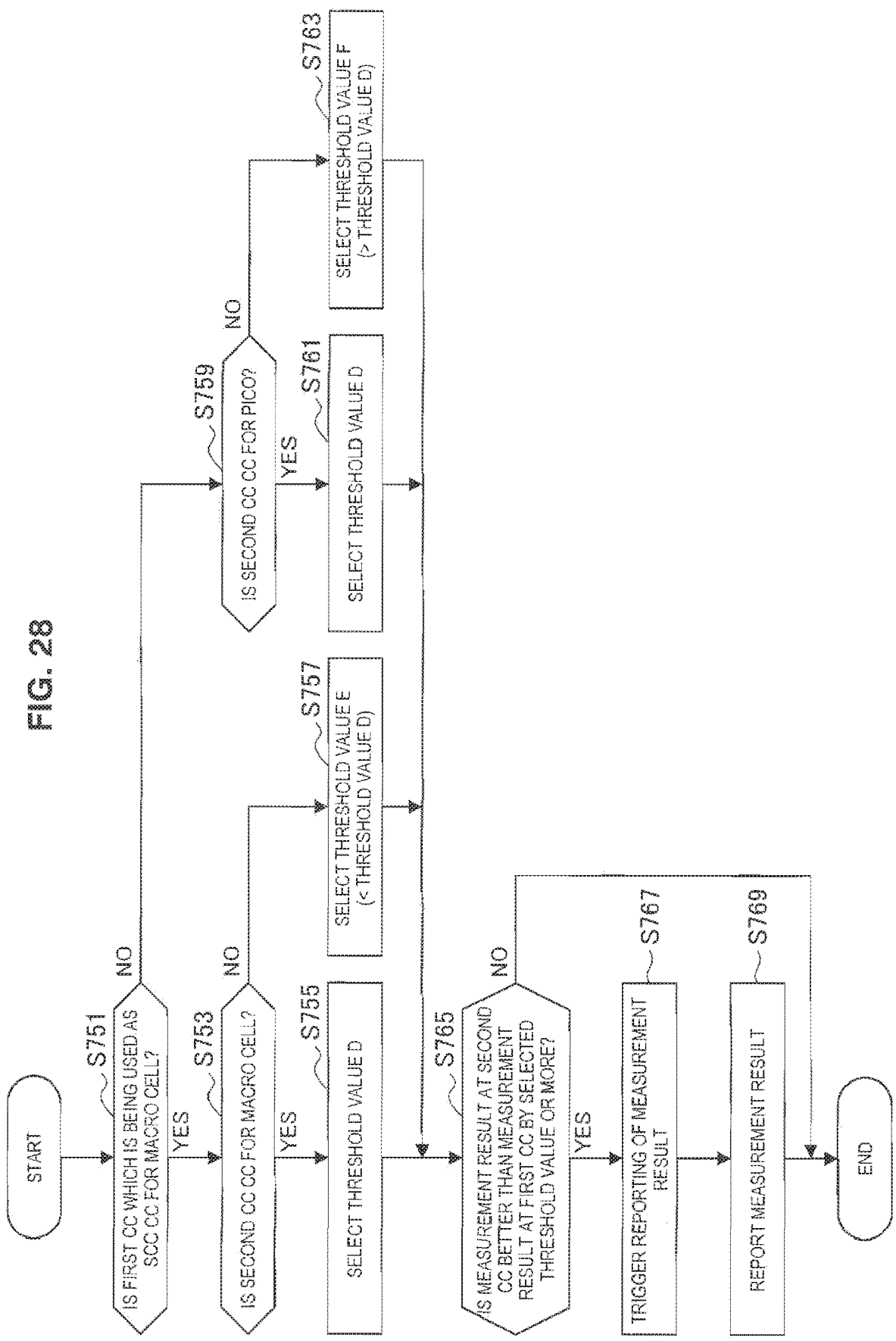
FIG. 28 is a flowchart illustrating a schematic flow of a third communication control process according to the fourth embodiment.

FIG. 28 is a flowchart illustrating an example of a schematic flow of a third communication control process according to the third embodiment. The third communication control process is a process of reporting the measurement result based on the reporting condition according to the fourth embodiment and is performed by the UE 300-4. In this example, the reporting condition is the condition of the event A6.

In step S751, the communication control unit 383 determines whether the first CC (secondary cell) which is being used as the SCC is the CC for the macro cell. When the first CC is the CC for the macro cell, the process proceeds to step S753. Otherwise, the process proceeds to step S759.

In step S753, the communication control unit 383 determines whether the second CC (neighbor cell) is the CC for the macro cell. When the second CC is the CC for the macro cell, the process proceeds to step S755. Otherwise, the process proceeds to step S757.

In step S755, the communication control unit 383 selects the threshold value D as the threshold value of the reporting condition.

In step S757, the communication control unit 383 selects the threshold value E (<the threshold value D) as the threshold value of the reporting condition.

In step S759, the communication control unit 383 determines whether the second CC (neighbor cell) is the CC for the pico cell. When the second CC is the CC for the pico cell, the process proceeds to step S761. Otherwise, the process proceeds to step S763.

In step S761, the communication control unit 383 selects the threshold value D as the threshold value of the reporting condition.

In step S763, the communication control unit 383 selects the threshold value F (>the threshold value D) as the threshold value of the reporting condition.

In step S765, the communication control unit 383 determines whether the measurement result at the second CC (neighbor cell) is better than the measurement result at the first CC (secondary cell) by the selected threshold value or more. When the measurement result at the second CC is better than the measurement result at the first CC by the selected threshold value or more, the process proceeds to step S767. Otherwise, the process ends.

In step S767, the communication control unit 383 triggers the reporting of the measurement result.

In step S769, the communication control unit 383 reports the measurement result. Then, the process ends.

7. Fifth Embodiment

Figure 29:
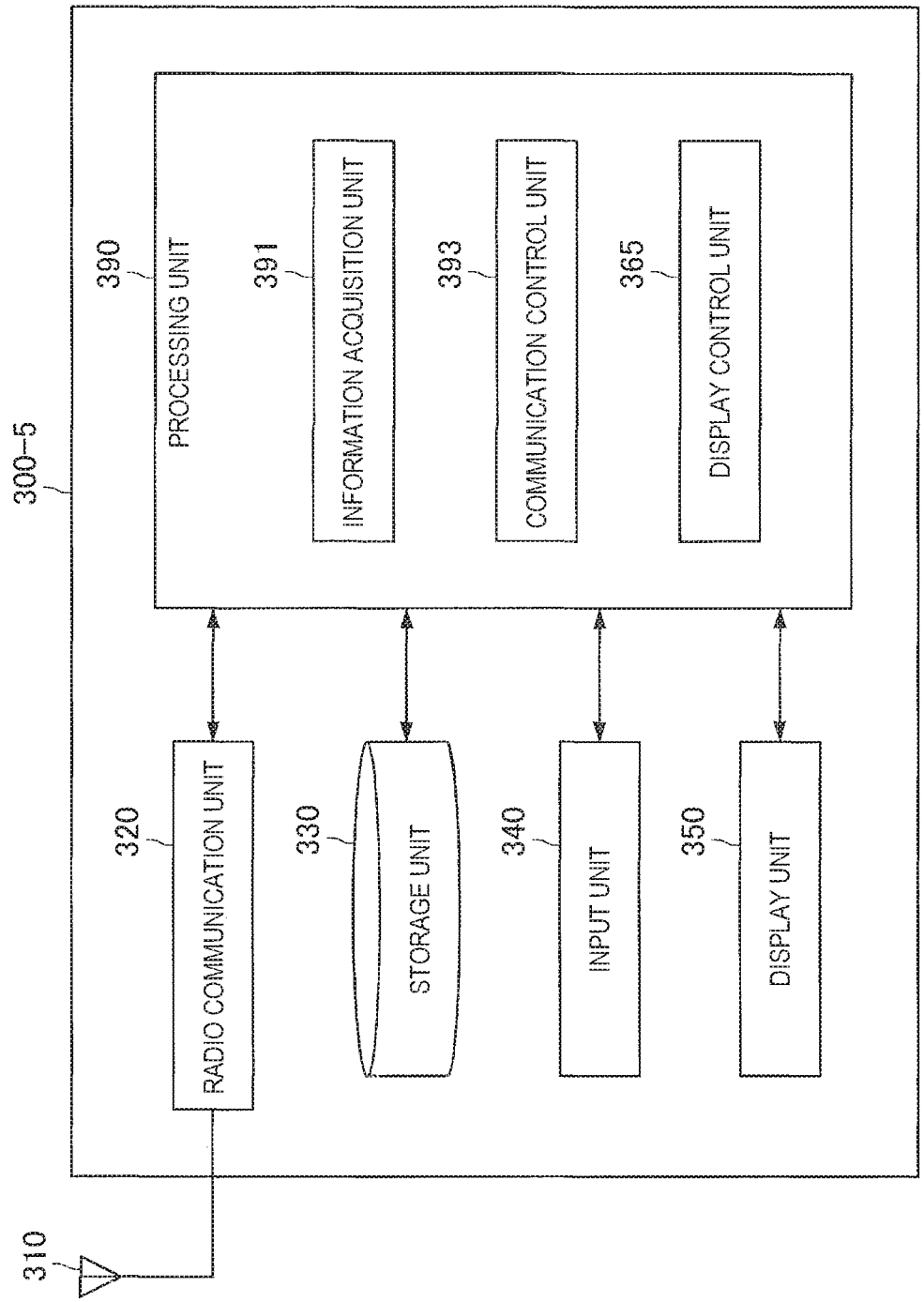
FIG. 29 is a block diagram illustrating an example of the configuration of a UE according to a fifth embodiment.

Next, a fifth embodiment of the present disclosure will be described with reference to FIGS. 29 to 31.

7.1 Overview

Problem

In scenario A of a small cell, a UE can use a frequency band for a macro cell to perform radio communication with a macro eNB and can use a frequency band for a pico cell to perform radio communication with a pico eNB. Therefore, in scenario A, the UE maintains a synchronization state at the frequency band for the pico cell and also acquires system information on the frequency band. Therefore, when the UE uses the frequency band for the pico cell at the time of handover from the macro cell to the pico cell, it is not necessary to acquire the synchronization state again and acquire the system information. Therefore, swifter handover from the macro cell to the pico cell can be realized.

In scenario B of a small cell, on the other hand, the UE uses the frequency band for the pico cell to perform radio communication with the pico eNB, but does not use the frequency band for the macro cell to perform radio communication with the macro eNB. Therefore, the UE acquires the synchronization state again at the time of handover from the pico cell to the macro cell and acquires the system information. Therefore, there is a concern of a time being taken in the handover from the pico cell to the macro cell. In particular, when the UE is moving at a high speed, it is important to shorten a time necessary for the handover.

Accordingly, in the fifth embodiment, it is possible to further shorten the time of the handover from the pico cell to the macro cell.

Solution

In the fifth embodiment, when the CC for the pico cell is being used as the PCC, a UE 300-5 is controlled so that at least the synchronization state is maintained in at least one CC for the macro cell.

Accordingly, it is possible to further shorten the time of the handover from the pico cell to the macro cell.

7.2 Configuration of UE

Next, an example of the configuration of the UE 300-5 according to the fifth embodiment will be described with reference to FIG. 29. FIG. 29 is a block diagram illustrating an example of the configuration of the UE 300-5 according to the fifth embodiment. Referring to FIG. 29, the UE 300-5 includes an antenna unit 310, a radio communication unit 320, a storage unit 330, an input unit 340, a display unit 350, and a processing unit 390.

Here, there is no difference in forms of the antenna unit 310, the radio communication unit 320, the storage unit 330, the input unit 340, the display unit 350, and the display control unit 365 included in a processing unit between the fifth embodiment and the above-described first embodiment. Thus, here, only an information acquisition unit 391 and a communication control unit 393 in a processing unit 390 will be described.

(Information Acquisition Unit 391)

The information acquisition unit 391 acquires information necessary for control by the communication control unit 393. For example, the information acquisition unit 391 acquires information from another device via the radio communication unit 320. For example, the information acquisition unit 391 acquires information stored in the storage unit 330.

(Communication Control Unit 393)

The communication control unit 393 controls radio communication by the UE 300-5.

Maintenance of Synchronization State at CC for Macro Cell

In particular, in the fifth embodiment, when the frequency band (CC) for the pico cell 20 is being used as the PCC, the communication control unit 393 controls the radio communication of the UE 300-5 so that at least the synchronization state is maintained at least at one frequency band (CC) for the macro cell 10. For example, the synchronization state includes a synchronization state in a time direction and a synchronization state in a frequency direction.

Specifically, for example, the CC for the pico cell is used as the PCC. In this case, even when any CC for the macro cell is not used as the SCC (that is, even in scenario B), the communication control unit 393 controls the radio communication of the UE 300-5 so that at least the synchronization state is maintained in at least one macro cell CC. Specifically, for example, the communication control unit 393 controls a synchronization process of the UE 300-5 so that synchronization is obtained and maintained by a synchronization signal, a reference signal, or the like in the CC for the macro cell. Hereinafter, a specific example of this point will be described with reference to FIG. 30.

Figure 30:
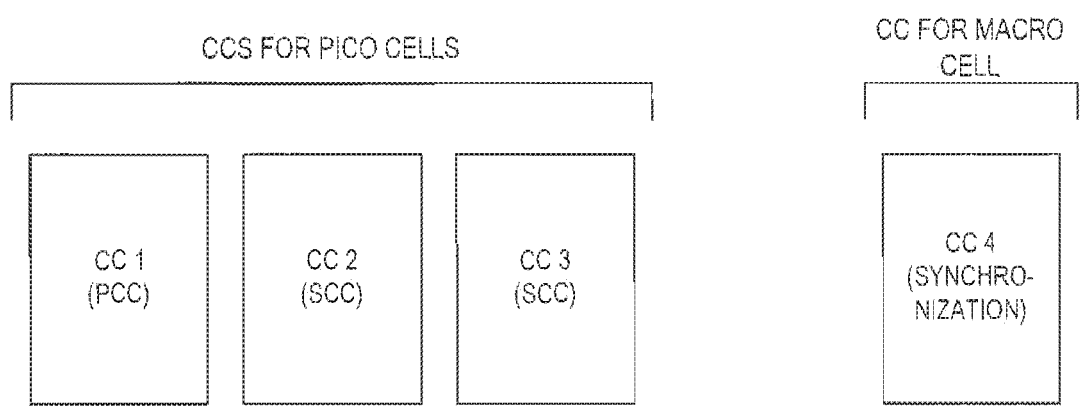
FIG. 30 is an explanatory diagram illustrating a situation of a frequency band in the second scenario (scenario B) of the small cells.
Figure 31:
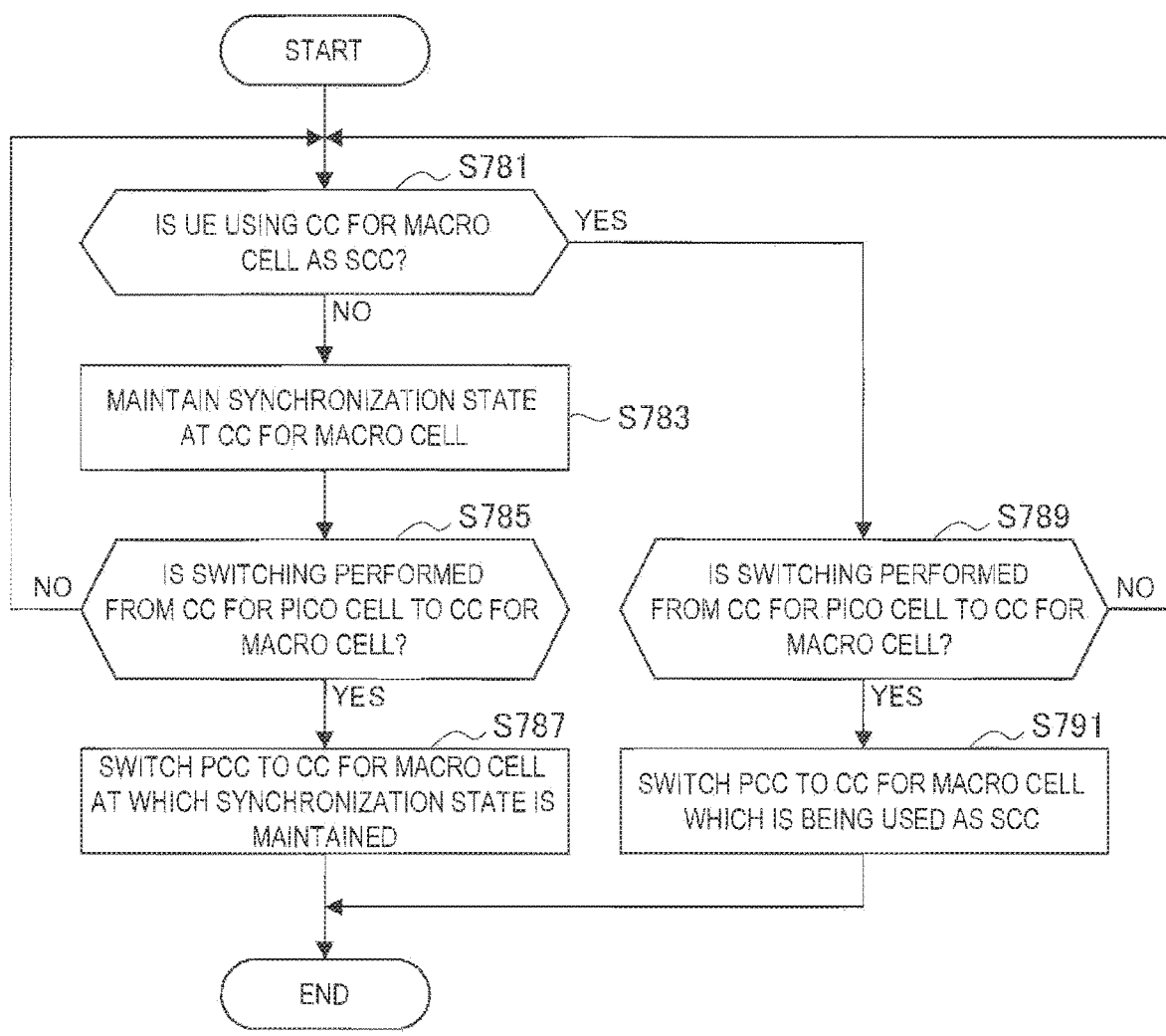
FIG. 31 is a flowchart illustrating a schematic flow of a communication control process according to the fifth embodiment.

FIG. 30 is an explanatory diagram illustrating a situation of a frequency band in the second scenario (scenario B) of the small cells. Referring to FIG. 30, three CCs for pico cells used in the UE 300-5 are illustrated. For example, the UE 300-5 uses a CC 1 which is a CC for the pico cell as the PCC and uses a CC 2 and a CC 3 which are CCs for the pico cells as the SCCs. The UE 300-5 does not use a CC 4 which is a CC for the macro cell as the SCC, but obtains and maintains a synchronization state at the CC 4.

For example, when any CC for the macro cell is used as the SCC (that is, the case of scenario A), the synchronization state is, of course, maintained at the CC for the macro cell used as the SCC.

Accordingly, since the UE 300-5 already obtains the synchronization state at the CC for the macro cell irrespective of whether the CC for the macro cell is used, it is possible to further shorten the time of the handover from the pico cell to the macro cell.

Securing of State in which System Information can be Acquired

The communication control unit 393 may secure a state in which the system information can be acquired in addition to the maintenance of the synchronization state. For example, the communication control unit 393 may acquire some of a master information block (MIB) and a system information block (SIB) of the CC for the macro cell even when any one CC for the macro cell is not used as the SCC (that is, even in the scenario B). For example, SIB 1 indicating the position of a resource by which another SIB is transmitted may be acquired. Information included in the SIB may be acquired in advance.

Use of at Least One CC for Macro Cell

When the frequency band (CC) for the pico cell 20 is being used as the PCC, the communication control unit 393 may control the radio communication of the UE 300-5 so that at least one frequency band (CC) is used as the SCC. That is, when the PCC is the CC for the pico cell, at least one CC for the macro cell may be used by the UE 300-5.

Accordingly, since the UE 300-5 already obtains the synchronization state at the CC for the macro cell and also acquires the system information on the CC for the macro cell, it is possible to further shorten the time of the handover from the pico cell to the macro cell.

The communication control unit 393 may control the radio communication of the UE 300-5 so that data is not transmitted and received at the least one frequency band (CC). That is, when the PCC is the CC for the pico cell, the data may not be transmitted or received at the CC for the macro cell even when at least one CC for the macro cell is used as the SCC.

Accordingly, even when the CC for the macro cell is used by the plurality of UE 300-5, the data is not transmitted and received at the CC for the macro cell. Therefore, it is possible to suppress an increase in a load in the macro cell 10.

7.3 Flow of Process

Next, an example the communication control process according to the fifth embodiment will be described with reference to FIG. 31. FIG. 31 is a flowchart illustrating a schematic flow of the communication control process according to the fifth embodiment. The communication control process is performed by the UE 300-5. The communication control process is performed when the CC for the pico cell is used as the PCC.

In step S781, the communication control unit 393 determines whether the UE 300-5 is using the CC for the macro cell as the SCC. When the UE 300-5 is using the CC for the macro cell as the SCC, the process proceeds to step S789. Otherwise, the process proceeds to step S783.

In step S783, the communication control unit 393 controls the synchronization process of the UE 300-5 so that the synchronization state at the CC for the macro cell is maintained.

In step S785, the communication control unit 393 determines whether the PCC is switched from the CC for the pico cell to the CC for the macro cell. When the PCC is switched, the process proceeds to step S787. Otherwise, the process returns to step S781.

In step S787, the communication control unit 393 switches the PCC to the CC for the macro cell at which the synchronization state is maintained. That is, the handover of the PCC to the CC for the macro cell at which the synchronization state is maintained is performed. Then, the process ends.

In step S789, the communication control unit 393 determines whether the PCC is switched from the CC for the pico cell to the CC for the macro cell. When the PCC is switched, the process proceeds to step S791. Otherwise, the process returns to step S781.

In step S791, the communication control unit 393 switches the PCC to the CC for the macro cell which is being used as the SCC. That is, the handover of the PCC to the CC for the macro cell used as the SCC is performed. Then, the process ends.

8. Application Examples

The technology related to the present disclosure can be applied to various products. For example, the eNB (the macro eNB100 or the pico eNB 200) may include a body (also referred to as a base station device) controlling radio communication. Further, the eNB (the macro eNB 100 or the pico eNB 200) may further include one or more remote radio heads (RRHs) disposed in different locations from the body. Any of various kinds of terminals to be described below may operate as the eNB (the macro eNB 100 or the pico eNB 200) by performing a base station function temporarily or semipermanently. Furthermore, at least one of the structural elements of the eNB (the macro eNB 100 or the pico eNB 200) may be realized in a base station device or a module for a base station device.

In addition, the UE 300 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 300 may also be realized as a terminal that conducts machine-to-machine (M2M) communication (also called a machine-type communication (MTC) terminal). Furthermore, at least one of the structural elements of the UE 300 may be realized in a radio communication module mounted onboard these terminals (for example, an integrated circuit module configured on a single die).

<<8.1. Applications Related to eNB>>

(First Application)

Figure 32:
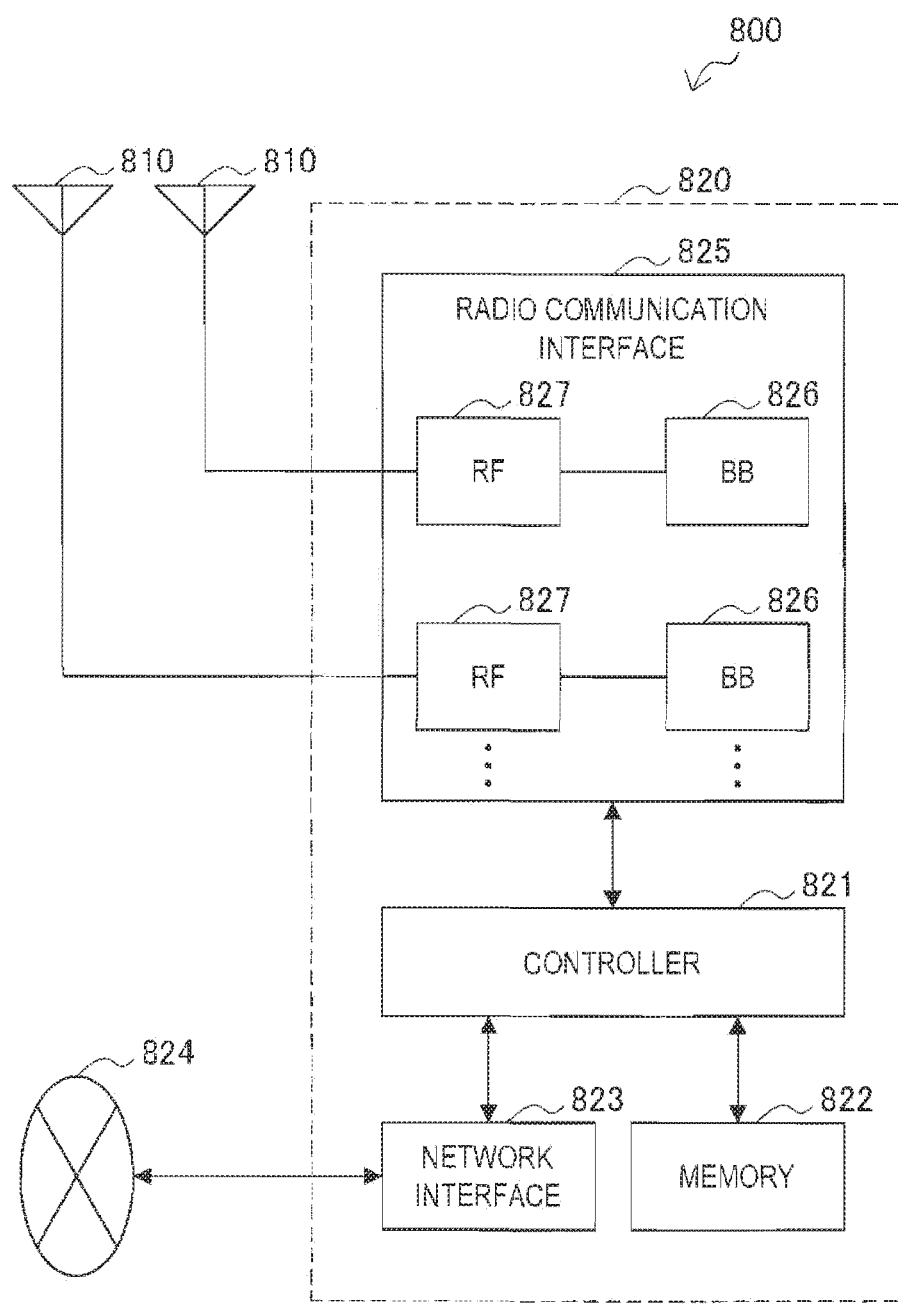
FIG. 32 is a block diagram illustrating a first example of a schematic configuration of an eNB.

FIG. 32 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or multiple antenna elements (for example, multiple antenna elements constituting a MIMO antenna), and is used by the base station device 820 to transmit and receive radio signals. The eNB 800 may include multiple antennas 810 as illustrated in FIG. 32, and the multiple antennas 810 may respectively correspond to multiple frequency bands used by the eNB 800, for example. Note that although FIG. 32 illustrates an example of the eNB 800 including multiple antennas 810, the eNB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from multiple baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNB via the network interface 823. In this case, the eNB 800 and the core network node or other eNB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include multiple BB processors 826 as illustrated in FIG. 32, and the multiple BB processors 826 may respectively correspond to multiple frequency bands used by the eNB 800, for example. In addition, the radio communication interface 825 may also include multiple RF circuits 827 as illustrated in FIG. 32, and the multiple RF circuits 827 may respectively correspond to multiple antenna elements, for example. Note that although FIG. 32 illustrates an example of the radio communication interface 825 including multiple BB processors 826 and multiple RF circuits 827, the radio communication interface 825 may also include a single BB processor 826 or a single RF circuit 827.

In the eNB 800 illustrated in FIG. 32, the information acquisition unit 151 and the communication control unit 153 described with reference to FIG. 4 may be installed in the radio communication interface 825. Alternatively, at least one of the structural elements may be mounted on the controller 821. As one example, in the eNB 800, a module including a part (for example, the BB processor 826) or all of the radio communication interface 825 and/or including the controller 821 may be mounted onboard, and the information acquisition unit 151 and the communication control unit 153 may be installed in the module. In this case, the module may store a program causing a processor to function as the information acquisition unit 151 and the communication control unit 153 (in other words, a program causing a processor to execute operations of the information acquisition unit 151 and the communication control unit 153) and executes the program. As another example, a program causing a processor to function as the information acquisition unit 151 and the communication control unit 153 may be installed in the eNB 800, and the radio communication interface 825 (for example, the BB processor 826) and/or the controller 821 may execute the program. As described above, the eNB 800, the base station device 820, or the module may be provided as the device including the information acquisition unit 151 and the communication control unit 153, or a program causing a processor to function as the information acquisition unit 151 and the communication control unit 153 may be provided. A readable recording medium storing the program may be provided. For this point, the information acquisition unit 251 and the communication control unit 253 described with reference to FIG. 6, the information acquisition unit 161 and the communication control unit 163 described with reference to FIG. 16, the information acquisition unit 261 and the communication control unit 263 described with reference to FIG. 17, the information acquisition unit 171 and the communication control unit 173 described with reference to FIG. 21, the information acquisition unit 181 and the communication control unit 183 described with reference to FIG. 23, and the information acquisition unit 281 and the communication control unit 283 described with reference to FIG. 24 are also the same as the information acquisition unit 151 and the communication control unit 153.

In the eNB 800 illustrated in FIG. 32, the radio communication unit 120 described with reference to FIG. 4 may be mounted onboard the radio communication interface 825 (for example, the RF circuit 827). The antenna unit 110 may be mounted onboard the antenna 810. The network communication unit 130 may be mounted onboard the controller 821 and/or the network interface 823. For this point, the antenna unit 210, the radio communication control unit 220, and the network communication unit 230 described with reference to FIG. 6 are also the same as the antenna unit 110, the radio communication control unit 120, and the network communication unit 130.

(Second Application)

Figure 33:
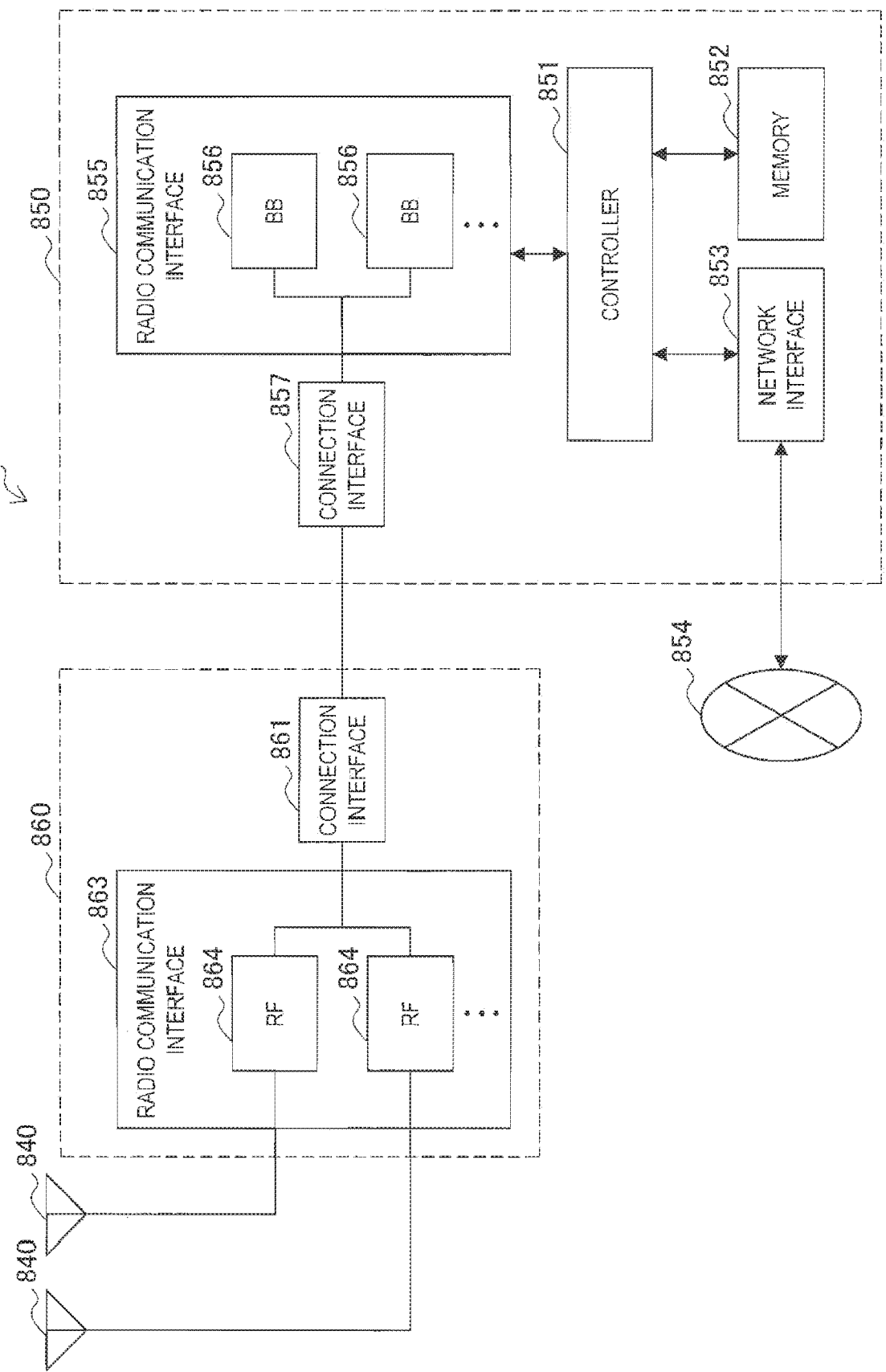
FIG. 33 is a block diagram illustrating a second example of a schematic configuration of an eNB.

FIG. 33 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or multiple antenna elements (for example, multiple antenna elements constituting a MIMO antenna), and is used by the RRH 860 to transmit and receive radio signals. The eNB 830 may include multiple antennas 840 as illustrated in FIG. 33, and the multiple antennas 840 may respectively correspond to multiple frequency bands used by the eNB 830, for example. Note that although FIG. 33 illustrates an example of the eNB 830 including multiple antennas 840, the eNodeB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 32.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 32, except for being connected to an RF circuit 864 of the RRH 860 via the connection interface 857. The radio communication interface 855 may also include multiple BB processors 856 as illustrated in FIG. 33, and the multiple BB processors 856 may respectively correspond to multiple frequency bands used by the eNB 830, for example. Note that although FIG. 33 illustrates an example of the radio communication interface 855 including multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include multiple RF circuits 864 as illustrated in FIG. 33, and the multiple RF circuits 864 may respectively correspond to multiple antenna elements, for example. Note that although FIG. 33 illustrates an example of the radio communication interface 863 including multiple RF circuits 864, the radio communication interface 863 may also include a single RF circuit 864.

In the eNB 830 illustrated in FIG. 33, the information acquisition unit 151 and the communication control unit 153 described with reference to FIG. 4 may be installed in the radio communication interface 825 and/or the radio communication interface 863. Alternatively, at least one of the structural elements may be mounted on the controller 851. As one example, in the eNB 830, a module including a part (for example, the BB processor 856) or all of the radio communication interface 855 and/or including the controller 851 may be mounted onboard, and the information acquisition unit 151 and the communication control unit 153 may be installed in the module. In this case, the module may store a program causing a processor to function as the information acquisition unit 151 and the communication control unit 153 (in other words, a program causing a processor to execute operations of the information acquisition unit 151 and the communication control unit 153) and executes the program. As another example, a program causing a processor to function as the information acquisition unit 151 and the communication control unit 153 may be installed in the eNB 830, and the radio communication interface 855 (for example, the BB processor 856) and/or the controller 851 may execute the program. As described above, the eNB 830, the base station device 850, or the module may be provided as the device including the information acquisition unit 151 and the communication control unit 153, or a program causing a processor to function as the information acquisition unit 151 and the communication control unit 153 may be provided. A readable recording medium storing the program may be provided. For this point, the information acquisition unit 251 and the communication control unit 253 described with reference to FIG. 6, the information acquisition unit 161 and the communication control unit 163 described with reference to FIG. 16, the information acquisition unit 261 and the communication control unit 263 described with reference to FIG. 17, the information acquisition unit 171 and the communication control unit 173 described with reference to FIG. 21, the information acquisition unit 181 and the communication control unit 183 described with reference to FIG. 23, and the information acquisition unit 281 and the communication control unit 283 described with reference to FIG. 24 are also the same as the information acquisition unit 151 and the communication control unit 153.

In the eNB 830 illustrated in FIG. 33, for example the radio communication unit 120 described with reference to FIG. 4 may be mounted onboard the radio communication interface 863 (for example, the RF circuit 864). The antenna unit 110 may be mounted onboard the antenna 840. The network communication unit 130 may be mounted onboard the controller 851 and/or the network interface 853. For this point, the antenna unit 210, the radio communication control unit 220, and the network communication unit 230 described with reference to FIG. 6 are also the same as the antenna unit 110, the radio communication control unit 120, and the network communication unit 130.

<8.2. Applications Related to UE>

(First Application)

Figure 34:
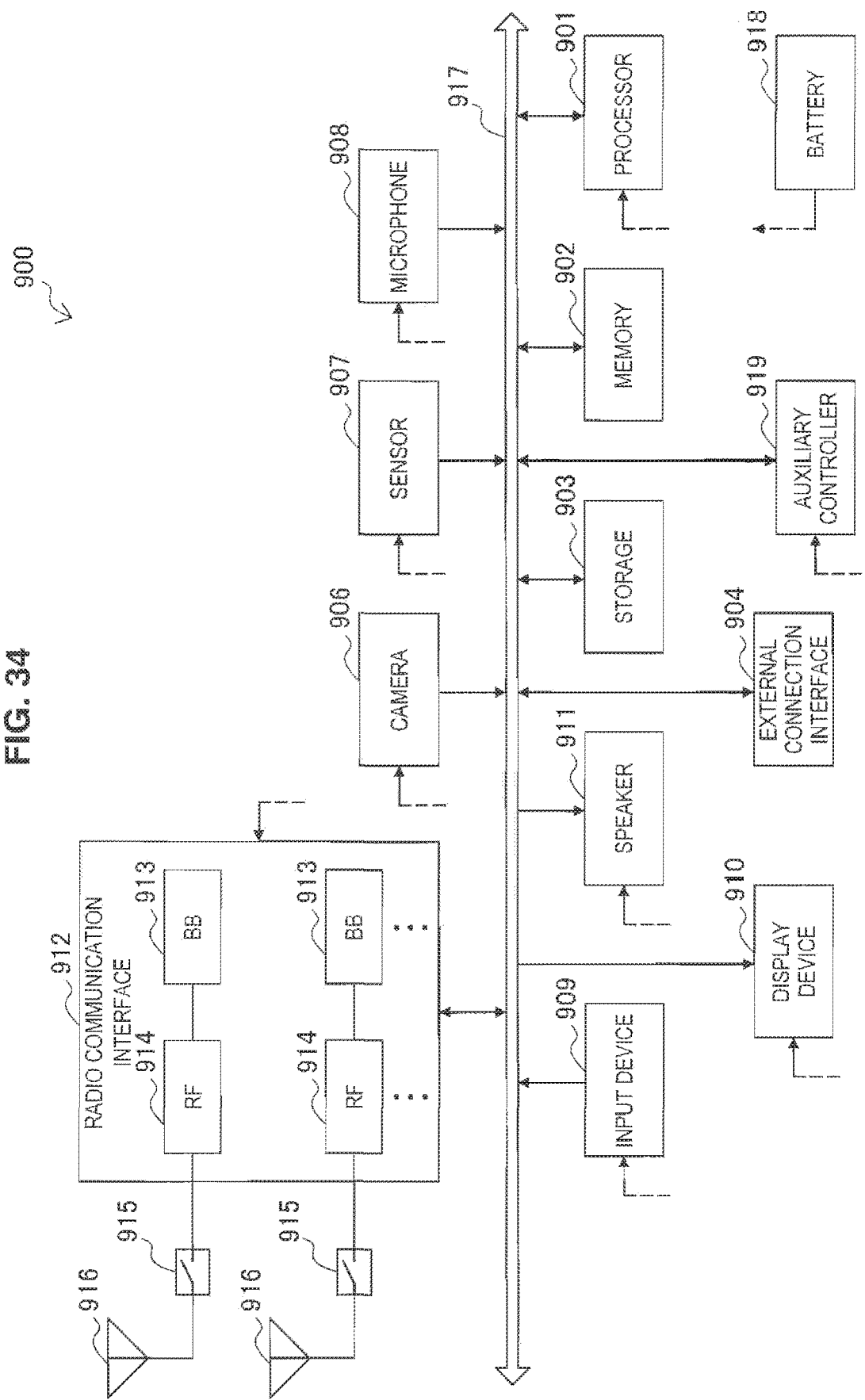
FIG. 34 is a block diagram illustrating an example of a schematic configuration of a smartphone.

FIG. 34 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include multiple BB processors 913 and multiple RF circuits 914 as illustrated in FIG. 34. Note that although FIG. 34 illustrates an example of the radio communication interface 912 including multiple BB processors 913 and multiple RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among multiple circuits included in the radio communication interface 912 (for example, circuits for different radio communication schemes).

Each antenna 916 includes a single or multiple antenna elements (for example, multiple antenna elements constituting a MIMO antenna), and is used by the radio communication interface 912 to transmit and receive radio signals. The smartphone 900 may also include multiple antennas 916 as illustrated in FIG. 34. Note that although FIG. 34 illustrates an example of the smartphone 900 including multiple antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 34 via power supply lines partially illustrated with dashed lines in the drawing. The auxiliary controller 919 causes minimal functions of the smartphone 900 to operate while in a sleep mode, for example.

In the smartphone 900 illustrated in FIG. 34, the information acquisition unit 361 and the communication control unit 363 described with reference to FIG. 7 may be installed in the radio communication interface 912. Alternatively, at least one of the structural elements may be mounted on the processor 901 or the auxiliary controller 919. As one example, in the smartphone 900, a module including a part (for example, the BB processor 913) or all of the radio communication interface 912, the processor 901, and/or the auxiliary controller 919 may be mounted onboard, and the information acquisition unit 361 and the communication control unit 363 may be installed in the module. In this case, the module may store a program causing a processor to function as the information acquisition unit 361 and the communication control unit 363 (in other words, a program causing a processor to execute operations of the information acquisition unit 361 and the communication control unit 363) and executes the program. As another example, a program causing a processor to function as the information acquisition unit 361 and the communication control unit 363 may be installed in the smartphone 900, and the radio communication interface 912 (for example, the BB processor 913), the processor 901, and/or the auxiliary controller 919 may execute the program. As described above, the smartphone 900 or the module may be provided as the device including the information acquisition unit 361 and the communication control unit 363, or a program causing a processor to function as the information acquisition unit 361 and the communication control unit 363 may be provided. A readable recording medium storing the program may be provided. For this point, the information acquisition unit 371 and the communication control unit 373 described with reference to FIG. 18, the information acquisition unit 381 and the communication control unit 383 described with reference to FIG. 25, and the information acquisition unit 391 and the communication control unit 393 described with reference to FIG. 29 are also the same as the information acquisition unit 361 and the communication control unit 363.

In the smartphone 900 illustrated in FIG. 34, for example, the radio communication unit 320 described with reference to FIG. 7 may be mounted onboard the radio communication interface 912 (for example, the RF circuit 914). The antenna unit 310 may be mounted onboard the antenna 916.

(Second Application)

Figure 35:
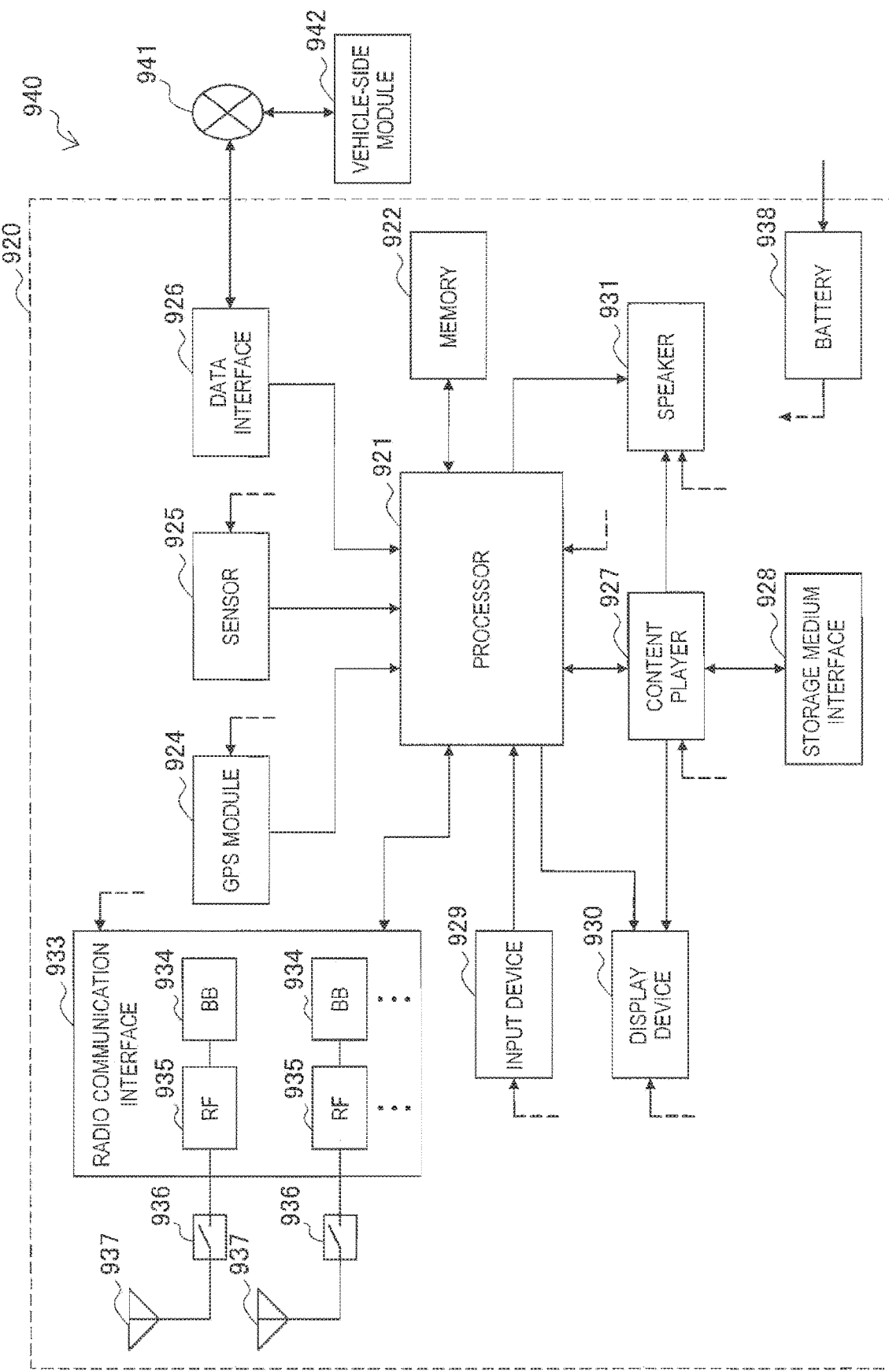
FIG. 35 is a block diagram illustrating an example of a schematic configuration of a car navigation apparatus.

FIG. 35 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include multiple BB processors 934 and multiple RF circuits 935 as illustrated in FIG. 35. Note that although FIG. 35 illustrates an example of the radio communication interface 933 including multiple BB processors 934 and multiple RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among multiple circuits included in the radio communication interface 933 (for example, circuits for different radio communication schemes).

Each antenna 937 includes a single or multiple antenna elements (for example, multiple antenna elements constituting a MIMO antenna), and is used by the radio communication interface 933 to transmit and receive radio signals. The car navigation device 920 may also include multiple antennas 937 as illustrated in FIG. 35. Note that although FIG. 35 illustrates an example of the car navigation device 920 including multiple antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 35 via power supply lines partially illustrated with dashed lines in the drawing. Also, the battery 938 stores electric power supplied from the vehicle.

In the car navigation device 920 illustrated in FIG. 35, the information acquisition unit 361 and the communication control unit 363 described with reference to FIG. 7 may be installed in the radio communication interface 933. Alternatively, at least one of the structural elements may be mounted on the processor 921. As one example, in the car navigation device 920, a module including a part (for example, the BB processor 934) or all of the radio communication interface 933 and/or the processor 921 may be mounted onboard, and the information acquisition unit 361 and the communication control unit 363 may be installed in the module. In this case, the module may store a program causing a processor to function as the information acquisition unit 361 and the communication control unit 363 (in other words, a program causing a processor to execute operations of the information acquisition unit 361 and the communication control unit 363) and executes the program. As another example, a program causing a processor to function as the information acquisition unit 361 and the communication control unit 363 may be installed in the car navigation device 920, and the radio communication interface 933 (for example, the BB processor 934) and/or the processor 921 may execute the program. As described above, the car navigation device 920 or the module may be provided as the device including the information acquisition unit 361 and the communication control unit 363, or a program causing a processor to function as the information acquisition unit 361 and the communication control unit 363 may be provided. A readable recording medium storing the program may be provided. For this point, the information acquisition unit 371 and the communication control unit 373 described with reference to FIG. 18, the information acquisition unit 381 and the communication control unit 383 described with reference to FIG. 25, and the information acquisition unit 391 and the communication control unit 393 described with reference to FIG. 29 are also the same as the information acquisition unit 361 and the communication control unit 363.

In the car navigation device 920 illustrated in FIG. 35, for example, the radio communication unit 320 described with reference to FIG. 7 may be mounted onboard the radio communication interface 933 (for example, the RF circuit 935). The antenna unit 310 may be mounted onboard the antenna 937.

In addition, technology according to the present disclosure may also be realized as an in-vehicle system (or vehicle) 940 that includes one or more blocks of the car navigation device 920 discussed above, the in-vehicle network 941, and a vehicle-side module 942. That is, the in-vehicle system (or vehicle) 940 may be provided as a device including the information acquisition unit 361 and the communication control unit 363 (or the information acquisition unit 371 and the communication control unit 373, the information acquisition unit 381 and the communication control unit 383, or the information acquisition unit 391 and the communication control unit 393). The vehicle-side module 942 generates vehicle-side data such as the vehicle speed, number of engine revolutions, or malfunction information, and outputs the generated data to the in-vehicle network 941.

9. Conclusion

The macro eNB 100, the pico eNB 200, and the UE 300 and each process according to the embodiments of the present disclosure have been described with reference to FIGS. 3 to 33.

First Embodiment

According to the first embodiment, the UE 300 is notified of band use information indicating which cell of the macro cell 10 and the pico cell 20 uses each of the plurality of frequency bands (CCs) used in one of the macro cell 10 and the pico cell 20.

Accordingly, for example, the UE 300 can know whether each CC (frequency band) in the whitelist is the CC for the macro cell or the CC for the pico cell. Thus, according to a situation of the UE 300, the UE 300 can relatively change priority of the measurement in the CC for the macro cell and priority of the measurement in the CC for the pico cell. Therefore, the UE 300 can perform more preferable measurement according to the situation of the UE 300. As a result, when the pico cell 20 is disposed, the radio communication of the UE 300 can be improved.

Second Embodiment

According to the second embodiment, when the UE uses the CC for the pico cell as the PCC, the maximum number of CCs used as the SCCs by the UE is restricted to a smaller number.

Accordingly, for example, even when the UE uses the CC for the pico cell as the PCC, a process of adding the SCC after the handover of the PCC to the CC for the pico cell and a process of releasing the SCC before the handover of the PCC from the CC for the pico cell are reduced. That is, when the CC for the pico cell is used as the PCC, the processes accompanied with the handover are reduced.

Third Embodiment

According to the third embodiment, when control information (scheduling information) regarding a CC for a pico cell is supplied to a UE with a CC for a macro cell and a predetermined condition is satisfied, radio communication with the UE is controlled such that the control information is not transmitted with the CC for the macro cell.

Accordingly, for example, transmission of the control information regarding the CC for the pico cell with the CC for the macro cell is restricted. As a result, it is possible to reduce the load on the transmission of the control information in the macro cell.

Fourth Embodiment

According to the fourth embodiment, when a combination of a first CC which is being used for one of the macro cell 10 and the pico cell 20 and a second CC which is being used as one of the macro cell 10 and the pico cell 20 satisfies a reporting condition for triggering reporting of a measurement result, the reporting of the measurement result is triggered. The reporting condition differs between a first case in which the first CC is the CC for the macro cell and the second CC is the CC for the pico cell and a second case in which the first CC is the CC for the pico cell and the second CC is the CC for the macro cell.

Accordingly, for example, a possibility of the reporting of the measurement result is changed between the first and second cases. As a result, the more proper CC can be used in a terminal equipment (UE).

Fifth Embodiment

In the fifth embodiment, when the CC for the pico cell is being used as the PCC, a UE 300-5 is controlled so that at least the synchronization state is maintained in at least one CC for the macro cell.

Accordingly, it is possible to further shorten the time of the handover from the pico cell to the macro cell.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the eNB has been described as one communication control device, but the eNB according to an embodiment of the present disclosure is not limited thereto. The eNB may include a plurality of devices. For example, the eNB may include an antenna device including an antenna unit, a radio communication device including a radio communication unit, and a communication control device including a storage unit and a processing unit.

The example in which the eNB (pico eNB) of a small cell is an independent complete base station has been described, but the eNB of a small cell according to an embodiment of the present disclosure is not limited thereto. For example, the eNB of a small cell may be a remote radio head (RRH). The RRH may mainly include an analog signal processing portion and an antenna portion and may be extended from a device (for example, a macro eNB) in a remote place using an optical fiber. In this case, a communication control function (information acquisition unit and a communication control unit) for a small cell (pico cell) may be mounted onboard the device (for example, a macro eNB) in the remote place.

The pico cell has been described as an example of a small cell, but an embodiment of the present disclosure is not limited thereto. For example, the small cell may be a cell which has another name and partially or entirely overlaps with a macro cell. For example, the small cell may be a micro cell or a femto cell instead of the pico cell.

In the foregoing embodiments, the example in which the communication system is a system conforming to LTE or LTE-A has been described, but an embodiment of the present disclosure is not limited thereto. For example, the communication system may be a system conforming to another communication standard. In this case, the UE may be another terminal device and the eNB may be another base station. The component carriers (CCs) may be other frequency bands.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

A computer causing the processor (for example, a CPU or a DSP) included in the devices (for example, the macro eNB, the pico eNB, or the UE) of the present specification to function as the structural elements (for example, the information acquisition unit and the communication control unit) of the device program (in other words, a computer program causing the processor to execute the operations of the structural elements of the device) can also be created. A recording medium that records the computer program may also be provided. A device (for example, a finished product or a module (a component, a processing circuit, or a chip, or the like) for a finished product) including a memory storing the computer program and one or more processors capable of executing the computer program may also be provided. A method including the operations of the structural elements (for example, the information acquisition unit and the communication control unit) of the device may also be included in a technology according to an embodiment of the present disclosure.

Additionally, the present technology may also be configured as below.

(1)

A communication control device including:

an acquisition unit configured to acquire band use information indicating which cell of a macro cell and a small cell partially or entirely overlapping with the macro cell uses each of a plurality of frequency bands used by one of the macro cell and the small cell; and a communication control unit configured to notify a terminal device of the band use information.

(2)

The communication control device according to (1), wherein the band use information is information used by the terminal device to decide priority of measurement among the plurality of frequency bands.

(3)

The communication control device according to (2), wherein in regard to the priority, relative priority between the frequency band used in the macro cell and the frequency band used in the small cell depends on a situation of the terminal device.

(4)

The communication control device according to (3), wherein the situation of the terminal device includes a movement situation of the terminal device.

(5)

The communication control device according to (3) or (4), wherein the situation of the terminal device includes communication quality of the terminal device in the frequency band used in the macro cell.

(6)

The communication control device according to any one of (3) to (5), wherein the communication control unit notifies the terminal device of adjustment information which is adjustment information for adjusting the relative priority to decide the priority among the plurality of frequency bands and is adjustment information generated based on the situation of the terminal device.

(7)

The communication control device according to any one of (2) to (6), wherein the acquisition unit acquires priority information indicating temporary priority of the measurement among the plurality of frequency bands, wherein the communication control unit notifies the terminal device of the priority information, and wherein the priority information is information used by the terminal device to decide the priority of the measurement among the plurality of frequency bands.

(8)

The communication control device according to any one of (1) to (7), wherein the notification of the band use information to the terminal device is notification via a base station of the small cell.

(9)

The communication control device according to any one of (1) to (8), wherein, when a first terminal device capable of performing radio communication using one main frequency band and one or more auxiliary frequency bands uses the frequency band used in the small cell as the one main frequency band, the communication control unit restricts a maximum number of frequency bands used as the one or more auxiliary frequency bands by the first terminal device to a smaller number.

(10)

The communication control device according to (9), wherein the smaller number depends on a movement situation of the first terminal device.

(11)

The communication control device according to any one of (1) to (10), wherein, when control information regarding the frequency band used in the small cell is provided using the frequency band used in the macro cell by a first terminal device capable of performing radio communication using one main frequency band and one or more auxiliary frequency bands and when a predetermined condition is satisfied, the communication control unit controls the radio communication by the first terminal device in a manner that the control information is not transmitted to the first terminal with the frequency band used in the macro cell.

(12)

The communication control device according to (11), wherein the frequency band used in the macro cell is the frequency band used as the one main frequency band by the first terminal device, and wherein the communication control unit controls the radio communication by the first terminal device in a manner that the control information is not transmitted to the terminal device with the frequency band used in the macro cell by switching the one main frequency band by the first terminal device from the frequency band used in the macro cell to the frequency band used in the small cell.

(13)

The communication control device according to (11) or (12), wherein the predetermined condition includes a first condition of a movement situation of the first terminal device.

(14)

The communication control device according to (11) or (12), wherein the predetermined condition includes a second condition of the number of frequency bands used by the first terminal device.

(15)

The communication control device according to (11) or (12), wherein the predetermined condition includes a third condition of the number of terminal devices to which control information regarding the frequency band used in the small cell is provided with the frequency band used in the macro cell.

(16)

The communication control device according to (11) or (12), wherein the predetermined condition includes a fourth condition of a time in which control information regarding the frequency band used in the small cell is provided to the first terminal device with the frequency band used in the macro cell.

(17)

A communication control method including:
acquiring band use information indicating which cell of a macro cell and a small cell partially or entirely overlapping with the macro cell uses each of a plurality of frequency bands used by one of the macro cell and the small cell; and
notifying a terminal device of the band use information.

(18)

A terminal device including:
an acquisition unit configured to acquire band use information indicating which cell of a macro cell and a small cell partially or entirely overlapping with the macro cell uses each of a plurality of frequency bands used by one of the macro cell and the small cell when a base station notifies of the band use information; and
a communication control unit configured to control radio communication based on the band use information.

(19)

The communication control device according to (18), wherein the communication control unit decides priority of measurement among the plurality of frequency bands based on the band use information.

(20)

The terminal device according to (19), wherein the communication control unit adjusts relative priority between the frequency band used in the macro cell and the frequency band used in the small cell based on a situation of the terminal device, to decide the priority among the plurality of frequency bands.

(21)

The terminal device according to any one of (18) to (20), wherein the terminal device is able to perform the radio communication using one main frequency band and one or more auxiliary frequency bands, and wherein, when the terminal device uses the frequency band used in the small cell as the one main frequency band, the communication control unit restricts a maximum number of frequency bands used as the one or more auxiliary frequency bands by the terminal device to a smaller number.

(22) A terminal device including:

an acquisition unit configured to acquire a measurement result at a first frequency band which is being used for one of a macro cell and a small cell partially or entirely overlapping with the macro cell and a measurement result at a second frequency band for one of the small cell and the macro cell; and a communication control unit configured to trigger reporting of the measurement result when a combination of the measurement result at the first frequency band and the measurement result at the second frequency band satisfies a reporting condition for triggering the reporting of the measurement result, wherein the reporting condition differs between a first case in which the first frequency band is a frequency band for the macro cell and the second frequency band is a frequency band for the small cell and a second case in which the first frequency band is the frequency band for the small cell and the second frequency band is the frequency band for the macro cell.

(23) The terminal device according to (22), wherein the terminal device is able to perform radio communication using one main frequency band and one or more auxiliary frequency bands, wherein the first frequency band is a frequency band which is being used as the one main frequency band, and wherein it is more difficult to satisfy the reporting condition in the first case than in the second case.

(24) The terminal device according to (22), wherein the terminal device is able to perform radio communication using one main frequency band and one or more auxiliary frequency bands, wherein the first frequency band is a frequency band which is being used as one of the one or more auxiliary frequency bands, and wherein it is easier to satisfy the reporting condition in the first case than in the second case.

(25) The terminal device according to any one of (22) to (24), wherein the reporting condition is a condition determined using a threshold value, and wherein the threshold value differs between the first and second cases.

(26) The terminal device according to any one of (22) to (25), wherein the terminal device is able to perform radio communication using one main frequency band and one or more auxiliary frequency bands, and wherein, when a frequency band for the small cell is being used as the one main frequency band, the communication control unit controls the radio communication of the terminal device in a manner that at least a synchronization state is maintained in at least one frequency band for the macro cell.

(27) The terminal device according to (26), wherein the communication control unit controls the radio communication of the terminal device in a manner that the at least one frequency band is used as some or all of the one or more auxiliary frequency bands.

(28) The terminal device according to (27), wherein the communication control unit controls the radio communication of the terminal device in a manner that data is not transmitted and received at the at least one frequency band.

(29) A communication control device including:

an acquisition unit configured to acquire information on a reporting condition which is a reporting condition for triggering reporting of a measurement result and is a condition satisfied by a measurement result at a first frequency band which is being used for one of a macro cell and a small cell partially or entirely overlapping with the macro cell and a measurement result at a second frequency band for one of the macro cell and the small cell; and a communication control unit configured to notify a terminal device of the information on the reporting condition, wherein the reporting condition differs between a first case in which the first frequency band is a frequency band for the macro cell and the second frequency band is a frequency band for the small cell and a second case in which the first frequency band is the frequency band for the small cell and the second frequency band is the frequency band for the macro cell.

(30) The communication control device according to (29), wherein the reporting condition is a condition determined using a threshold value, wherein the information on the reporting condition includes the threshold value, and wherein the threshold value differs between the first and second cases.

(31) A communication control method including:

acquiring information on a reporting condition which is a reporting condition for triggering reporting of a measurement result and is a condition satisfied by a measurement result at a first frequency band which is being used for one of a macro cell and a small cell partially or entirely overlapping with the macro cell and a measurement result at a second frequency band for one of the macro cell and the small cell; and notifying a terminal device of the information on the reporting condition, wherein the reporting condition differs between a first case in which the first frequency band is a frequency band for the macro cell and the second frequency band is a frequency band for the small cell and a second case in which the first frequency band is the frequency band for the small cell and the second frequency band is the frequency band for the macro cell.

(32) An information processing device including:

a memory configured to store a predetermined program; and one or more processors capable of executing the predetermined program, wherein the predetermined program is a program executing acquiring band use information indicating which cell of a macro cell and a small cell partially or entirely overlapping with the macro cell uses each of a plurality of frequency bands used by one of the macro cell and the small cell when a base station notifies of the band use information; and controlling radio communication based on the band use information.

(33) An information processing device including:
a memory configured to store a predetermined program; and
one or more processors capable of executing the predetermined program,
wherein the predetermined program is a program executing
acquiring a measurement result at a first frequency band which is being used for one of a macro cell and a small cell partially or entirely overlapping with the macro cell and a measurement result at a second frequency band for one of the small cell and the macro cell; and
triggering reporting of the measurement result when a combination of the measurement result at the first frequency band and the measurement result at the second frequency band satisfies a reporting condition for triggering the reporting of the measurement result,
wherein the reporting condition differs between a first case in which the first frequency band is a frequency band for the macro cell and the second frequency band is a frequency band for the small cell and a second case in which the first frequency band is the frequency band for the small cell and the second frequency band is the frequency band for the macro cell.

REFERENCE SIGNS LIST 1 communication system
10 macro cell
20 pico cell
100 macro eNB (evolved Node B)
151, 161, 171, 181 information acquisition unit
153, 163, 173, 183 communication control unit
200 pico eNB
251, 261, 281 information acquisition unit
253, 263, 283 communication control unit
300 User Equipment (UE)
361, 371, 381 information acquisition unit
363, 373, 383 communication control unit

The invention claimed is:

1. A method for a user equipment, the method comprising:
performing aggregation of:
a first group including a primary cell and one or more secondary cells managed by a first base station, and
a second group including one or more secondary cells managed by a second base station; and
receiving, in a Physical Downlink Control Channel (PDCCH) of the primary cell included in the first group, first scheduling information for cross carrier scheduling for the one or more secondary cells included in the first group,
wherein second scheduling information for cross carrier scheduling for the one or more secondary cells included in the second group, is not transmitted in the PDCCH of the primary cell included in the first group.

2. The method according to claim 1, further comprising:
receiving, in the PDCCH of the primary cell included in the first group, another control information for cross carrier scheduling for the one or more secondary cells included in the second group.

3. A method for a first base station, the method comprising:
communicating with a user equipment performing aggregation of:
a first group including a primary cell and one or more secondary cells managed by the first base station, and
a second group including one or more secondary cells managed by a second base station; and
transmitting, in a Physical Downlink Control Channel (PDCCH) of the primary cell included in the first group, first scheduling information for cross carrier scheduling for the one or more secondary cells included in the first group,
wherein second scheduling information for cross carrier scheduling for the one or more secondary cells included in the second group, is not transmitted in the PDCCH of the primary cell included in the first group.

4. The method according to claim 3, further comprising:
transmitting, in the PDCCH of the primary cell included in the first group, another control information for cross carrier scheduling for the one or more secondary cells included in the second group.

5. A user equipment, comprising:
a radio transceiver; and
circuitry configured to:
perform aggregation of:
a first group including a primary cell and one or more secondary cells managed by a first base station, and
a second group including one or more secondary cells managed by a second base station; and
receive, in a Physical Downlink Control Channel (PDCCH) of the primary cell included in the first group, first scheduling information for cross carrier scheduling for the one or more secondary cells included in the first group,
wherein second scheduling information for cross carrier scheduling for the one or more secondary cells included in the second group, is not transmitted in the PDCCH of the primary cell included in the first group.

6. A base station comprising:
a radio transceiver; and
circuitry configured to:
communicate with a user equipment performing aggregation of:
a first group including a primary cell and one or more secondary cells managed by the first base station, and
a second group including one or more secondary cells managed by a second base station; and
transmit, in a Physical Downlink Control Channel (PDCCH) of the primary cell included in the first group, first scheduling information for cross carrier scheduling for the one or more secondary cells included in the first group,
wherein second scheduling information for cross carrier scheduling for the one or more secondary cells included in the second group, is not transmitted in the PDCCH of the primary cell included in the first group.

* * * * *